United States Patent
Ross et al.

(10) Patent No.: US 12,309,863 B2
(45) Date of Patent: May 20, 2025

(54) MESH-BASED COMMUNICATION SYSTEM ARCHITECTURES

(71) Applicant: L3VEL, LLC, Wilmington, DE (US)

(72) Inventors: Kevin Ross, Lehi, UT (US); Muhammad Ahsan Naim, Irving, TX (US)

(73) Assignee: L3VEL, LLC, Wilmington, DE (US)

( * ) Notice: Subject to any disclaimer, the term of this patent is extended or adjusted under 35 U.S.C. 154(b) by 109 days.

(21) Appl. No.: 18/081,608

(22) Filed: Dec. 14, 2022

(65) Prior Publication Data

US 2023/0124255 A1 Apr. 20, 2023

Related U.S. Application Data

(63) Continuation-in-part of application No. 17/590,608, filed on Feb. 1, 2022, which is a continuation-in-part
(Continued)

(51) Int. Cl.
*H04W 16/28* (2009.01)
*H04W 24/02* (2009.01)
(Continued)

(52) U.S. Cl.
CPC ........... *H04W 76/15* (2018.02); *H04W 16/28* (2013.01); *H04W 24/02* (2013.01);
(Continued)

(58) Field of Classification Search
CPC ..................................................... H04W 16/28
See application file for complete search history.

(56) References Cited

U.S. PATENT DOCUMENTS 8,385,921 B1 2/2013 Shousterman et al.
8,406,126 B1 3/2013 Leiba et al.
(Continued)

FOREIGN PATENT DOCUMENTS

WO 2018083548 A1 5/2018

OTHER PUBLICATIONS

Ahmad et al., "How Coarse is Too Coarse in Electrically Large Reflectarray Smart Antennas?", 2017 International Workshop on Electromagnetics: Applications and Student Innovation Competition, IEEE, 2017 (Year: 2017).*
(Continued)

*Primary Examiner* — Shi K Li
(74) *Attorney, Agent, or Firm* — Lee Sullivan Shea & Smith LLP

(57) ABSTRACT

A radio module for a wireless communication node in a wireless mesh network includes a reflectarray antenna having a plurality of antenna elements. Each antenna element of the plurality of antenna elements is configured to receive an incident signal, apply one of two phase shifts to the incident signal, and radiate the phase-shifted signal. The radio module further includes a radio frequency (RF) module comprising a single RF chain configured to feed the incident signal to the plurality of antenna elements in the reflectarray antenna, as well as a control unit that is configured to control which of the two phase shifts is applied by each antenna element in the reflectarray antenna.

16 Claims, 13 Drawing Sheets

Related U.S. Application Data of application No. 17/345,914, filed on Jun. 11, 2021, now Pat. No. 11,246,180, which is a continuation of application No. 16/680,457, filed on Nov. 11, 2019, now Pat. No. 11,044,617, which is a continuation-in-part of application No. 16/590,217, filed on Oct. 1, 2019, now Pat. No. 11,102,834, which is a continuation-in-part of application No. 16/508,289, filed on Jul. 10, 2019, now Pat. No. 10,966,266, application No. 18/081,608, filed on Dec. 14, 2022 is a continuation-in-part of application No. 17/676,626, filed on Feb. 21, 2022, now Pat. No. 11,683,259, which is a continuation of application No. 17/355,445, filed on Jun. 23, 2021, now Pat. No. 11,258,697, which is a continuation of application No. 17/201,857, filed on Mar. 15, 2021, now Pat. No. 11,431,612, which is a continuation of application No. 16/563,564, filed on Sep. 6, 2019, now Pat. No. 10,951,513.

(60) Provisional application No. 62/696,688, filed on Jul. 11, 2018, provisional application No. 62/753,885, filed on Oct. 31, 2018, provisional application No. 62/771,508, filed on Nov. 26, 2018, provisional application No. 62/833,485, filed on Apr. 12, 2019, provisional application No. 62/856,697, filed on Jun. 3, 2019, provisional application No. 62/787,631, filed on Jan. 2, 2019, provisional application No. 62/780,715, filed on Dec. 17, 2018, provisional application No. 62/778,193, filed on Dec. 11, 2018, provisional application No. 62/770,456, filed on Nov. 21, 2018, provisional application No. 62/727,753, filed on Sep. 6, 2018.

(51) Int. Cl.
| | | |
|---|---|---|
| *H04W 28/02* | (2009.01) | |
| *H04W 40/04* | (2009.01) | |
| *H04W 40/20* | (2009.01) | |
| *H04W 76/15* | (2018.01) | |
| *H04W 84/02* | (2009.01) | |
| *H04W 84/22* | (2009.01) | |
| *H04W 88/10* | (2009.01) | |
| *H04W 88/12* | (2009.01) | |
| *H04W 88/14* | (2009.01) | |
| *H04W 92/02* | (2009.01) | |
| *H04W 92/04* | (2009.01) | |
| *H04W 92/16* | (2009.01) | |

(52) U.S. Cl.
CPC ......... *H04W 28/021* (2013.01); *H04W 40/04* (2013.01); *H04W 40/20* (2013.01); *H04W 84/02* (2013.01); *H04W 84/22* (2013.01); *H04W 88/10* (2013.01); *H04W 88/12* (2013.01); *H04W 88/14* (2013.01); *H04W 92/02* (2013.01); *H04W 92/04* (2013.01); *H04W 92/16* (2013.01)

(56) References Cited

U.S. PATENT DOCUMENTS

| | | |
|---|---|---|
| 9,425,985 B1 | 8/2016 | Shousterman et al. |
| 9,538,331 B2 | 1/2017 | Ross |
| 9,621,465 B2 | 4/2017 | Ross |
| 9,860,179 B2 | 1/2018 | Ross |
| 9,942,776 B2 | 4/2018 | Ross et al. |
| 9,973,939 B2 | 5/2018 | Ross |
| 10,027,508 B2 | 7/2018 | Leiba et al. |
| 10,176,212 B1 | 1/2019 | Prohofsky |
| D856,962 S | 8/2019 | Hart et al. |
| 10,530,851 B1 | 1/2020 | Hart |
| 10,530,882 B2 | 1/2020 | Ross |
| 11,941,014 B1 | 3/2024 | Das et al. |
| 2014/0057570 A1 | 2/2014 | Leiba |
| 2015/0358082 A1 | 12/2015 | Ross |
| 2018/0331935 A1 | 11/2018 | Ross et al. |
| 2018/0343685 A1 | 11/2018 | Hart et al. |
| 2021/0336689 A1 | 10/2021 | Ross |
| 2023/0216193 A1* | 7/2023 | Kalateh .............. H01Q 19/10 343/754 |
| 2024/0120968 A1* | 4/2024 | Khosravirad ............ H01Q 3/46 |
| 2024/0134822 A1 | 4/2024 | Shaw et al. |
| 2024/0187502 A1 | 6/2024 | Christner et al. |
| 2024/0195687 A1 | 6/2024 | Shrestha et al. |

OTHER PUBLICATIONS

Non-Final Office Action mailed on Sep. 12, 2024, issued in connection with U.S. Appl. No. 18/081,610, filed Dec. 14, 2022, 12 pages.

* cited by examiner

MESH-BASED COMMUNICATION SYSTEM ARCHITECTURES

CROSS-REFERENCE TO RELATED APPLICATIONS

This application is a continuation-in-part of and claims priority to U.S. Non-Provisional patent application Ser. No. 17/590,608, filed on Feb. 1, 2022 and entitled "Systems And Methods For Improving Wireless Mesh Networks," which in turn is a continuation-in-part of and claims priority to U.S. Non-Provisional patent application Ser. No. 17/345,914, filed on Jun. 11, 2021, entitled "Systems And Methods For Improving Wireless Mesh Networks," and now issued as U.S. Pat. No. 11,246,180, which in turn is a continuation of and claims priority to U.S. Non-Provisional patent application Ser. No. 16/680,457, filed on Nov. 11, 2019, entitled "Systems And Methods For Improving Wireless Mesh Networks," and now issued as U.S. Pat. No. 11,044,617, which in turn is a continuation-in-part of and claims priority to U.S. Non-Provisional patent application Ser. No. 16/590,217, filed on Oct. 1, 2019, entitled "Systems And Methods For Improving Wireless Mesh Networks," and now issued as U.S. Pat. No. 11,102,834, which in turn is a continuation-in-part of and claims priority to U.S. Non-Provisional patent application Ser. No. 16/508,289, filed Jul. 10, 2019, entitled "Systems And Methods For Improving Wireless Mesh Networks," and now issued as U.S. Pat. No. 10,966,266, which in turn claims priority to the following U.S. provisional applications: (i) U.S. Provisional App. No. 62/696,688, filed Jul. 11, 2018 and entitled "Methods For Building Wireless Mesh Network," (ii) U.S. Provisional App. No. 62/753,885, filed Oct. 31, 2018 and entitled "Methods Of Building 60 ghz Mesh Based Network Infrastructure For Blockchain Technology Based Platforms," (iii) U.S. Provisional App. No. 62/771,508, filed Nov. 26, 2018 and entitled "A Method For Improving Wireless Mesh Network Using Direct Optical-To-Rf And Direct-Rf-To-Optical Conversion Module," (iv) U.S. Provisional App. No. 62/833,485, filed Apr. 12, 2019 and entitled "A Method For Building Wireless Mesh Network Nodes," and (v) U.S. Provisional App. No. 62/856,697, filed Jun. 3, 2019 and entitled "A Method For Building Wireless Mesh Network Nodes."

Additionally, this application is also a continuation-in-part of and claims priority to U.S. Non-Provisional patent application Ser. No. 17/676,626, filed on Feb. 21, 2022 and entitled "Systems and Methods for Building Wireless Mesh Networks," which is in turn a continuation of U.S. Non-Provisional patent application Ser. No. 17/355,445, filed on Jun. 23, 2021, entitled "Systems and Methods for Building Wireless Mesh Networks," and now issued as U.S. Pat. No. 11,258,697, which is in turn a continuation of U.S. Non-Provisional patent application Ser. No. 17/201,857, filed on Mar. 15, 2021, entitled "Systems and Methods for Building Wireless Mesh Networks," and now issued as U.S. Pat. No. 11,431,612, which is in turn a continuation of U.S. Non-Provisional patent application Ser. No. 16/563,564, filed Sep. 6, 2019, entitled "Systems and Methods for Building Wireless Mesh Networks," and now issued as U.S. Pat. No. 10,951,513, and in turn which claims priority to the following U.S. provisional applications: (i) U.S. Provisional App. No. 62/787,631, filed Jan. 2, 2019 and entitled "Methods for Building Wireless Mesh Network for a Service Provider," (ii) U.S. Provisional App. No. 62/780,715, filed Dec. 17, 2018 and entitled "Methods for Building Wireless Mesh Network with Wired Links," (iii) U.S. Provisional App. No. 62/778,193, filed Dec. 11, 2018 and entitled "Methods for Building Wireless Mesh Network," (iv) U.S. Provisional App. No. 62/770,456, filed Nov. 21, 2018 and entitled "Methods for Building Wireless Mesh Network," and (v) U.S. Provisional App. No. 62/727,753, filed Sep. 6, 2018 and entitled "Methods for Designing Wireless Mesh Network."

Each of the foregoing patent applications is incorporated herein by reference in its entirety.

BACKGROUND

In today's world, the demand for network-based services that are delivered to end users in a fast and reliable way continues to grow. This includes the demand for high-speed internet service that is capable of delivering upload and download speeds of several hundreds of Megabits per second (Mbps) or perhaps even 1 Gigabit per second (Gbps) or more.

OVERVIEW

Disclosed herein are example architectures for communication systems that are based on fixed wireless mesh networks and are configured to provide any of various types of services to end users, including but not limited to telecommunication services such as high-speed internet that has speeds of several Gigabits per second (Gbps) or more. At a high level, these types of communication systems—which may be referred to herein as "mesh-based communication systems"—may include a plurality of wireless communication nodes that are interconnected together via bi-directional point-to-point (ptp) and/or point-to-multipoint (ptmp) wireless links in order to form a wireless mesh network, where each such wireless communication node comprises respective equipment for operating as part of the wireless mesh network (e.g., equipment for establishing and communicating over one or more bi-directional ptp and/or ptmp wireless links) that has been installed at a respective infrastructure site. As described in detail below, such wireless communication nodes may take any of various forms and be arranged in any of various manners.

For instance, one aspect of the present disclosure is directed to a radio module for a wireless communication node in a wireless mesh network, where the radio module includes (i) a reflectarray antenna comprising a plurality of antenna elements, wherein each antenna element of the plurality of antenna elements is configured to receive an incident signal, apply one of two phase shifts to the incident signal, and radiate the phase-shifted signal, (ii) a radio frequency (RF) module comprising a single RF chain configured to feed the incident signal to the plurality of antenna elements in the reflectarray antenna, and (iii) a control unit that is configured to control which of the two phase shifts is applied by each antenna element in the reflectarray antenna.

The control unit of the radio module may be configured to control which of the two phase shifts is applied by each antenna element in the reflectarray antenna in various ways. In some implementations, controlling which of the two phase shifts is applied by each antenna element in the reflectarray antenna may comprise (i) applying a first phase-shift configuration for signals sent over a first wireless link, wherein applying the first phase-shift configuration comprises causing a first subset of the antenna elements to apply a first one of the two phase shifts and a second subset of the antenna elements to apply a second one of the two phase shifts, and (ii) applying a second phase-shift configuration for signals sent over a second wireless link, wherein applying the second phase-shift configuration comprises causing a third subset of the antenna elements to apply the first one of the two phase shifts and a fourth subset of the antenna elements to apply the second one of the two phase shifts.

In some implementations of the radio module, the first wireless link is with a second wireless communication node in the wireless mesh network, where the second wireless communication node is positioned in a first direction relative to the wireless communication node, and the second wireless link is with a third wireless communication node in the wireless mesh network, where the third wireless communication node is positioned in a second direction that is different from the first direction relative to the wireless communication node.

The plurality of antenna elements of the reflectarray antenna may take various forms. In some implementations, each antenna element of the plurality of antenna elements comprises a patch antenna or a microstrip antenna. Further, in some implementations, each antenna element of the plurality of antenna elements comprises a first edge, a second edge, and a third edge, and applying one of the two phase shifts to the incident signal comprises routing the received incident signal from the first edge to one of the second edge or the third edge. In such implementations, each antenna element of the plurality of antenna elements may comprise (i) a first switch configured to couple the first edge to the second edge and (ii) a second switch configured to couple the first edge to the third edge, where routing the received incident signal from the first edge to the second edge comprises routing the received incident signal through the first switch, and routing the received incident signal from the first edge to the third edge comprises routing the received incident signal through the second switch. Further, in such implementations, controlling which of the two phase shifts is applied by each antenna element in the reflectarray antenna may comprise, for each antenna element in the reflectarray antenna, closing one of its respective first or second switches and opening the other one of its respective first or second switches. Still further, in such implementations, the first and second switches of each antenna element of the plurality of antenna elements may be arranged in a respective complementary switching arrangement, and controlling which of the two phase shifts is applied by each antenna element in the reflectarray antenna may comprise providing a respective 1-bit signal to each respective complementary switching arrangement.

In some implementations of the radio module, the two phase shifts are offset from one another by 180 degrees.

Further, in some implementations of the radio module, the single RF chain comprises a parabolic or lens antenna configured to feed the incident signal to the plurality of antenna elements in the reflectarray antenna.

In another aspect, disclosed herein is a communication system comprising a set of wireless communication nodes that are installed with respective equipment for operating as part of a wireless mesh network, wherein the respective equipment of each wireless communication node in the set includes a respective radio module that includes (i) a reflectarray antenna comprising a plurality of antenna elements, wherein each antenna element of the plurality of antenna elements is configured to receive an incident signal, apply one of two phase shifts to the incident signal, and radiate the phase-shifted signal, (ii) an RF module comprising a single RF chain configured to feed the incident signal to the plurality of antenna elements in the reflectarray antenna, and (iii) a control unit that is configured to control which of the two phase shifts is applied by each antenna element in the reflectarray antenna.

The control unit of each respective radio module of each wireless communication node in the set of wireless communication nodes may be configured to control which of the two phase shifts is applied by each antenna element in the reflectarray antenna in various ways. In some implementations, controlling which of the two phase shifts is applied by each antenna element in the reflectarray antenna may comprise (i) applying a first phase-shift configuration for signals sent over a first wireless link, wherein applying the first phase-shift configuration comprises causing a first subset of the antenna elements to apply a first one of the two phase shifts and a second subset of the antenna elements to apply a second one of the two phase shifts, and (ii) applying a second phase-shift configuration for signals sent over a second wireless link, wherein applying the second phase-shift configuration comprises causing a third subset of the antenna elements to apply the first one of the two phase shifts and a fourth subset of the antenna elements to apply the second one of the two phase shifts.

In some implementations of the communication system, the first wireless link is with a second wireless communication node in the wireless mesh network, where the second wireless communication node is positioned in a first direction relative to the wireless communication node, and the second wireless link is with a third wireless communication node in the wireless mesh network, where the third wireless communication node is positioned in a second direction that is different from the first direction relative to the wireless communication node.

The plurality of antenna elements of the reflectarray antenna of each respective radio module of each wireless communication node in the set of wireless communication nodes may take various forms. In some implementations, each antenna element of the plurality of antenna elements comprises a patch antenna or a microstrip antenna. Further, in some implementations, each antenna element of the plurality of antenna elements comprises a first edge, a second edge, and a third edge, and applying one of the two phase shifts to the incident signal comprises routing the received incident signal from the first edge to one of the second edge or the third edge. In such implementations, each antenna element of the plurality of antenna elements may comprise (i) a first switch configured to couple the first edge to the second edge and (ii) a second switch configured to couple the first edge to the third edge, where routing the received incident signal from the first edge to the second edge comprises routing the received incident signal through the first switch, and routing the received incident signal from the first edge to the third edge comprises routing the received incident signal through the second switch. Further, in such implementations, controlling which of the two phase shifts is applied by each antenna element in the reflectarray antenna may comprise, for each antenna element in the reflectarray antenna, closing one of its respective first or second switches and opening the other one of its respective first or second switches. Still further, in such implementations, the first and second switches of each antenna element of the plurality of antenna elements may be arranged in a respective complementary switching arrangement, and controlling which of the two phase shifts is applied by each antenna element in the reflectarray antenna may comprise providing a respective 1-bit signal to each respective complementary switching arrangement.

In some implementations of the communication system, the two phase shifts are offset from one another by 180 degrees.

Further, in some implementations of the communication system, the single RF chain comprises a parabolic or lens antenna configured to feed the incident signal to the plurality of antenna elements in the reflectarray antenna.

The foregoing has outlined rather broadly the features and technical advantages of examples according to this disclosure so that the following detailed description may be better understood. Additional features and advantages will be described below. It should be understood that the specific examples disclosed herein may be readily utilized as a basis for modifying or designing other structures for carrying out the same operations disclosed herein. Characteristics of the concepts disclosed herein including their organization and method of operation together with associated advantages will be better understood from the following description when considered in connection with the accompanying figures. It should be understood that the figures are provided for the purpose of illustration and description only.

One of ordinary skill in the art will appreciate these as well as numerous other aspects in reading the following disclosure.

BRIEF DESCRIPTION OF THE DRAWINGS

A further understanding of the nature and advantages the present disclosure may be realized by reference to the following drawings.

DETAILED DESCRIPTION

Figure 1A:
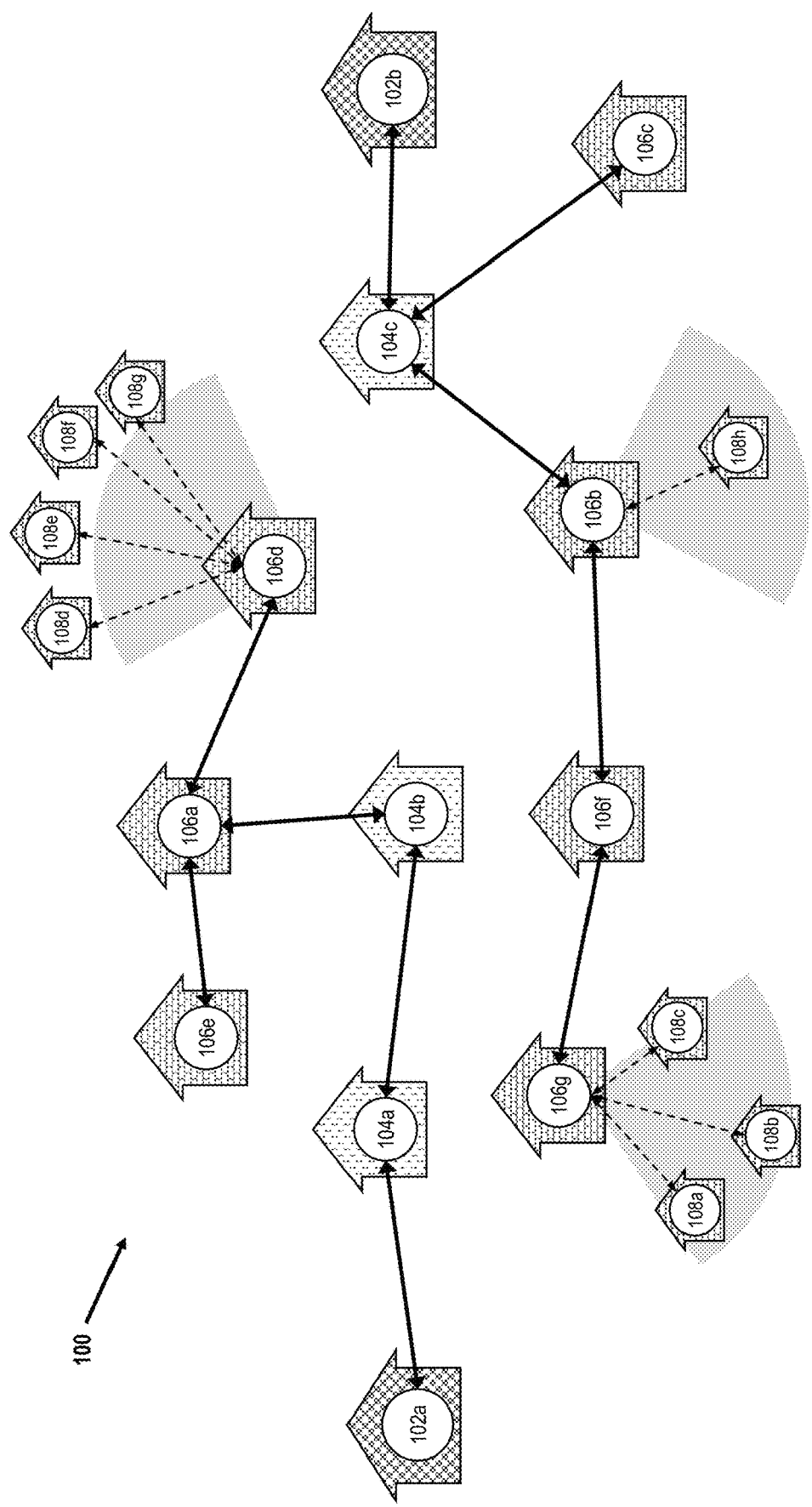
FIG. 1A depicts a simplified illustrative diagram of an example portion of an example mesh-based communication system that may be designed, implemented, and deployed in accordance with aspects of the disclosed technology.

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Mesh-Based Communication System Architectures

Disclosed herein are example architectures for communication systems that are based on fixed wireless mesh networks and are configured to provide any of various types of services to end users, including but not limited to telecommunication services such as high-speed internet that has speeds of several Gigabits per second (Gbps) or more. At times, these communication systems are referred to herein as "mesh-based communication systems."

In accordance with the example architectures disclosed herein, a mesh-based communication system may comprise a plurality of wireless communication nodes that are interconnected together via bi-directional point-to-point (ptp) and/or point-to-multipoint (ptmp) wireless links in order to form a wireless mesh network, where each such wireless communication node comprises respective equipment for operating as part of the wireless mesh network (e.g., equipment for establishing and communicating over one or more bi-directional ptp and/or ptmp wireless links) that has been installed at a respective infrastructure site. Further, in at least some embodiments, the plurality of wireless communication nodes may comprise multiple different "tiers" of wireless communication nodes that serve different roles within the wireless mesh network, such as by performing different functionality within the wireless mesh network and/or establishing and communicating over different types of ptp and/or ptmp wireless links within the wireless mesh network, and may thus be installed with different kinds of equipment for operating as part of the wireless mesh network (e.g., different hardware and/or software).

For instance, in such a mesh-based communication system, the wireless mesh network may include (i) a first tier of wireless communication nodes (which may be referred to herein as "first-tier nodes") that are each installed at a respective infrastructure site having high-capacity access to a core network, which may be referred to as a Point of Presence ("PoP") or an access point for the core network, (ii) a second tier of wireless communication nodes (which may be referred to herein as "second-tier nodes") that are each installed at a respective infrastructure site and primarily serve to extend the high-capacity access to the core network from the first-tier nodes to other geographic locations within the wireless mesh network's intended coverage area by forming one or more high-capacity pathways (e.g., in the range of 10 Gbps) for routing aggregated network traffic that originated from or is destined to the core network, (iii) a third tier of wireless communication nodes (which may be referred to herein as "third-tier nodes") that are each installed at a respective infrastructure site and primarily serve to form discrete sub-meshes that extend from second-tier nodes and are to route aggregated network traffic to and from endpoints within a particular portion of the wireless mesh network's intended coverage area, and (iv) a fourth tier of wireless communication nodes (which may be referred to herein as "fourth-tier nodes") that are each installed at a respective infrastructure site and primarily serve to further extend the wireless mesh network to other endpoints within the wireless mesh network's intended coverage area via wireless links that originate from second-tier and/or third-tier nodes and are to route network traffic (e.g., individual traffic) to and from the fourth-tier nodes.

However, it should be understood that the tiers of wireless communication nodes could take various other forms as well, including but not limited to the possibility that a mesh-based communication system may have not have all four of the tiers described above and/or that a mesh-based communication system may have one or more other tiers of wireless communication nodes that serve other roles within the wireless mesh network. Further, it should be understood that each tier of wireless communication nodes could include any number of wireless communication nodes, including but not limited to the possibility that in some implementations, one of more of the tiers could include as little as a single wireless communication node (e.g., a wireless mesh network deployed in a sparsely-populated area), while in other implementations, one of more of the tiers could include many thousands of nodes (e.g., a wireless mesh network deployed in a densely-populated area or a wireless mesh network that spans a large geographic area).

The wireless communication nodes in each of the foregoing tiers will now be described in further detail.

Beginning with the mesh-based communication system's first tier of wireless communication nodes, in line with the discussion above, each first-tier node is installed at an infrastructure site equipped to serve as a PoP that provides high-capacity access to a core network, and may also be directly connected downstream to one or more other wireless communication nodes in another tier of the wireless mesh network via one or more bi-directional ptp or ptmp wireless links. In this respect, each first-tier node may function to (i) exchange bi-directional network traffic with the core network via a high-capacity fiber connection (e.g., dark or lit fiber) between the infrastructure site and the core network, such as a fiber link comprising one or more fiber strands that collectively have a capacity in the range of tens or even hundreds of Gbps, and (ii) exchange bi-directional network traffic with one or more other wireless communication nodes in another tier of the wireless mesh network via one or more ptp or ptmp wireless links, such as one or more second-tier node that serve to extend the first-tier node's high-capacity access the core network to other geographic locations. Further, in at least some implementations, a first-tier node may function to deliver the service being provided by the mesh-based communication system (e.g., a high-speed internet service) to the first-tier node's infrastructure site, such that individuals present at the first-tier node's infrastructure site can utilize that service. A first-tier node may perform other functions as well.

The infrastructure site at which each first-tier node is installed may take any of various forms. For instance, as one possibility, a first-tier node's infrastructure site could be a commercial building that has fiber connectivity to a core network and also provides a suitable location for installation of equipment for establishing and communicating over wireless links with other wireless communication nodes (e.g., a location that has sufficient line-of-sight (LOS) to other infrastructure sites), such as a particular section of the building's rooftop or a particular spot along the side of the building. In such an implementation, in addition to exchanging bi-directional network traffic with the core network and other nodes of the wireless mesh network, the first-tier node installed at the commercial building may also function to deliver the service being provided by the mesh-based communication system (e.g., a high-speed internet service) to the commercial building such that individuals in the commercial building can make use of that service. As another possibility, a first-tier node's infrastructure site could be a support structure such as a tower (e.g., a cell tower) or a pole that has fiber connectivity to a core network and provides a suitable location for installation of equipment for operating as part of the wireless mesh network. A first-tier node's infrastructure site could take some other form as well, including but not limited to the possibility that a first-tier node's infrastructure site could be a residential building to the extent that the residential building has fiber connectivity to a core network and provides a suitable location for installation of equipment for operating as part of the wireless mesh network.

The equipment for each first-tier node may also take any of various forms. To begin, a first-tier node's equipment may include wireless mesh equipment for establishing a wireless connection with one or more second-tier nodes. For instance, a first-tier node's wireless mesh equipment may be configured to establish and communicate over either (i) a respective bi-directional ptp wireless link with each of the one or more wireless communication nodes in another tier or (ii) a bi-directional ptmp wireless link (or perhaps multiple bi-directional ptmp wireless links) with the one or more wireless communication nodes in another tier. Other implementations of a first-tier node's wireless mesh equipment are possible as well, including but not limited to the possibility that a first-tier node's wireless mesh equipment may be configured to establish and communicate with the one or more wireless communication nodes in another tier over a combination of ptp and ptmp wireless links (e.g., a ptp wireless link with one particular node and a ptmp wireless link with one or more other nodes) and/or that a first-tier node's wireless mesh equipment may additionally be configured to interface and communicate with a core network via the PoP's high-capacity fiber connection. Additionally, a first-tier node's equipment may include networking equipment (e.g., one or more modems, routers, switches, or the like) that facilitates communication between the first-tier node's wireless mesh equipment and other devices or systems located at the first-tier node's infrastructure site (e.g., end-user devices), and perhaps also facilitates communication between the first-tier node's wireless mesh equipment and the core network via the PoP's high-capacity fiber connection (to the extent that such communication is not handled directly by the wireless mesh equipment itself). Additionally yet, a first-tier node's equipment may include power equipment for supplying power to the wireless mesh equipment and/or the networking equipment, such as power and/or battery units. A first-tier node's equipment may take various other forms as well.

A first-tier node of the wireless mesh network may take various other forms as well.

Turning to the mesh-based communication system's second tier of wireless communication nodes, as noted above, each second-tier node is installed at a respective infrastructure site and primarily serves to extend the high-capacity access to the core network from the first-tier nodes to other geographic locations by forming a high-capacity pathway (e.g., in the range of 10 Gbps) for routing aggregated network traffic that originated from or is destined to the core network. In this respect, such a high-capacity pathway extending from a first-tier node could take various forms. As one possibility, a high-capacity pathway extending from a given first-tier node could be a single-hop pathway comprising a single high-capacity wireless link that is established between the given first-tier node and one given second-tier node. As another possibility, a high-capacity pathway extending from a given first-tier node could be a multi-hop pathway comprising a chain of multiple high-capacity wireless links (which may also referred to herein as a "spine") that includes a first high-capacity wireless link established between the given first-tier node and a first second-tier node as well as one or more additional high-capacity wireless links that are each established between a successive pair of second-tier nodes (e.g., a second high-capacity wireless link established between the first second-tier node and a second second-tier node, a third high-capacity wireless link established between the second second-tier node and a third second-tier node, and so on). Further, in some implementations, such a multi-hop pathway could be connected to one first-tier node a first end of the multi-hop pathway (e.g., via a first high-capacity wireless link between first-tier and second-tier nodes) and be connected to another first-tier node on a second end of the multi-hop pathway (e.g., via a first high-capacity wireless link between first-tier and second-tier nodes). Further yet, in some implementations, a given first-tier node's high-capacity access to the core network could be extended via multiple different high-capacity pathways formed by second-tier nodes, where each respective high-capacity pathway could either be a single-hop pathway or a multi-hop pathway.

Thus, depending on where a second-tier node is situated within such a pathway, the second-tier node could either be (i) directly connected to a first-tier node via a bi-directional ptp or ptmp wireless link but not directly connected to any other second-tier node (e.g., if the high-capacity pathway is a single-hop pathway), (ii) directly connected to a first-tier node via a first bi-directional ptp or ptmp wireless link and also directly connected to another second-tier node via a second bi-directional ptp or ptmp wireless link, or (iii) directly connected to two other second-tier nodes via respective bi-directional ptp or ptmp wireless links. And relatedly, depending on where a second-tier node is situated within such a pathway, the second-tier node may function to exchange bi-directional network traffic along the high-capacity pathway either (i) with a single other node (e.g., a single first-tier node or a single other second-tier node) or (ii) with each of two other nodes (e.g., one first-tier node and one other second-tier node or two other second-tier nodes).

Further, in addition to each second-tier node's role in forming the one or more high-capacity pathways that extend from the one or more first-tier nodes, each of at least a subset of the second-tier nodes may also be directly connected downstream to one or more third-tier nodes via one or more bi-directional ptp or ptmp wireless links, in which case each such second-tier node may additionally function to exchange bi-directional network traffic with one or more third-tier nodes as part of a discrete sub-mesh that is configured to route aggregated network traffic to and from endpoints within a particular geographic area.

Further yet, in at least some implementations, each of at least a subset of the second-tier nodes may also be directly connected downstream to one or more fourth-tier nodes via one or more bi-directional ptp or ptmp wireless links, in which case each such second-tier node may additionally function to exchange bi-directional network traffic with one or more fourth-tier nodes.

Still further, in at least some implementations, a second-tier node may function to deliver the service being provided by the mesh-based communication system (e.g., a high-speed internet service) to the second-tier node's infrastructure site, such that individuals present at the second-tier node's infrastructure site can utilize that service. In this way, a second-tier node can serve as both a "relay" for bi-directional network traffic and also as an "access point" for the service provided by the mesh-based communication system. A second-tier node may perform other functions as well.

The infrastructure sites at which the second-tier nodes are installed may take any of various forms, and in at least some implementations, a second-tier node's infrastructure site may comprise private property associated with a respective customer of the service being provided by the mesh-based communication system. For instance, as one possibility, a second-tier node's infrastructure site could be a residential building that is associated with a customer of the service being provided by the mesh-based communication system and provides a suitable location for installation of equipment for establishing and communicating over wireless links with other wireless communication nodes (e.g., a location that has sufficient LOS to other infrastructure sites), such as a particular section of the residential building's rooftop or a particular spot along the side of the residential building. For example, such a residential building could take the form of a detached single-family home, a townhouse, or a multi-dwelling unit (MDU) where a customer of the service being provided by the mesh-based communication system resides, among other examples. In such an implementation, in addition to exchanging bi-directional network traffic with other nodes of the wireless mesh network, the second-tier node installed at the residential building may also function to deliver the service being provided by the mesh-based communication system (e.g., a high-speed internet service) to the residential building such that the customer (and/or other individuals at the residential building) can make use of that service.

As another possibility, a second-tier node's infrastructure site could be a commercial building that is associated with a customer of the service being provided by the mesh-based communication system and provides a suitable location for establishing and communicating over wireless links with other wireless communication nodes (e.g., a location that has sufficient LOS to other infrastructure sites), such as a particular section of the commercial building's rooftop or a particular spot along the side of the commercial building. For example, such a commercial building could take the form of an office building where a customer of the service being provided by the mesh-based communication system owns or leases office space, among other examples. In such an implementation, in addition to exchanging bi-directional network traffic with other nodes of the wireless mesh network, the second-tier node installed at the commercial building may also function to deliver the service being provided by the mesh-based communication system (e.g., a high-speed internet service) to the commercial building such that the customer (and/or other individuals at the commercial building) can make use of that service.

A second-tier node's infrastructure site could take some other form as well, including but not limited to the possibility that a second-tier node's infrastructure site could be a support structure such as a tower or pole that is located on private property owned or occupied by a customer of the service being provided by the mesh-based communication system.

The equipment for each second-tier node may take any of various forms. To begin, a second-tier node's equipment may include wireless mesh equipment for establishing a wireless connection with one or more other nodes of the wireless mesh network, which may take various forms depending on where the second-tier node sits within the network arrangement. For instance, if a second-tier node is of a type that is to establish a wireless connection with a first-tier node as part of forming a high-capacity pathway to that first-tier node, the second-tier node's wireless mesh equipment may be configured to establish and communicate over either (i) a high-capacity bi-directional ptp wireless link with the first-tier node or (ii) a high-capacity bi-directional ptmp wireless link with the first-tier node, among other possibilities. Further, if a second-tier node is of a type that is to establish a wireless connection with either one or two peer second-tier nodes as part of forming a high-capacity pathway to a first-tier node, the second-tier node's wireless mesh equipment may be configured to establish and communicate over either (i) a respective bi-directional ptp wireless link with each peer second-tier node or (ii) a bi-directional ptmp wireless link (or perhaps multiple bi-directional ptmp wireless links) with the one or two peer second-tier nodes, among other possibilities. Further yet, if a second-tier node is of a type that is to establish a wireless connection with one or more third-tier nodes, the second-tier node's wireless mesh equipment may be configured to establish and communicate over either (i) a respective bi-directional ptp wireless link with each of the one or more third-tier nodes or (ii) a bi-directional ptmp wireless link (or perhaps multiple bi-directional ptmp wireless links) with the one or more third-tier nodes, among other possibilities. Still further, if a second-tier node is of a type that is to establish a wireless connection with one or more fourth-tier nodes, the second-tier node's wireless mesh equipment may be configured to establish and communicate over either (i) a respective bi-directional ptp wireless link with each of the one or more fourth-tier nodes or (ii) a bi-directional ptmp wireless link (or perhaps multiple bi-directional ptmp wireless links) with the one or more fourth-tier nodes, among other possibilities. Other implementations of a second-tier node's wireless mesh equipment are possible as well. Additionally, a second-tier node's equipment may include networking equipment (e.g., one or more modems, routers, switches, or the like) that facilitates communication between the second-tier node's wireless mesh equipment and other devices or systems located at the second-tier node's infrastructure site, such as end-user devices. Additionally yet, a second-tier node's equipment may include power equipment for supplying power to the wireless mesh equipment and/or the networking equipment, such as power and/or battery units. A second-tier node's equipment may take various other forms as well.

A second-tier node of the wireless mesh network may take various other forms as well.

Turning next to mesh-based communication system's third tier of wireless communication nodes, as noted above, each third-tier node is installed at a respective infrastructure site and primarily serves to form a discrete sub-mesh that extends from at least one second-tier node and functions to route aggregated network traffic to and from endpoints within a particular geographic area. In this respect, each third-tier node may be directly connected to one or more other nodes within the second and/or third tiers via one or more bi-directional ptp or ptmp wireless links.

For instance, as one possibility, a third-tier node could be directly connected to (i) a second-tier node via a bi-directional ptp or ptmp wireless link as well as (ii) one or more peer third-tier nodes via one or more bi-directional ptp or ptmp wireless links, in which case the third-tier node may function to exchange bi-directional network traffic with the second-tier node and each of the one or more peer third-tier nodes as part of a discrete sub-mesh. As another possibility, a third-tier node could be directly connected to one or more peer third-tier nodes via one or more bi-directional ptp or ptmp wireless links, but not be directly connected to any second-tier node, in which case the third-tier node may function to exchange bi-directional network traffic with each of the one or more peer third-tier nodes as part of a discrete sub-mesh. As yet another possibility, a third-tier node could be directly connected to a second-tier node via a bi-directional ptp or ptmp wireless link, but not be directly connected to any peer third-tier node, in which case the third-tier node may function to exchange bi-directional network traffic with the second-tier node of a discrete sub-mesh. Other configurations are possible as well.

Further, each of at least a subset of the third-tier nodes may also be directly connected downstream to one or more fourth-tier nodes via one or more bi-directional ptp or ptmp wireless links, in which case each such third-tier node may additionally function to exchange individual network traffic to and from each of the one or more fourth-tier nodes.

Further yet, in at least some implementations, a third-tier node may function to deliver the service being provided by the mesh-based communication system (e.g., a high-speed internet service) to the third-tier node's infrastructure site, such that individuals present at the third-tier node's infrastructure site can utilize that service. In this way, certain of the third-tier nodes (e.g., third-tier nodes that are connected to at least two other wireless communication nodes) can serve as both a "relay" for bi-directional network traffic and also as an "access point" for the service provided by the mesh-based communication system, while others of the third-tier nodes (e.g., third-tier nodes that are only connected to a single other wireless communication node) may only serve as an "access point" for the service provided by the mesh-based communication system. A third-tier node may perform other functions as well.

As with the second-tier nodes, the infrastructure sites at which the third-tier nodes are installed may take any of various forms, and in at least some implementations, a third-tier node's infrastructure site may comprise private property associated with a respective customer of the service being provided by the mesh-based communication system. For instance, as one possibility, a third-tier node's infrastructure site could be a residential building that is associated with a customer of the service being provided by the mesh-based communication system and provides a suitable location for installation of equipment for establishing and communicating over wireless links with other wireless communication nodes (e.g., a location that has sufficient LOS to other infrastructure sites), such as a particular section of the residential building's rooftop or a particular spot along the side of the residential building. For example, such a residential building could take the form of a detached single-family home, a townhouse, or an MDU where a customer of the service being provided by the mesh-based communication system resides, among other examples. In such an implementation, in addition to exchanging bi-directional network traffic with other nodes of the wireless mesh network, the third-tier node installed at the residential building may also function to deliver the service being provided by the mesh-based communication system (e.g., a high-speed internet service) to the residential building such that the customer (and/or other individuals at the residential building) can make use of that service.

As another possibility, a third-tier node's infrastructure site could be a commercial building that is associated with a customer of the service being provided by the mesh-based communication system and provides a suitable location for installation of equipment for establishing and communicating over wireless links with other wireless communication nodes (e.g., a location that has sufficient LOS to other infrastructure sites), such as a particular section of the commercial building's rooftop or a particular spot along the side of the commercial building. For example, such a commercial building could take the form of an office building where a customer of the service being provided by the mesh-based communication system owns or leases office space, among other examples. In such an implementation, in addition to exchanging bi-directional network traffic with other nodes of the wireless mesh network, the third-tier node installed at the commercial building may also function to deliver the service being provided by the mesh-based communication system (e.g., a high-speed internet service) to the commercial building such that the customer (and/or other individuals at the commercial building) can make use of that service.

A third-tier node's infrastructure site could take some other form as well, including but not limited to the possibility that a third-tier node's infrastructure site could be a support structure such as a tower or pole that is located on private property owned or occupied by a customer of the service delivered by the mesh-based communication system.

The equipment for each third-tier node may also take any of various forms. To begin, a third-tier node's equipment may include wireless mesh equipment for establishing a wireless connection with one or more other nodes of the wireless mesh network, which may take various forms depending on where the third-tier node sits within the network arrangement. For instance, if a third-tier node is of a type that is to establish a wireless connection with at least one second-tier node, the third-tier node's wireless mesh equipment may be configured to establish and communicate over either (i) a bi-directional ptp wireless link with the at least one second-tier node or (ii) a bi-directional ptmp wireless link with the at least one second-tier node, among other possibilities. Further, if a third-tier node is of a type that is to establish a wireless connection with one or more peer third-tier nodes, the third-tier node's wireless mesh equipment may be configured to establish and communicate over either (i) a respective bi-directional ptp wireless link with each of the one or more peer third-tier nodes or (ii) a bi-directional ptmp wireless link (or perhaps multiple bi-directional ptmp wireless links) with the one or more peer third-tier nodes, among other possibilities. Further yet, if a third-tier node is of a type that is to establish a wireless connection with one or more fourth-tier nodes, the third-tier node's wireless mesh equipment may be configured to establish and communicate over either (i) a respective bi-directional ptp wireless link with each of the one or more fourth-tier nodes or (ii) a bi-directional ptmp wireless link (or perhaps multiple bi-directional ptmp wireless links) with the one or more fourth-tier nodes, among other possibilities. Other implementations of a third-tier node's wireless mesh equipment are possible as well. Additionally, a third-tier node's equipment may include networking equipment (e.g., one or more modems, routers, switches, or the like) that facilitates communication between the third-tier node's wireless mesh equipment and other devices or systems located at the third-tier node's infrastructure site, such as end-user devices. Additionally yet, a third-tier node's equipment may include power equipment for supplying power to the wireless mesh equipment and/or the networking equipment, such as power and/or battery units. A third-tier node's equipment may take various other forms as well.

A third-tier node of the wireless mesh network may take various other forms as well.

Turning lastly to the wireless mesh network's fourth tier of "fourth-tier nodes," as noted above, each fourth-tier node is installed at a respective infrastructure site and primarily serves to further extend the wireless mesh network to another endpoint via a wireless link that originates from second-tier or third-tier node and is to route network traffic to and from the fourth-tier node (and perhaps also one or more other fourth-tier nodes). In this respect, each fourth-tier node may be directly connected upstream to at least one second-tier or third-tier node via at least one bi-directional ptp or ptmp wireless link, and may function to exchange bi-directional network traffic with the at least one second-tier or third-tier node. Further, in most implementations, a fourth-tier node may function to deliver the service being provided by the mesh-based communication system (e.g., a high-speed internet service) to the fourth-tier node's infrastructure site, such that individuals present at the fourth-tier node's infrastructure site can utilize that service. In this way, a fourth-tier node can serve as an "access point" for the service provided by the mesh-based communication system, but unlike the second-tier and third-tier nodes, may not necessarily serve as a "relay" for bi-directional network traffic. A fourth-tier node may perform other functions as well.

The infrastructure sites at which the fourth-tier nodes are installed may take any of various forms, and in at least some implementations, a fourth-tier node's infrastructure site may comprise private property associated with a respective customer of the service being provided by the mesh-based communication system. For instance, as one possibility, a fourth-tier node's infrastructure site could be a residential building that is associated with a customer of the service being provided by the mesh-based communication system and provides a suitable location for installation of equipment for establishing and communicating over wireless links with other wireless communication nodes (e.g., a location that has sufficient LOS to other infrastructure sites), such as a particular section of the residential building's rooftop or a particular spot along the side of the residential building. For example, such a residential building could take the form of a detached single-family home, a townhouse, or a MDU where a customer of the service being provided by the mesh-based communication system resides, among other examples. In such an implementation, in addition to exchanging bi-directional network traffic with other nodes of the wireless mesh network, the fourth-tier node installed at the residential building may also function to deliver the service being provided by the mesh-based communication system (e.g., a high-speed internet service) to the residential building such that the customer (and/or other individuals at the residential building) can make use of that service.

As another possibility, a fourth-tier node's infrastructure site could be a commercial building that is associated with a customer of the service being provided by the mesh-based communication system and provides a suitable location for installation of equipment for establishing and communicating over wireless links with other wireless communication nodes (e.g., a location that has sufficient LOS to other infrastructure sites), such as a particular section of the commercial building's rooftop or a particular spot along the side of the commercial building. For example, such a commercial building could take the form of an office building where a customer of the service being provided by the mesh-based communication system owns or leases office space, among other examples. In such an implementation, in addition to exchanging bi-directional network traffic with other nodes of the wireless mesh network, the fourth-tier node installed at the commercial building may also function to deliver the service being provided by the mesh-based communication system (e.g., a high-speed internet service) to the commercial building such that the customer (and/or other individuals at the commercial building) can make use of that service.

A fourth-tier node's infrastructure site could take some other form as well, including but not limited to the possibility that a fourth-tier node's infrastructure site could be a support structure such as a tower or pole that is located on private property owned or occupied by a customer of the service being provided by the mesh-based communication system.

The equipment for each fourth-tier node may take any of various forms. To begin, a fourth-tier node's equipment may include wireless mesh equipment for establishing a wireless connection with at least one upstream node. For instance, a fourth-tier node's wireless mesh equipment may be configured to establish and communicate over either (i) a bi-directional ptp wireless link with the at least one upstream node or (ii) a bi-directional ptmp wireless link with the at least one upstream node. Other implementations of a fourth-tier node's wireless mesh equipment are possible as well. Additionally, a fourth-tier node's equipment may include networking equipment (e.g., one or more modems, routers, switches, or the like) that facilitates communication between the fourth-tier node's wireless mesh equipment and other devices or systems located at the fourth-tier node's infrastructure site, such as end-user devices. Additionally yet, a fourth-tier node's equipment may include power equipment for supplying power to the wireless mesh equipment and/or the networking equipment, such as power and/or battery units. A fourth-tier node's equipment may take various other forms as well.

A fourth-tier node of the wireless mesh network may take various other forms as well.

As noted above, the wireless mesh network's tiers of wireless communication nodes may take various other forms as well. For instance, as one possibility, the wireless mesh network designed in accordance with the present disclosure may include first-tier nodes, second-tier nodes, and third-tier nodes, but not fourth-tier nodes for extending the discrete sub-meshes to other endpoints. As another possibility, the wireless mesh network designed in accordance with the present disclosure may include first-tier nodes, third-tier nodes, and fourth-tier nodes, but not second-tier nodes—in which case there may be no high-capacity pathway that extends from the first-tier nodes and discrete sub-meshes formed by third-tier nodes may extend directly from the first-tier nodes rather than extending from second-tier nodes. As yet another possibility, the wireless mesh network designed in accordance with the present disclosure may include first-tier nodes, second-tier nodes, and fourth-tier nodes, but not third-tier nodes—in which case there may be no discrete sub-meshes that extend from second-tier nodes. As still yet another possibility, the wireless mesh network designed in accordance with the present disclosure may include a fifth tier of nodes that are each directly connected upstream to a respective fourth-tier node via a bi-directional ptp or ptmp wireless link. The wireless mesh network's tiers of wireless communication nodes may take various other forms as well.

Returning to the overall architecture of the mesh-based communication system, in at least some implementations, the mesh-based communication system may additionally include a tier of wired communication nodes that are each installed at an infrastructure site and directly connected to at least one wireless communication node of the wireless mesh network via at least one bi-directional wired link, in which case each such wired communication node may function to exchange bi-directional network traffic with the at least one wireless communication node of the wireless mesh network. For instance, a wired communication node could potentially be connected to any of a first-tier node, a second-tier node, a third-tier node, or a fourth-tier node, although in some network arrangements, wired communication nodes may only be directly connected to nodes in certain tiers (e.g., only third-tier and/or fourth-tier nodes). Further, in most implementations, a wired communication node may function to deliver the service being provided by the mesh-based communication system (e.g., a high-speed internet service) to the wired communication node's infrastructure site, such that individuals present at the wired communication node's infrastructure site can utilize that service. A wired communication node may perform other functions as well.

The infrastructure sites at which the wired communication nodes are installed may take any of various forms, and in at least some implementations, a wired communication node's infrastructure site may comprise private property associated with a respective customer of the service being provided by the mesh-based communication system. For instance, as one possibility, a wired communication node's infrastructure site could be a residential building that is associated with a customer of the service being provided by the mesh-based communication system and provides a suitable location for installation of equipment for establishing a wired connection to at least one wireless communication node within the mesh-based communication system. For example, such a residential building could take the form of a detached single-family home, a townhouse, or a MDU where a customer of the service being provided by the mesh-based communication system resides, among other examples. In such an implementation, in addition to exchanging bi-directional network traffic with the at least one wireless communication node to which it is connected, the wired communication node installed at the residential building may also function to deliver the service being provided by the mesh-based communication system (e.g., a high-speed internet service) to the residential building such that the customer (and/or other individuals at the residential building) can make use of that service.

As another possibility, a wired communication node's infrastructure site could be a commercial building that is associated with a customer of the service being provided by the mesh-based communication system and provides a suitable location for installation of equipment for establishing a wired connection to at least one wireless communication node within the mesh-based communication system. For example, such a commercial building could take the form of an office building where a customer of the service being provided by the mesh-based communication system owns or leases office space, among other examples. In such an implementation, in addition to exchanging bi-directional network traffic with the at least one wireless communication node to which it is connected, the wired communication node installed at the commercial building may also function to deliver the service being provided by the mesh-based communication system (e.g., a high-speed internet service) to the commercial building such that the customer (and/or other individuals at the commercial building) can make use of that service.

A wired communication node's infrastructure site could take some other form as well.

Further, the equipment for each wired communication node may take any of various forms. To begin, a wired communication node's equipment may include networking equipment (e.g., one or more modems, routers, switches, or the like) that facilitates communication between (i) any wireless communication node to which the wired communication node is connected via the at least one bi-directional wired link and (ii) other devices or systems located at the second-tier node's infrastructure site. In this respect, a wired communication node's networking equipment may be configured to establish a wired connection with certain equipment of at least one wireless communication node via a bi-directional wired link, and correspondingly, certain equipment of each wireless communication node that is connected to a wired communication node (e.g., wireless mesh equipment or networking equipment) may be configured to facilitate communication between the wireless communication node's wireless mesh equipment and the wired communication node's networking equipment via the bi-directional wired link. Additionally, a wired communication node's equipment may include power equipment for supplying power to the networking equipment, such as power and/or battery units. A wired communication node's equipment may take various other forms as well.

Further yet, each bi-directional wired link between a wired communication node and a wireless communication node may take any of various forms. As one possibility, a bi-directional wired link between a wired communication node and a wireless communication node may take the form of a copper-based wired link, such as a coaxial cable or an Ethernet cable (e.g., an unshielded or shielded twisted-pair copper cable designed in accordance with a given Ethernet cable category), among other possibilities. As another possibility, a bi-directional wired link between a wired communication node and a wireless communication node may take the form of a fiber-based wired link, such as a glass optical fiber cable or a plastic optical fiber cable. A bi-directional wired link between a wired communication node and a wireless communication node could take other forms as well.

The communication nodes included within the mesh-based communication system may take various other forms as well.

Along with the communication nodes described above, which comprise equipment installed at infrastructure sites, the mesh-based communication system may further include client devices that are each capable of (i) connecting to a wireless or wired communication node of the mesh-based communication system and (ii) exchanging bi-directional network traffic over the connection with the communication node so as to enable the client device and its end user to utilize the service being provided by the mesh-based communication system (e.g., a high-speed internet service). These client devices may take any of various forms.

As one possibility, a client device may take the form of a computer, tablet, mobile phone, or smart home device located at an infrastructure site for a communication node of the mesh-based communication system that is connected to the communication node via networking equipment at the infrastructure site (e.g., a modem/router that provides an interface between the node's wireless mesh equipment and the client devices).

As another possibility, a client device may take the form of a mobile or customer-premises device that is capable of establishing and communicating over a direct wireless connection (e.g., via a bi-directional ptp or ptmp wireless link) with a wireless communication node of the wireless mesh network. In this respect, a client device may establish a direct wireless connection with any of various wireless communication nodes of the wireless mesh network, including but not limited to the wireless communication node of the wireless mesh network with which the client device is able to establish the strongest wireless connection regardless of tier (e.g., the wireless communication node that is physically closest to the client device) or the wireless communication node in a particular tier or subset of tiers (e.g., the third and/or fourth tiers) with which the client device is able to establish the strongest wireless connection, among other possibilities. To facilitate this functionality, at least a subset of the wireless communication nodes of the wireless mesh network may have wireless mesh equipment that, in addition to communicating with one or more other wireless communication nodes via one or more wireless links, is also capable of communicating with client devices via one or more wireless links. In this respect, the equipment for communicating with client devices could be the same equipment that facilitates communication with one or more other wireless communication nodes (e.g., a single ptmp radio that connects to both wireless communication nodes and client devices), or could be different equipment (e.g., a first ptmp radio for communicating with wireless communication nodes and a second ptmp radio for communicating with client devices). Further, it should be understood that the particular wireless communication node of the wireless mesh network to which a client device is wirelessly connected may change over the course of time (e.g., if the client device is a mobile device that moves to a different location). A client device may take other forms as well.

As discussed above, the wireless communication nodes of the wireless mesh network may be interconnected via bi-directional wireless links that could take the form of bi-directional ptp wireless links, bi-directional ptmp wireless links, or some combination thereof. These bi-directional ptp and/or ptmp wireless links may take any of various forms.

Beginning with the bi-directional ptp wireless links, each bi-directional ptp wireless link that is established between two wireless communication nodes of the wireless mesh network may have any of various different beamwidths. For instance, as one possibility, a bi-directional ptp wireless link that is established between two wireless communication nodes of the wireless mesh network may have a 3 dB-beamwidth in either or both of the horizontal and vertical directions that is less than 5 degrees—or in some cases, even less than 1 degree—which would generally be classified as an "extremely-narrow" beamwidth. As another possibility, a bi-directional ptp wireless link that is established between two wireless communication nodes of the wireless mesh network may have a 3 dB-beamwidth in either or both of the horizontal and vertical directions that is within a range of 5 degrees and 10 degrees (e.g., a beamwidth of 5-7 degrees), which would generally be classified as a "narrow" beamwidth but not necessarily an "extremely-narrow" beamwidth. As yet another possibility, a bi-directional ptp wireless link that is established between two wireless communication nodes of the wireless mesh network may have a 3 dB-beamwidth that is greater than 10 degrees. A bi-directional ptp wireless link having some other beamwidth could be utilized as well.

Further, each bi-directional ptp wireless link that is established between two wireless communication nodes of the wireless mesh network may operate and carry traffic at frequencies in any of various different frequency bands. For instance, in a preferred embodiment, each bi-directional ptp wireless link established between two wireless communication nodes of the wireless mesh network may take the form of a millimeter-wave ptp wireless link (or an "MMWave wireless link" for short) that operates and carries traffic at frequencies in a frequency band within the millimeter-wave spectrum (e.g., between 6 gigahertz (GHz) and 300 GHz), such as the 26 GHz band, the 28 GHz band, the 39 GHz band, the 37/42 GHz band, the V band (e.g., between 50 GHz and 75 GHz), the E Band (e.g., between 60 GHz and 90 GHz), the W band (e.g., between 75 GHz and 110 GHz), the F band (e.g., between 90 GHz and 140 GHz), the D band (e.g., between 110 GHz and 170 GHz), or the G band (e.g., between 110 GHz and 300 GHz), among other possibilities. In practice, millimeter-wave ptp wireless links such as this may have a high capacity (e.g., 1 Gbps or more) and a low latency (e.g., less than 1 millisecond), which may provide an advantage over ptp wireless links operating in other frequency spectrums. However, millimeter-wave ptp wireless links such as this may also have certain limitations as compared to wireless links operating in other frequency spectrums, including a shorter maximum link length and a requirement that there be at least partial LOS between the wireless communication nodes establishing the millimeter-wave ptp wireless link in order for the link to operate properly, which may impose restrictions on which infrastructure sites can be used to host the wireless communication nodes and how the wireless mesh equipment of the wireless communication nodes must be positioned and aligned at the infrastructure sites, among other considerations that typically need to be addressed when utilizing millimeter-wave ptp wireless links.

In another embodiment, each bi-directional ptp wireless link established between two wireless communication nodes of the wireless mesh network may take the form of a sub-6 GHz ptp wireless link that operates and carries traffic at frequencies in a frequency band within the sub-6 GHz spectrum. In practice, sub-6 GHz ptp wireless links such as this may have a lower capacity (e.g., less than 1 Gbps) and perhaps also a higher latency than millimeter-wave ptp links, which may make sub-6 GHz ptp wireless links less desirable for use in at least some kinds of mesh-based communication systems (e.g., mesh-based communication systems for providing high-speed internet service). However, sub-6 GHz ptp wireless links such as this may also provide certain advantages over millimeter-wave ptp links, including a longer maximum link length and an ability to operate in environments that do not have sufficient LOS, which may make sub-6 GHz ptp wireless links more suitable for certain kinds of mesh-based communication systems and/or certain segments of mesh-based communication systems.

In yet another embodiment, some of the bi-directional ptp wireless links established between wireless communication nodes of the wireless mesh network may take the form of millimeter-wave ptp wireless links, while other of the bi-directional ptp wireless links established between wireless communication nodes of the wireless mesh network may take the form of sub-6 GHz ptp wireless links. The bi-directional ptp wireless links established between wireless communication nodes of the wireless mesh network may operate and carry traffic at frequencies in other frequency bands as well.

Further yet, each bi-directional ptp wireless link that is established between two wireless communication nodes of the wireless mesh network may utilize any of various duplexing schemes to carry bi-directional network traffic between the two wireless communication nodes, including but not limited to time division duplexing (TDD) and/or frequency division duplexing (FDD), among other possibilities, and network traffic may be exchanged over each bi-directional ptp wireless link using any of various digital transmission schemes, including but not limited to amplitude modulation (AM), phase modulation (PM), pulse amplitude modulation/quadrature amplitude modulation (PAM/QAM), ultra-wide band (UWB) pulse modulation (e.g., using pulses on the order of pico-seconds, such as pulses of 5-10 pico-seconds), multiple input multiple output (MIMO), and/or orbital angular momentum (OAM) multiplexing, and/or among other possibilities.

Still further, each bi-directional ptp wireless link that is established between two wireless communication nodes of the wireless mesh network may have any of various capacities, which may depend in part on certain of the other attributes described above (e.g., the ptp wireless link's beamwidth, frequency band, etc.) and/or the particular equipment used to establish the ptp wireless link. For instance, in a preferred embodiment, each bi-directional ptp wireless link that is established between two wireless communication nodes may have a capacity of at least 1 Gbps, which is generally considered to be a "high-capacity" ptp wireless link in the context of the present disclosure. Within this class of "high-capacity" ptp wireless links, each ptp wireless link may have a capacity level that falls within any of various ranges, examples of which may include a capacity between 1 and 5 Gbps, a capacity between 5 and 10 Gbps, a capacity between 10 and 20 Gbps, a capacity that exceeds 20 Gbps, or perhaps even a capacity that exceeds 100 Gbps (which may be referred to as an "ultra-high-capacity" ptp wireless link), among other possible examples of capacity ranges. Further, in other embodiments, some or all of the bi-directional ptp wireless links may have a capacity that is less than 1 Gbps. It some implementations, ptp wireless links having differing levels of high capacity may also be utilized at different points within the wireless mesh network (e.g., utilizing ptp wireless links having a first capacity level between first-tier and second-tier nodes and between peer second-tier nodes and utilizing ptp wireless links having a second capacity level between second-tier and third-tier nodes and between peer third-tier nodes). The capacities of the bi-directional ptp wireless links may take other forms as well.

Each bi-directional ptp wireless link that is established between two wireless communication nodes of the wireless mesh network may also have any of various lengths, which may depend on the location of the two wireless communication nodes, but the maximum link length of each such wireless link may also depend in part on certain of the other attributes described above (e.g., the ptp wireless link's beamwidth, frequency band, etc.) and/or the particular equipment used to establish the ptp wireless link. As examples, a bi-directional ptp wireless link that is established between two wireless communication nodes of the wireless mesh network could have a shorter maximum link length (e.g., less than 100 meters), an intermediate maximum link length (e.g., between 100 meters and 500 meters), a longer maximum link length (e.g., between 500 meters and 1000 meters), or a very long maximum link length (e.g., more than 1000 meters), among other possibilities. It some implementations, ptp wireless links having differing maximum lengths may also be utilized at different points within the wireless mesh network (e.g., utilizing ptp wireless links having a first maximum length between first-tier and second-tier nodes and between peer second-tier nodes and utilizing ptp wireless links having a second maximum length between second-tier and third-tier nodes and between peer third-tier nodes). The lengths of the bi-directional ptp wireless links may take other forms as well.

Each bi-directional ptp wireless link that is established between two wireless communication nodes of the wireless mesh network may take various other forms as well.

Turning to the bi-directional ptmp wireless links, each bi-directional ptmp wireless link that originates from a given wireless communication node of the wireless mesh network may have any of various different beamwidths. For instance, as one possibility, a bi-directional ptmp wireless link that originates from a given wireless communication node of the wireless mesh network may have a 3 dB-beamwidth in either or both of the horizontal and vertical directions that is 10 degrees or less, which would generally be classified as a "narrow" beamwidth. As another possibility, a bi-directional ptmp wireless link that originates from a given wireless communication node of the wireless mesh network may have a 3 dB-beamwidth in either or both of the horizontal and vertical directions that is greater than 10 degrees (e.g., a beamwidth of 30 degrees). A bi-directional ptmp wireless link having some other beamwidth could be utilized as well.

Further, each bi-directional ptmp wireless link that originates from a given wireless communication node of the wireless mesh network may have any of various field-of-view widths, which may define a "ptmp coverage area" for communicating with one or more wireless communication nodes. For instance, as one possibility, a bi-directional ptmp wireless link that originates from a given wireless communication node of the wireless mesh network may define a ptmp coverage area having a horizontal field-of-view width that is within a range of 60 degrees to 180 degrees (e.g., 90 degrees or 120 degrees). As another possibility, a bi-directional ptmp wireless link that originates from a given wireless communication node of the wireless mesh network may define a ptmp coverage area having a horizontal field-of-view width that is either less than 60 degrees (in which case the wireless communication node's ptmp coverage area would be smaller) or greater than 180 degrees (in which case the wireless communication node's ptmp coverage area would be larger). A bi-directional ptmp wireless link that defines a ptmp coverage area having some other field-of-view width could be utilized as well.

Further yet, each bi-directional ptmp wireless link that originates from a given wireless communication node of the wireless mesh network and is established with one or more other wireless communication nodes may operate and carry traffic at frequencies in any of various different frequency bands. For instance, in a preferred embodiment, each bi-directional ptmp wireless link that originates from a given wireless communication node of the wireless mesh network may take the form of a millimeter-wave wireless link that operates and carries traffic at frequencies in a frequency band within the millimeter-wave spectrum, such as the 26 GHz band, the 28 GHz band, the 39 GHz band, the 37/42 GHz band, the V band, the E Band, the W band, the F band, the D band, or the G band, among other possibilities. Millimeter-wave ptmp wireless links such as this may have a high capacity (e.g., at least 1 Gbps) and a low latency (e.g., less than 4 milliseconds), which may provide an advantage over wireless links operating in other frequency spectrums, but may also have certain limitations as compared to ptmp wireless links operating in other frequency spectrums, including a shorter maximum link length and a need for sufficient LOS between wireless communication nodes, which may impose restrictions on which infrastructure sites can be used to host the wireless communication nodes and how the wireless mesh equipment of the wireless communication nodes must be positioned and aligned at the infrastructure sites, among other considerations that typically need to be addressed when utilizing millimeter-wave wireless links.

In another embodiment, each bi-directional ptmp wireless link that originates from a given wireless communication node of the wireless mesh network may take the form of a sub-6 GHz wireless link that operates and carries traffic at frequencies in a frequency band within the sub-6 GHz spectrum. Sub-6 GHz ptmp wireless links such as this may have a lower capacity (e.g., less than 1 Gbps) and perhaps also a higher latency than millimeter-wave ptmp wireless links, which may make sub-6 GHz ptmp wireless links less desirable for use in at least some kinds of mesh-based communication systems, but sub-6 GHz ptmp wireless links such as this may also provide certain advantages over millimeter-wave ptmp links, including a longer maximum link length and an ability to operate in environments that do not have sufficient LOS, which may make sub-6 GHz ptmp wireless links more suitable for certain kinds of mesh-based communication systems and/or certain segments of mesh-based communication systems.

In yet another embodiment, some of the bi-directional ptmp wireless links established between wireless communication nodes of the wireless mesh network may take the form of millimeter-wave ptmp wireless links while other of the bi-directional ptmp wireless links established between wireless communication nodes of the wireless mesh network may take the form of sub-6 GHz ptmp wireless links. The bi-directional ptmp wireless links established between wireless communication nodes of the wireless mesh network may operate and carry traffic at frequencies in other frequency bands as well.

Still further, each bi-directional ptmp wireless link that originates from a given wireless communication node of the wireless mesh network and is established with one or more other wireless communication nodes may utilize any of various duplexing schemes to carry bi-directional network traffic between the given wireless node and one of the other wireless communication nodes, including but not limited to TDD and/or FDD, as well as any of various multiple access schemes to enable the bi-directional ptmp wireless link originating from the given wireless communication node to be shared between the one or one or more other wireless communication nodes, including but not limited to frequency division multiple access (FDMA), time division multiple access (TDMA), single carrier FDMA (SC-FDMA), single carrier TDMA (SC-TDMA), code division multiple access (CDMA), orthogonal frequency division multiple access (OFDMA), non-orthogonal multiple access (NOMA), and/or Multiuser Superposition Transmission (MUST), among other possibilities. Further, as with the bi-directional ptp wireless links, network traffic may be exchanged over each bi-directional ptp wireless link using any of various digital transmission schemes, including but not limited to AM, PM, PAM/QAM, UWB pulse modulation, MIMO, and/or OAM multiplexing, among other possibilities.

Each bi-directional ptmp wireless link that originates from a given wireless communication node of the wireless mesh network and is established with one or more other wireless communication nodes may also have any of various capacities, which may depend in part on certain of the other attributes described above (e.g., the ptmp wireless link's beamwidth, frequency band, etc.) and/or the particular equipment used to establish the ptmp wireless link. For instance, in a preferred embodiment, each bi-directional ptmp wireless link that originates from a given wireless communication node of the wireless mesh network and is established with one or more other wireless communication nodes may have a capacity of at least 1 Gbps, which is generally considered to be a "high-capacity" ptmp wireless link in the context of the present disclosure. Within this class of "high-capacity" ptmp wireless links, each ptmp wireless link may have a capacity level that falls within any of various ranges, examples of which may include a capacity between 1 and 5 Gbps, a capacity between 5 and 10 Gbps, a capacity between 10 and 20 Gbps, a capacity that exceeds 20 Gbps, or perhaps even a capacity that exceeds 100 Gbps (which may be referred to as an "ultra-high-capacity" ptp wireless link), among other possible examples of capacity ranges. Further, in other embodiments, some or all of the bi-directional ptmp wireless links may have a capacity that is less than 1 Gbps. It some implementations, ptmp wireless links having differing levels of high capacity may also be utilized at different points within the wireless mesh network. The capacities of the ptmp wireless links may take other forms as well.

Each bi-directional ptmp wireless link that originates from a given wireless communication node of the wireless mesh network and is established with one or more other wireless communication nodes may also have any of various lengths, which may depend on the location of the wireless communication nodes, but the maximum link length of each such wireless link may also depend in part on certain of the other attributes described above (e.g., the ptmp wireless link's beamwidth, frequency band, etc.) and/or the particular equipment used to establish the ptmp wireless link. As examples, each bi-directional ptmp wireless link that originates from a given wireless communication node could have a shorter maximum link length (e.g., less than 100 meters), an intermediate maximum link length (e.g., between 100 meters and 500 meters), a longer maximum link length (e.g., between 500 meters and 1000 meters), or a very long maximum link length (e.g., more than 1000 meters), among other possibilities. It some implementations, ptmp wireless links having differing maximum lengths may also be utilized at different points within the wireless mesh network. The lengths of the ptmp wireless links may take other forms as well.

Each bi-directional ptmp wireless link that originates from a given wireless communication node of the wireless mesh network and is established with one or more other wireless communication nodes may take various other forms as well.

In practice, bi-directional ptp wireless links and bi-directional ptmp wireless links of the type described above typically provide different respective advantages and disadvantages that can be considered when implementing a mesh-based communication system in accordance with the example architecture disclosed herein. For instance, bi-directional ptp wireless links are typically less susceptible to interference than bi-directional ptmp wireless links, and in most cases, bi-directional ptp wireless links are unlikely to cause interference with one another once established even if such ptp wireless links do not have an extremely-narrow beamwidth. Conversely, the process of installing and configuring equipment for establishing a bi-directional ptp wireless link between two wireless communication nodes tends to be more time consuming and labor intensive than the process of installing and configuring equipment for establishing a bi-directional ptmp wireless link, as it generally requires the ptp radios at both of the wireless communication nodes to be carefully positioned and aligned with one another in a manner that provides sufficient LOS between the ptp radios. This is particularly the case for bi-directional ptp wireless links having narrower beamwidths, which increases the level of precision needed for the positioning and alignment of the ptp radios. As such, bi-directional ptp wireless links are typically better suited for establishing wireless connections between wireless communication nodes that have pre-planned, fixed locations and are expected to require minimal coordination after the initial deployment of the wireless mesh network, which typically is the case for first-tier nodes, second-tier nodes, and most third-tier nodes.

On the other hand, because a bi-directional ptmp wireless link originating from a given wireless communication node typically enables communication with one or more other wireless communication nodes in a wider coverage area (e.g., within a range of 120 degrees to 180 degrees), the process of installing and configuring equipment for establishing a bi-directional ptmp wireless link tends to be less time consuming or labor intensive—the ptmp radio of the given wireless communication node can be positioned and aligned to point in a general direction where other ptmp radios are expected to be located as opposed to a more precise direction of one specific ptp radio. As such, bi-directional ptmp wireless links are typically better suited for establishing wireless connections with wireless communication nodes that do not have pre-planned locations, which may be the case for fourth-tier nodes (and perhaps some third-tier nodes) because those nodes may not be added until after the initial deployment of the wireless mesh network. However, because bi-directional ptmp wireless links are generally more susceptible to interference, the use of bi-directional ptmp wireless links typically imposes an ongoing need to engage in coordination for frequency planning, interference mitigation, or the like after the initial deployment of the wireless mesh network. In this respect, the coordination that may be required for ptmp wireless links may involve intra-link coordination between multiple wireless communication nodes that are communicating over the same ptmp wireless link and/or inter-link coordination between multiple wireless communication nodes that originate different ptmp wireless links having ptmp coverage areas that are in proximity to one another, among other possibilities.

These differences in the respective interference profiles of ptp and ptmp wireless links, the respective amount of time and effort required to install and configure equipment for establishing ptp and ptmp wireless links, and the respective amount of time and effort required to maintain the ptp and ptmp links may all be factors that can be considered when implementing a mesh-based communication system in accordance with the example architecture disclosed herein. Additionally, in practice, equipment for establishing bi-directional ptp wireless links tends to be more expensive than equipment for establishing bi-directional ptmp wireless links (e.g., due to the fact that multiple ptp radios are required when there is a need to communicate with multiple other wireless communication nodes via respective ptp wireless links whereas only a single ptmp radio is typically required to communicate with multiple other wireless communication nodes via a ptmp wireless link), which is another factor that can be considered when implementing a mesh-based communication system in accordance with the example architecture disclosed herein.

Based on these (and other) factors, a designer of a mesh-based communication system having the example architecture disclosed herein could choose to interconnect the wireless communication nodes of the wireless mesh network using bi-directional ptp wireless links exclusively, bi-directional ptmp wireless links exclusively, or some combination of bi-directional ptp wireless links and bi-directional ptmp wireless links.

For instance, in one embodiment, every wireless link that is established between and among the wireless communication nodes in the different tiers of the wireless mesh network—which may include wireless links between first-tier and second-tier nodes, wireless links between peer second-tier nodes, wireless links between second-tier and third-tier nodes, wireless links between peer third-tier nodes, and wireless links between third-tier and fourth-tier nodes, among others—may take the form of a bi-directional ptp wireless link that is established between two wireless communication nodes' ptp radios.

In another embodiment, every wireless link that is established between and among the wireless communication nodes in the different tiers of the wireless mesh network—which as just noted may include wireless links between first-tier and second-tier nodes, wireless links between peer second-tier nodes, wireless links between second-tier and third-tier nodes, wireless links between peer third-tier nodes, and wireless links between third-tier and fourth-tier nodes, among others—may take the form of a bi-directional ptmp wireless link that originates from one wireless communication node's ptmp radio and is established with a respective ptmp radio at each of one or more other wireless communication nodes.

In yet another embodiment, the bi-directional wireless links that are established between and among the wireless communication nodes in certain tiers of the wireless mesh network may take the form of bi-directional ptp wireless links, while the bi-directional wireless links that are established between and among the wireless communication nodes in other tiers of the wireless mesh network may take the form of bi-directional ptmp wireless links.

For instance, as one possible implementation of this embodiment, the wireless links between first-tier and second-tier nodes, between peer second-tier nodes, between second-tier and third-tier nodes, and between peer third-tier nodes may each take the form of a bi-directional ptp wireless link that is established between two nodes' ptp radios, while the wireless links between third-tier and fourth-tier nodes may each take the form of a bi-directional ptmp wireless link that originates from a given third-tier node's ptmp radio and is established with a respective ptmp radio at each of one or more other fourth-tier nodes—which may allow the wireless mesh network to be extended to additional endpoints at a lower cost and may also be well suited for scenarios where there is an expectation that fourth-tier nodes may be added to the wireless mesh network after its initial deployment (among other considerations).

As another possible implementation of this embodiment, the wireless links between first-tier and second-tier nodes and between peer second-tier nodes may each take the form of a bi-directional ptp wireless link that is established between two nodes' ptp radios, while the wireless links between second-tier and third-tier nodes, between peer third-tier nodes, and between third-tier and fourth-tier nodes may each take the form of a bi-directional ptmp wireless link that originates from a given node's ptmp radio and is established with a respective ptmp radio at each of one or more other nodes—which may allow the wireless mesh network to be extended to third-tier nodes and/or fourth-tier nodes at a lower cost and may also be well suited for scenarios where there is an expectation that additional third-tier nodes and/or fourth-tier nodes may be added to the wireless mesh network after its initial deployment (among other considerations).

As yet another possible implementation of this embodiment where the wireless mesh network additionally includes a fifth tier of nodes, the wireless links between first-tier and second-tier nodes, between peer second-tier nodes, between second-tier and third-tier nodes, and between peer third-tier nodes may each take the form of a bi-directional ptp wireless link that is established between two nodes' ptp radios, while the wireless links between third-tier and fourth-tier nodes and between the fourth-tier and fifth-tier nodes may each take the form of a bi-directional ptmp wireless link that originates from a ptmp radio of one node and is established with a respective ptmp radio at each of one or more other nodes—which may allow the wireless mesh network to be extended to multiple tiers of additional endpoints at a lower cost and may also be well suited for scenarios where there is an expectation that multiple tiers of additional endpoints may be added to the wireless mesh network after its initial deployment (among other considerations).

In the foregoing implementations, the wireless mesh network may be considered to have two different "layers" (or "segments") of bi-directional wireless links: (1) a first layer comprising the bi-directional ptp wireless links, which may be referred to as a "ptp layer," and (2) a second layer comprising the bi-directional ptmp wireless links, which may be referred to as a "ptmp layer."

Various other implementations of the embodiment where the wireless mesh network includes both bi-directional ptp wireless links and bi-directional ptmp wireless links are possible as well, including but not limited to implementations where the bi-directional wireless links among the wireless communication nodes within a single tier of the wireless mesh network (e.g., the anchor-to-anchor wireless links) comprise a mix of bi-directional ptp wireless links and bi-directional ptmp wireless and/or implementations where the bi-directional wireless links between wireless communication nodes in two adjacent tiers of the wireless mesh network (e.g., the seed-to-anchor wireless links or the anchor-to-leaf wireless links) comprise a mix of bi-directional ptp wireless links and bi-directional ptmp wireless.

In implementations where the mesh-based communication further includes client devices that capable of establishing and communicating over direct wireless connections with wireless communication nodes, such direct wireless connections could be established over wireless links that take any of the various forms described above. For example, as one possibility, client devices may be connected to a given wireless communication node over a millimeter-wave or sub-6 GHz ptmp wireless link that originates from the given wireless communication node, but client devices may connect to wireless communication nodes over other types of wireless links as well.

Further, in line with the discussion, the bi-directional ptp and/or ptmp wireless links between and among the different tiers of wireless communication nodes in the foregoing embodiments may also have differing levels of capacity. For instance, in one example implementation, the wireless links between first-tier and second-tier nodes and between peer second-tier nodes (which form the high-capacity pathways extending from the first-tier nodes) may each comprise a high-capacity wireless link having a highest capacity level (e.g., at or near 10 Gbps or perhaps even higher), the wireless links between second-tier and third-tier nodes and between peer third-tier nodes (which may form the discrete sub-meshes for routing aggregated network traffic to and from endpoints in a particular geographic area) may each comprise a high-capacity wireless link having a second highest capacity level (e.g., at or near 2.5 Gbps), and the wireless links between third-tier and fourth-tier nodes may each comprise a high-capacity wireless link having either the second highest capacity level (e.g., at or near 2.5 Gbps) or a third highest capacity level (e.g., at or near 1 Gbps). Various other implementations that utilize wireless links having differing levels of capacity at different points within the network arrangement are possible as well.

Further yet, in some embodiments, certain of the wireless communication nodes within the mesh-based communication system could be equipped with multiple different types of equipment that is configured to establish and communicate over wireless links in multiple different frequency bands, such as a first set of equipment (e.g., a first radio) for establishing and communicating over a wireless link operating in a first frequency band (e.g., a particular millimeter-wave frequency band) and a second set of set of equipment (e.g., a second radio) for establishing and communicating over a wireless link operating in a second frequency band (e.g., a sub-6 GHz wireless link or a different millimeter-wave frequency band).

For instance, as one possible implementation of this embodiment, at least some of the first-tier nodes (i.e., nodes that serve as a PoP for a core network and exchange traffic between the core network and other nodes in the wireless mesh network) in the mesh-based communication system may comprise equipment for establishing and communicating over one or more millimeter-wave ptp wireless links (e.g., a single 10 Gbps millimeter-wave ptp wireless link or multiple 10 Gbps millimeter-wave ptp wireless links in different directions) where such equipment is installed at a cellular tower having fiber connectivity—which is typically already installed with equipment for establishing and communicating over a sub-6 GHz ptmp wireless link (e.g., equipment owned and operated by a wireless service provider) that typically provides broader coverage and can operate in environments without sufficient LOS—so that each such tier-one node may have the capability to communicate with other wireless communication nodes in the mesh-based communication system over wireless links in two different frequency bands. And correspondingly, in this implementation, certain of the second-tier, third-tier, and/or fourth-tier nodes may comprise both (i) equipment for establishing and communicating over a millimeter-wave ptp wireless link (e.g., single 10 Gbps millimeter-wave ptp wireless link) with a first-tier node and (ii) equipment for establishing and communicating over a sub-6 GHz ptmp wireless link with a first-tier node, which may enable each such node to communicate with a first-tier node over a sub-6 GHz ptmp wireless link as a fallback option in scenarios where the node's connectivity to a first-tier node over the millimeter-wave ptp wireless link is lost, thereby restoring connectivity of both the node itself and also any other downstream nodes that are connected to the first-tier node via the node that lost connectivity to the first-tier node.

As another possible implementation of this embodiment, at least some of the wireless communication nodes in a mesh-based communication system may comprise (i) a first ptmp radio for establishing and communicating over a millimeter-wave ptmp wireless link with one or more other wireless communication nodes and (ii) a second ptmp radio for establishing and communicating over a sub-6 GHz ptmp wireless link with one or more client devices, which may provide broader coverage than a millimeter-wave ptmp wireless link and may also enable wireless connections to be established between the wireless communication nodes and the client devices in environments without sufficient LOS. In this respect, such an implementation may be particularly suitable for scenarios where the client devices comprise mobile devices that do not have fixed locations and may thus change location while being connected to a wireless communication node.

As another possible implementation of this embodiment, at least some of the wireless communication nodes in a mesh-based communication system may include additional equipment for establishing and communicating over wireless links operating in a different frequency band that are intended to serve as communication channels for exchanging certain types of network traffic between wireless communication nodes.

For example, when certain wireless communication nodes in a mesh-based communication system are equipped with ptmp radios that are configured to originate ptmp wireless links for communicating with other downstream wireless communication nodes and/or with client devices, it may be desirable or even necessary to configure these wireless communication nodes to exchange information with one another that facilitates certain types of network coordination tasks related to the communication over the ptmp wireless links, such as frequency coordination for interference mitigation, distributive MIMO, and/or time-synchronized transmission of the same signal on the same frequency to the same endpoint from multiple wireless communication nodes. This information may be referred to herein as "network coordination information," and may take any various forms, one example of which may comprise I/Q samples. In practice, network coordination information such as this may consume a large amount of bandwidth and require a low latency, because if such network coordination information is not timely delivered, the network coordination task may not succeed. Thus, to ensure that network coordination information such as this can be exchanged with an acceptable level of latency, at least some of the wireless communication nodes equipped with ptmp radios configured to originate ptmp wireless links may be installed with additional equipment for establishing one or more additional ptp wireless links operating in a higher-frequency band of the millimeter-wave spectrum that is suitable for exchanging information that consumes a large amount of bandwidth and requires a lower latency than the network traffic being carried over the ptmp wireless links—such as a millimeter-wave frequency band that encompasses frequencies greater than 100 GHz. In this respect, each such wireless communication node comprising this additional equipment may function to exchange network coordination information with one or more other wireless communication nodes via the one or more additional ptp wireless links operating in the higher-frequency band of the millimeter-wave spectrum, while continuing to exchange network traffic over the one or more other wireless links that are established by the wireless communication node in a lower-frequency band of the millimeter-wave spectrum (e.g., the 26 GHz band, 28 GHz band, 39 GHz band, 37/42 GHz band, V band, or E Band) and/or a sub-6 GHz spectrum.

In the foregoing example, the wireless communication nodes that are configured to exchange the network coordination information via the one or more additional ptp wireless links operating in the higher-frequency band of the millimeter-wave spectrum may also be grouped into non-overlapping "clusters" based on the geographic location of the wireless communication nodes, where the wireless communication nodes in each respective cluster are capable of directly exchanging network coordination information with other wireless communication nodes in that same respective cluster, but are prohibited from directly exchanging network coordination information with other wireless communication nodes in any other cluster. In such an arrangement, there may also optionally be some ability for wireless communication nodes in different clusters to exchange network coordination information at a cluster level rather than a node level, but that cluster-level exchange of network coordination information may require additional oversight by the wireless communication nodes responsible for the cluster-level exchange to ensure that the network coordination information is being sent with an acceptable level of latency.

While the foregoing example provides one possible approach for exchanging network coordination information between wireless communication nodes in a mesh-based communication system, it should be understood that other approaches for exchanging network coordination information between wireless communication nodes are possible as well—including but not limited to the possibility that network coordination information may be exchanged between wireless communication nodes via wired links (e.g., fiber links routed between such wireless communication nodes) and/or via the same wireless links that are utilized to carry network traffic to and from such wireless communication nodes.

Further, while the foregoing example is described in the context of network coordination information, it should be understood that a similar approach could be employed for exchanging other types of latency-sensitive information between wireless communication nodes of a mesh-based communication system as well.

Further yet, while the foregoing example is described in the context of the mesh-based communication system architectures disclosed herein, it should be understood that a similar approach could be employed for exchanging latency-sensitive information (such as network coordination information) in other types of wireless communication systems as well. For example, in a wireless mobile network comprising base stations (e.g., macrocell base stations, small-cell base stations, etc.) that serve mobile devices via wireless links in a sub-6 GHz frequency band, certain of the base stations could be installed with additional equipment for establishing one or more additional ptp wireless links operating in a higher-frequency band of the millimeter-wave spectrum that is suitable for exchanging network coordination information that consumes a large amount of bandwidth and requires a lower latency—such as a millimeter-wave frequency band that encompasses frequencies greater than 100 GHz. In this respect, each such base station comprising this additional equipment may function to exchange network coordination information with one or more other base stations via the one or more additional wireless links operating in the higher-frequency band of the millimeter-wave spectrum, which may enable such base stations to engage in network coordination tasks such as frequency coordination for interference mitigation, distributive MIMO, and/or time-synchronized transmission of the same signal on the same frequency to the same endpoint from multiple base stations, while continuing to exchange network traffic over the one or more other wireless links that are established by the wireless communication node in the sub-6 GHz frequency band.

The mesh-based communication system architectures disclosed herein may comprise various other configurations of ptp and/or ptmp wireless links as well.

Turning now to FIGS. 1A-D, some simplified examples of portions of mesh-based communication systems designed and implemented in accordance with the present disclosure are shown. It should be understood that these simplified examples are shown for purposes of illustration only, and that in line with the discussion above, numerous other arrangements of mesh-based communication systems designed and implemented in accordance with the present disclosure are possible and contemplated herein.

To begin, FIG. 1A illustrates one simplified example 100 of a portion of a mesh-based communication system designed and implemented in accordance with the present disclosure. In line with the discussion above, this example mesh-based communication system 100 may be utilized to provide a high-speed internet service to end users, although it is possible that the mesh-based communication system could be utilized to deliver some other type of network-based service to end users as well. As shown, the example mesh-based communication system 100 may include four different tiers of wireless communication nodes that are interconnected together in order to form a wireless mesh network: (i) a first tier of nodes 102, (ii) a second tier of nodes 104, (iii) a third tier of nodes 106, and (iv) a fourth tier of nodes 108.

For instance, beginning with the first tier of nodes 102, the example mesh-based communication system 100 of FIG. 1A is shown to include two first-tier nodes 102a and 102b, each of which is installed at a commercial building that has high-capacity fiber connectivity to a core network and is connected downstream to a respective second-tier node 104 via a respective inter-tier wireless link that takes the form of a bi-directional ptp wireless link. In this respect, each of the first-tier nodes 102a and 102b may function to exchange bi-directional network traffic with (i) the core network via the high-capacity fiber connection and (ii) the respective second-tier node 104 to which the first-tier node 102 is connected over the respective wireless link. Further, one or both of the first-tier nodes 102 may function to deliver high-speed internet service to the commercial building(s) hosting the first-tier node(s) 102, which may enable one or more client devices at the commercial building(s) to access the high-speed internet service.

While the example mesh-based communication system 100 of FIG. 1A is shown to include two first-tier nodes 102a and 102b, it should also be understood that this is merely for purposes of illustration, and that in practice, the first tier of nodes 102 could include any number of first-tier nodes—including as little as a single first-tier node. Further, while each of the first-tier nodes 102a and 102b is shown to be connected to a single second-tier node 104, it should also be understood that this is merely for purposes of illustration, and that in practice, a first-tier node 102 could be connected to multiple second-tier nodes 104. Further yet, while each of the first-tier nodes 102a and 102b is shown to be connected downstream to a respective second-tier node 104 via a bi-directional ptp wireless link, it should be understood that a first-tier node 102 could alternatively be connected downstream to a second-tier node 104 (or perhaps multiple second-tier nodes 104) via a bi-directional ptmp wireless link.

Turning to the second tier of nodes 104, the example mesh-based communication system 100 of FIG. 1A is shown to include three second-tier nodes 104a, 104b, and 104c, each of which is installed at a residential building associated with a customer of the high-speed internet service and primarily serves to extend the high-capacity access to the core network from the first-tier nodes 102 to other geographic locations by forming high-capacity pathways (e.g., in the range of 10 Gbps) for routing aggregated network traffic that originated from or is destined to the core network. In particular, second-tier nodes 104a and 104b are shown to form a multi-hop pathway extending from first-tier node 102a, and second-tier node 104c is shown to form a single-hop pathway extending from first-tier node 102b. In this respect, (i) second-tier node 104a is connected to (and exchanges bi-directional network traffic with) first-tier node 102a via an inter-tier wireless link that takes the form of a bi-directional ptp wireless link and is connected to (and exchanges bi-directional network traffic with) peer second-tier node 102b via an intra-tier wireless link that takes the form of a bi-directional ptp wireless link, (ii) second-tier node 104b is connected to (and exchanges bi-directional network traffic with) peer second-tier node 104a via an intra-tier wireless link that takes the form of a bi-directional ptp wireless link, and (iii) second-tier node 104c is connected to (and exchanges bi-directional network traffic with) first-tier node 102b via an inter-tier wireless link that takes the form of a bi-directional ptp wireless link.

Additionally, as shown in FIG. 1A, each of at least a subset of the second-tier nodes 104a, 104b, and 104c may be directly connected downstream to one or more third-tier nodes 106. In particular, (i) second-tier node 104b is shown to be connected downstream to third-tier node 106a via an inter-tier wireless link that takes the form of a bi-directional ptmp wireless link and (ii) second-tier node 104c is shown to be connected downstream to third-tier node 106b and third-tier node 106c via respective inter-tier wireless links that each take the form of a bi-directional ptmp wireless link. In this respect, each of third-tier nodes 104b and 104c may additionally function to exchange bi-directional network traffic with one or more third-tier nodes.

Additionally, each of the second-tier nodes 104a, 104b, and 104c (or at least one of them) may function to deliver the high-speed internet service to the residential building hosting the second-tier node, which may enable one or more client devices at the residential building to access the high-speed internet service.

While the example mesh-based communication system 100 of FIG. 1A is shown to include three second-tier nodes 104a, 104b, and 104c, it should also be understood that this is merely for purposes of illustration, and that in practice, the second tier of nodes 104 could include any number of second-tier nodes—including as little as a single second-tier node. Further, while each of the second-tier nodes 104a, 104b, and 104c is shown to be connected to a particular set of one or more other wireless communication nodes (e.g., first-tier, second-tier, and/or third-tier nodes), it should also be understood that this is merely for purposes of illustration, and that in practice, a second-tier node 104 could be connected to any combination of one or more first-tier, second-tier, and/or third-tier nodes. Further yet, while each of the second-tier nodes 104a and 104b is shown to be connected to each other wireless communication node via a respective bi-directional ptp wireless link, it should be understood that a second-tier node 104 could alternatively be connected to one or more other wireless communication nodes via a bi-directional ptmp wireless link (or perhaps multiple bi-directional ptmp wireless links). Still further, while the second-tier nodes 104 in example mesh-based communication system 100 of FIG. 1A are shown to form one respective pathway extending from each of the first-tier nodes 102, it should be understood that example mesh-based communication system 100 of FIG. 1A could include additional second-tier nodes 104 that form additional pathways extending from either or both of the first-tier nodes 102.

Turning next to the third tier of nodes 106, the example mesh-based communication system 100 of FIG. 1A is shown to include seven third-tier nodes 106a, 106b, 106c, 106d, 106e, 106f, and 106g, each of which is installed at a residential building associated with a customer of the high-speed internet service and is connected to a second-tier node 104, one or more peer third-tier nodes 106, or a combination thereof. In particular, (i) third-tier node 106a is shown to be connected upstream to second-tier node 104b via an inter-tier wireless link that takes the form of a bi-directional ptp wireless link and is also shown to be connected to peer third-tier nodes 106d and 106e via respective intra-tier wireless links that each take the form of a bi-directional ptp wireless link, (ii) third-tier node 106b is shown to be connected upstream to second-tier node 104b via an inter-tier wireless link that takes the form of a bi-directional ptp wireless link and is also shown to be connected to peer third-tier node 106f via an intra-tier wireless link that takes the form of a bi-directional ptp wireless link, (iii) third-tier node 106c is shown to be connected upstream to second-tier node 104c via an inter-tier wireless link that takes the form of a bi-directional ptp wireless link, (iv) third-tier node 106d is shown to be connected to peer third-tier node 106a via an intra-tier wireless link that takes the form of a bi-directional ptp wireless link, (v) third-tier node 106e is shown to be connected to peer third-tier node 106a via an intra-tier wireless link that takes the form of a bi-directional ptp wireless link, (vi) third-tier node 106f is shown to be connected to peer third-tier node 106b via one intra-tier wireless link that takes the form of a bi-directional ptp wireless link and to peer third-tier node 106g via another intra-tier wireless link that takes the form of a bi-directional ptp wireless link, and (vii) third-tier node 106g is shown to be connected to peer third-tier node 106f via an intra-tier wireless link that takes the form of a bi-directional ptp wireless link. In this respect, each of the third-tier nodes 106a, 106b, 106c, 106d, 106e, 106f, and 106g may function to exchange bi-directional network traffic with a second-tier node 104, one or more peer third-tier nodes 106, or a combination thereof as part of a given sub-mesh for routing aggregated network traffic to and from endpoints within a given geographic area.

Additionally, as shown in FIG. 1A, each of at least a subset of the third-tier nodes 106a, 106b, 106c, 106d, 106e, 106f, and 106g may be directly connected downstream to one or more fourth-tier nodes 108. In particular, (i) third-tier node 106g is shown to be connected downstream to three fourth-tier nodes 108 (fourth-tier nodes 108a, 108b, and 108c) via an inter-tier wireless link that takes the form of a bi-directional ptmp wireless link, (ii) third-tier node 106*d* is shown to be connected downstream to four fourth-tier nodes 108 (fourth-tier nodes 108*d*, 108*e*, 108*f*, and 108*g*) via an inter-tier wireless link that takes the form of a bi-directional ptmp wireless link, and (iii) third-tier node 106*b* is shown to be connected downstream to a single fourth-tier node 108 (fourth-tier node 108*h*) via an inter-tier wireless link that takes the form of a bi-directional ptmp wireless link. In this respect, each of third-tier nodes 106*g*, 106*d*, and 106*b* may additionally function to exchange bi-directional network traffic with one or more fourth-tier nodes 108, which may take the form of individual network traffic that originates from or is designated to the one or more fourth-tier nodes 108.

Additionally yet, each of the third-tier nodes 106*a*, 106*b*, 106*c*, 106*d*, 106*e*, 106*f*, and 106*g* (or at least a subset thereof) may function to deliver the high-speed internet service to the residential building hosting the third-tier node, which may enable one or more client devices at the residential building to access the high-speed internet service.

While the example mesh-based communication system 100 of FIG. 1A is shown to include six third-tier nodes 106*a*, 106*b*, 106*c*, 106*d*, 106*e*, 106*f*, and 106*g*, it should also be understood that this is merely for purposes of illustration, and that in practice, the third tier of third-tier nodes 106 could include any number of third-tier nodes—including as little as a single third-tier node. Further, while each of the third-tier nodes 106*a*, 106*b*, 106*c*, 106*d*, 106*e*, 106*f*, and 106*g* is shown to be connected to a particular set of one or more other wireless communication nodes (e.g., second-tier, third-tier, and/or fourth-tier nodes), it should also be understood that this is merely for purposes of illustration, and that in practice, a third-tier node 106 could be connected to any combination of one or more second-tier, third-tier, and/or fourth-tier nodes. Further yet, while each of at least a subset of the third-tier nodes 106*a*, 106*b*, 106*c*, 106*d*, 106*e*, 106*f*, and 106*g* is shown to be connected downstream to one or more fourth-tier nodes 108 via a bi-directional ptmp wireless link, it should be understood that a third-tier node 106 could alternatively be connected downstream to one or more fourth-tier nodes 108 via one or more bi-directional ptp wireless links.

Turning lastly to the fourth tier of nodes 108, the example mesh-based communication system 100 of FIG. 1A is shown to include eight fourth-tier nodes 108*a*, 108*b*, 108*c*, 108*d*, 108*e*, 108*f*, 108*g*, and 108*h*, each of which is installed at a residential building associated with a customer of the high-speed internet service and is directly connected upstream to a respective third-tier node 106 via a respective bi-direction ptmp wireless link. In particular, (i) fourth-tier nodes 108*a*, 108*b*, and 108*c* are shown to be connected upstream to the third-tier node 106*g* via an inter-tier wireless link that takes the form of a bi-direction ptmp wireless link, (ii) fourth-tier nodes 108*d*, 108*e*, 108*f*, and 108*g* are shown to be connected upstream to the third-tier node 106*d* via an inter-tier wireless link that takes the form of a bi-direction ptmp wireless link, and (iii) fourth-tier node 108*h* is shown to be connected upstream to the third-tier node 106*b* via an inter-tier wireless link that takes the form of a bi-direction ptmp wireless link. In this respect, each of fourth-tier nodes 108*a*, 108*b*, 108*c*, 108*d*, 108*e*, 108*f*, 108*g*, and 108*h* may function to exchange bi-directional network traffic with a given third-tier node 106, which may take the form of individual network traffic that originates from or is designated to the fourth-tier node 108.

Further, each of the fourth-tier nodes 108*a*, 108*b*, 108*c*, 108*d*, 108*e*, 108*f*, 108*g*, and 108*h* (or at least a subset thereof) may function to deliver the high-speed internet service to the residential building hosting the fourth-tier node, which may enable one or more client devices at the residential building to access the high-speed internet service.

While the example mesh-based communication system 100 of FIG. 1A is shown to include eight fourth-tier nodes 108*a*, 108*b*, 108*c*, 108*d*, 108*e*, 108*f*, 108*g*, and 108*h*, it should also be understood that this is merely for purposes of illustration, and that in practice, the fourth tier of fourth-tier nodes 108 could include any number of fourth-tier nodes—including as little as a single fourth-tier node (or perhaps no fourth-tier nodes at all in some implementations). Further, while FIG. 1A shows each of the fourth-tier nodes 108*a*, 108*b*, 108*c*, 108*d*, 108*e*, 108*f*, 108*g*, and 108*h* being connected to a single third-tier node and no other wireless communication node, it should also be understood that this is merely for purposes of illustration, and that in practice, a fourth-tier node 108 could be connected to one or more other wireless communication nodes as well (e.g., another third-tier node or a downstream fourth-tier node).

In line with the discussion above, each of the bi-directional ptp and ptmp wireless links established between the wireless communication nodes in FIG. 1A may take any of various forms, and in at least one implementation, each of the bi-directional ptp and ptmp wireless links may take the form of a millimeter-wave wireless link that operates and carries traffic at frequencies in a frequency band within the millimeter-wave spectrum, which as noted above may advantageously provide both a high capacity (e.g., at least 1 Gbps) and a low latency (e.g., less than 1 millisecond for ptp wireless links and less than 4 milliseconds for ptmp wireless links). However, the bi-directional ptp and ptmp wireless links may take other forms as well.

Further, in line with the discussion above, the bi-directional wireless links between and among the different tiers of nodes within the example mesh-based communication system 100 of FIG. 1A may have differing levels of capacity (and perhaps also differing maximum lengths). For instance, the ptp wireless links between first-tier nodes 102 and second-tier nodes 104 as well as between peer second-tier nodes 104 may each comprise a high-capacity wireless link having a highest capacity level (e.g., at or near 10 Gbps or perhaps even higher), the ptp wireless links between second-tier nodes 104 and third-tier nodes 106 as well as between peer third-tier nodes 106 may each comprise a high-capacity wireless link having a second highest capacity level (e.g., at or near 2.5 Gbps), and the ptmp wireless links between third-tier nodes 106 and fourth-tier nodes 108 may each comprise a high-capacity wireless link having a third highest capacity level (e.g., at or near 1 Gbps). However, the bi-directional ptp and ptmp wireless links may have different capacity levels as well.

Further yet, in line with the discussion above, the wireless mesh network of the example mesh-based communication system 100 of FIG. 1A may be considered to have two different "layers" (or "segments") of bi-directional wireless links: (1) a ptp layer comprising the mesh of bi-directional ptp wireless links between and among the first-tier nodes, second-tier nodes, and third-tier nodes, and (2) a ptmp layer comprising the bi-directional ptmp wireless links between the third tier of nodes and the fourth tier of nodes. In this respect, the ptp layer of the example mesh-based communication system 100 of FIG. 1A may serve as a "backbone" for the wireless mesh network that is configured to carry network traffic that takes the form of aggregated mesh access traffic (e.g., network traffic that originates from or is destined to multiple different endpoints), whereas the ptmp layer of the example mesh-based communication system 100 of FIG. 1A may serve to extend the mesh of bi-directional ptp wireless links by carrying network traffic that takes the form of individual mesh access traffic (e.g., network traffic intended for an individual endpoint node within the wireless mesh network).

The example mesh-based communication system 100 may include various other communication nodes and/or take various other forms as well.

Figure 1B:
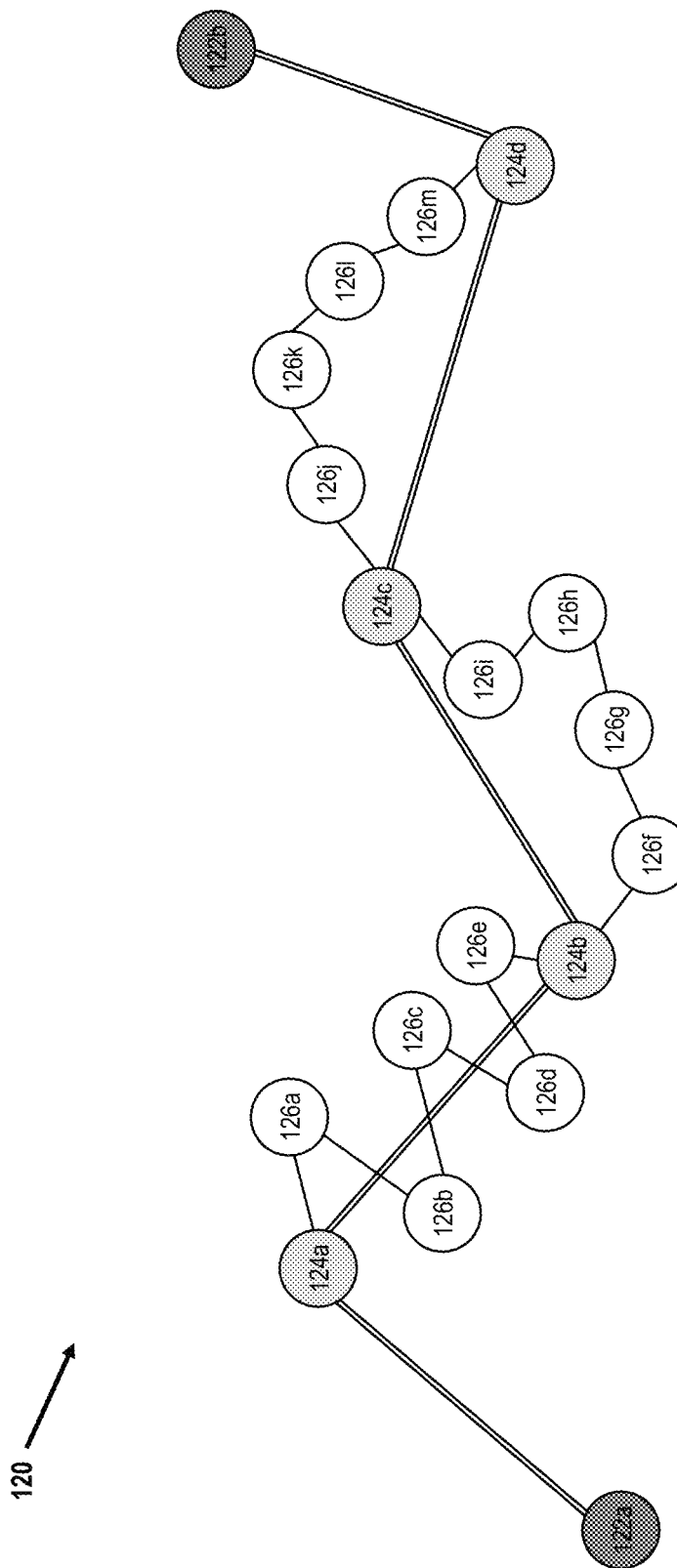
FIG. 1B depicts a simplified illustrative diagram of another example portion of an example mesh-based communication system that may be designed, implemented, and deployed in accordance with aspects of the disclosed technology.

FIG. 1B illustrates another simplified example 120 of a portion of a mesh-based communication system designed and implemented in accordance with the present disclosure. As shown, the example mesh-based communication system 120 may include three different tiers of wireless communication nodes that are interconnected together in order to form a wireless mesh network: (i) a first tier of nodes 122 shown in dark gray, (ii) a second tier of nodes 124 shown in light gray, and (iii) a third tier of nodes 126 shown in white. However, it should be understood that the example mesh-based communication system 120 may could be extended to include a fourth tier of wireless communication nodes. In line with the discussion above, each of depicted wireless communication nodes comprises equipment installed at a respective infrastructure site, but to simplify the illustration, the respective infrastructure sites of the nodes are not depicted in FIG. 1B.

As shown in FIG. 1B, this portion of the example mesh-based communication system 120 may include (i) two first-tier nodes 122a and 122b that have high-capacity fiber connectivity to a core network, (ii) a set of four second-tier nodes 124a-d that form a high-capacity, multi-hop pathway comprising a chain of 5 bi-directional ptp wireless links (i.e., a spine) that extends between the two first-tier nodes 122a and 122b and serves to route aggregated network traffic originating from or destined to the core network, where each of the second-tier nodes 124a-d functions to route network traffic in either of two direction along the multi-hop pathway (e.g., either to the left or to the right in FIG. 1B depending on the origin and destination of the network traffic), and (iii) a number of third-tier nodes 126a-m that, together with the second-tier nodes 124a-d, form one or more discrete sub-meshes of bi-directional ptp wireless links for routing aggregated network traffic to and from endpoints in one or more geographic areas, which in FIG. 1B may be co-extensive with the third-tier nodes 126a-m given that the example mesh-based communication system 120 is not shown to include any other downstream nodes such as fourth-tier nodes.

In line with the discussion above, each of the bi-directional ptp wireless links established between the wireless communication nodes in FIG. 1B may take any of various forms, and in at least one implementation, each of the bi-directional ptp wireless links may take the form of a millimeter-wave wireless link that operates and carries traffic at frequencies in a frequency band within the millimeter-wave spectrum. Further, in line with the discussion above, the bi-directional ptp wireless links at different points within the example mesh-based communication system 160 could have differing levels of capacity (and perhaps also differing maximum lengths). For instance, the bi-directional ptp wireless links included in the chain of bi-directional ptp wireless links extending between first-tier nodes 122a and 122b through second-tier nodes 124a-d may each comprise a high-capacity wireless link having a first capacity level (e.g., at or near 10 Gbps or perhaps even higher) and a first maximum length, while the ptp wireless links that form the one or more sub-meshes between and among the second-tier nodes 124 and third-tier nodes 126 may each comprise a high-capacity wireless link having a second capacity level that is lower than the first capacity level (e.g., at or near 2.5 Gbps) and a second maximum length that is lower than the first maximum length. However, the bi-directional wireless links established between the wireless communication nodes in FIG. 1B may take various other forms as well—including but not limited to the possibility that some or all of the bi-directional wireless links between the wireless communication nodes may comprise ptmp wireless links rather than ptp wireless links.

The example mesh-based communication system 120 may include various other communication nodes and/or take various other forms as well.

Figure 1C:
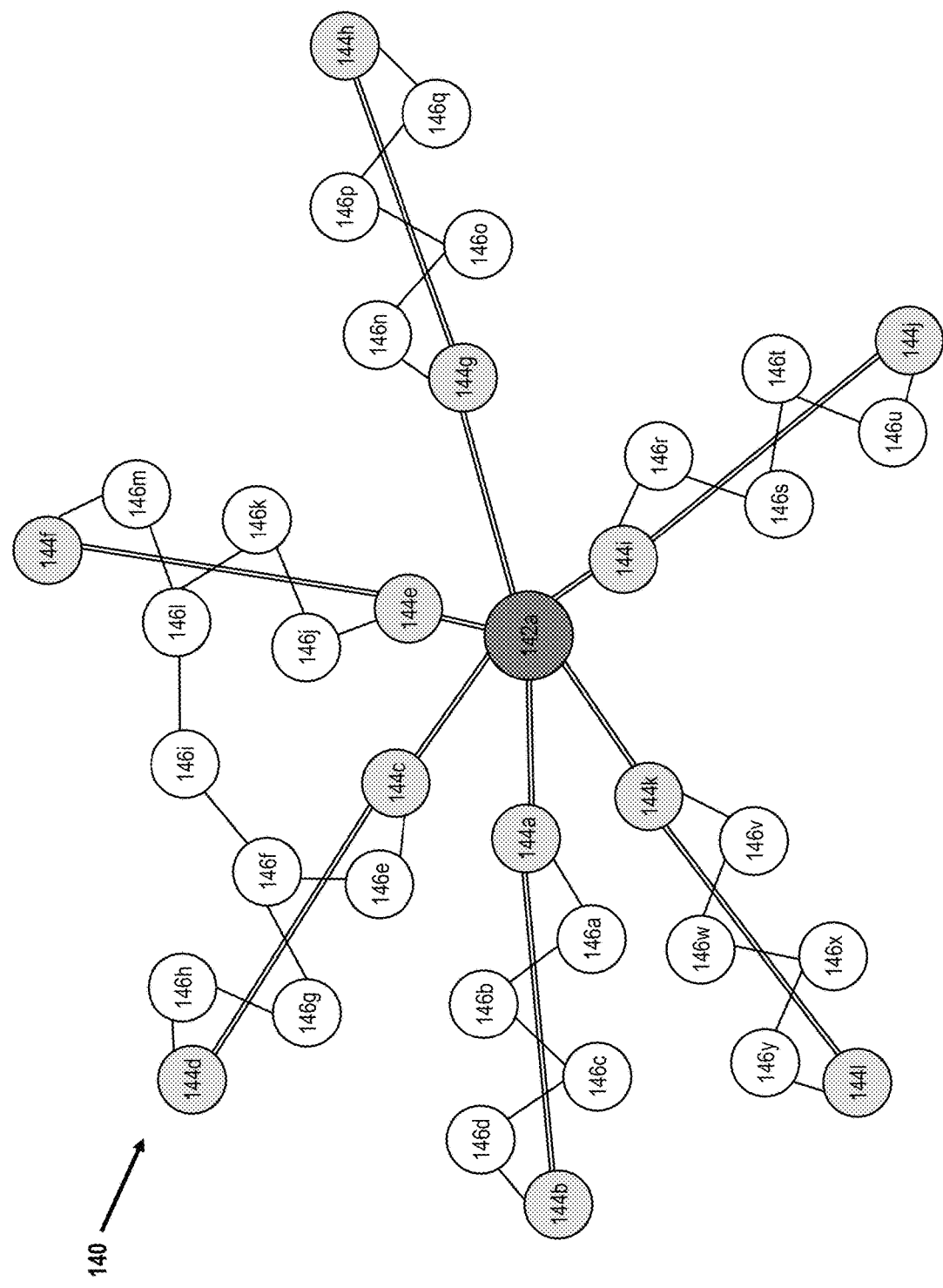
FIG. 1C depicts a simplified illustrative diagram of yet another example portion of an example mesh-based communication system that may be designed, implemented, and deployed in accordance with aspects of the disclosed technology.

FIG. 1C illustrates another simplified example 140 of a portion of a mesh-based communication system designed and implemented in accordance with the present disclosure. As shown, similar to the example mesh-based communication system 120 of FIG. 1B, the example mesh-based communication system 140 of FIG. 1C may include three different tiers of wireless communication nodes that are interconnected together in order to form a wireless mesh network: (i) a first tier of nodes 142 shown in dark gray, (ii) a second tier of nodes 144 shown in light gray, and (iii) a third tier of nodes 146 shown in white. However, it should be understood that the example mesh-based communication system 140 could also be extended to include a fourth tier of wireless communication nodes. In line with the discussion above, each of the depicted nodes comprises equipment installed at a respective infrastructure site, but to simplify the illustration, the respective infrastructure sites of the nodes are not depicted in FIG. 1C.

As shown in FIG. 1C, this portion of the example mesh-based communication system 140 may include (i) one first-tier node 142a that has high-capacity fiber connectivity to a core network, (ii) six different subsets of second-tier nodes 144 (e.g., 144a-b, 144c-d, 144e-f, 144g-h, 144i-j, and 144k-1) that form six high-capacity, multi-hop pathways extending from first-tier node 142a (i.e., six "spines"), where each such pathway comprises a chain of bi-directional ptp wireless links, and (iii) a number of third-tier nodes 146a-y that, together with the second-tier nodes 144a-1, form discrete sub-meshes of bi-directional ptp wireless links for routing aggregated network traffic to and from endpoints in one or more geographic areas, which in FIG. 1C may be co-extensive with the third-tier nodes 146a-y given that the example mesh-based communication system 140 is not shown to include any other downstream nodes such as fourth-tier nodes.

As further shown in FIG. 1C, certain of the high-capacity, multi-hop pathways may also be interconnected to one another via a sub-mesh of second-tier 144 and third-tier nodes 146 that extends from second-tier nodes 144 along both pathways. In particular, the two high-capacity, multi-hop pathways formed by second-tier nodes 144c-d and second-tier nodes 144e-f are shown to be interconnected to one another via a sub-mesh comprising those second-tier nodes as well as third-tier nodes 146e-m, which enables bi-directional network traffic originating from or destined to the core network to be exchanged with the third-tier nodes 146e-m in this sub-mesh along either of these two high-capacity pathways and also allows bi-directional network traffic to be exchanged between these two high-capacity pathways, which may provide redundancy, reduce latency, and/or allow load balancing to be applied between the two high-capacity pathways, among other advantages. Although not shown in FIG. 1C, it is also possible that second-tier nodes 144 along different high-capacity pathways may also be directed connected via a ptp wireless link.

In line with the discussion above, each of the bi-directional ptp wireless links established between the wireless communication nodes in FIG. 1C may take any of various forms, and in at least one implementation, each of the bi-directional ptp wireless links may take the form of a millimeter-wave wireless link that operates and carries traffic at frequencies in a frequency band within the millimeter-wave spectrum. Further, in line with the discussion above, the bi-directional ptp wireless links at different points within the example mesh-based communication system 160 could have differing levels of capacity (and perhaps also differing maximum lengths). For instance, the bi-directional ptp wireless links included in each chain of bi-directional ptp wireless links extending from first-tier node 142a through a respective subset of second-tier nodes 144 may each comprise a high-capacity wireless link having a first capacity level (e.g., at or near 10 Gbps or perhaps even higher) and a first maximum length, while the ptp wireless links that form the sub-meshes between and among the second-tier nodes 144 and third-tier nodes 146 may each comprise a high-capacity wireless link having a second capacity level that is lower than the first capacity level (e.g., at or near 2.5 Gbps) and a second maximum length that is lower than the first maximum length. However, the bi-directional wireless links established between the wireless communication nodes in FIG. 1C may take various other forms as well—including but not limited to the possibility that some or all of the bi-directional wireless links between the wireless communication nodes may comprise ptmp wireless links rather than ptp wireless links.

The example mesh-based communication system 140 may include various other communication nodes and/or take various other forms as well.

Figure 1D:
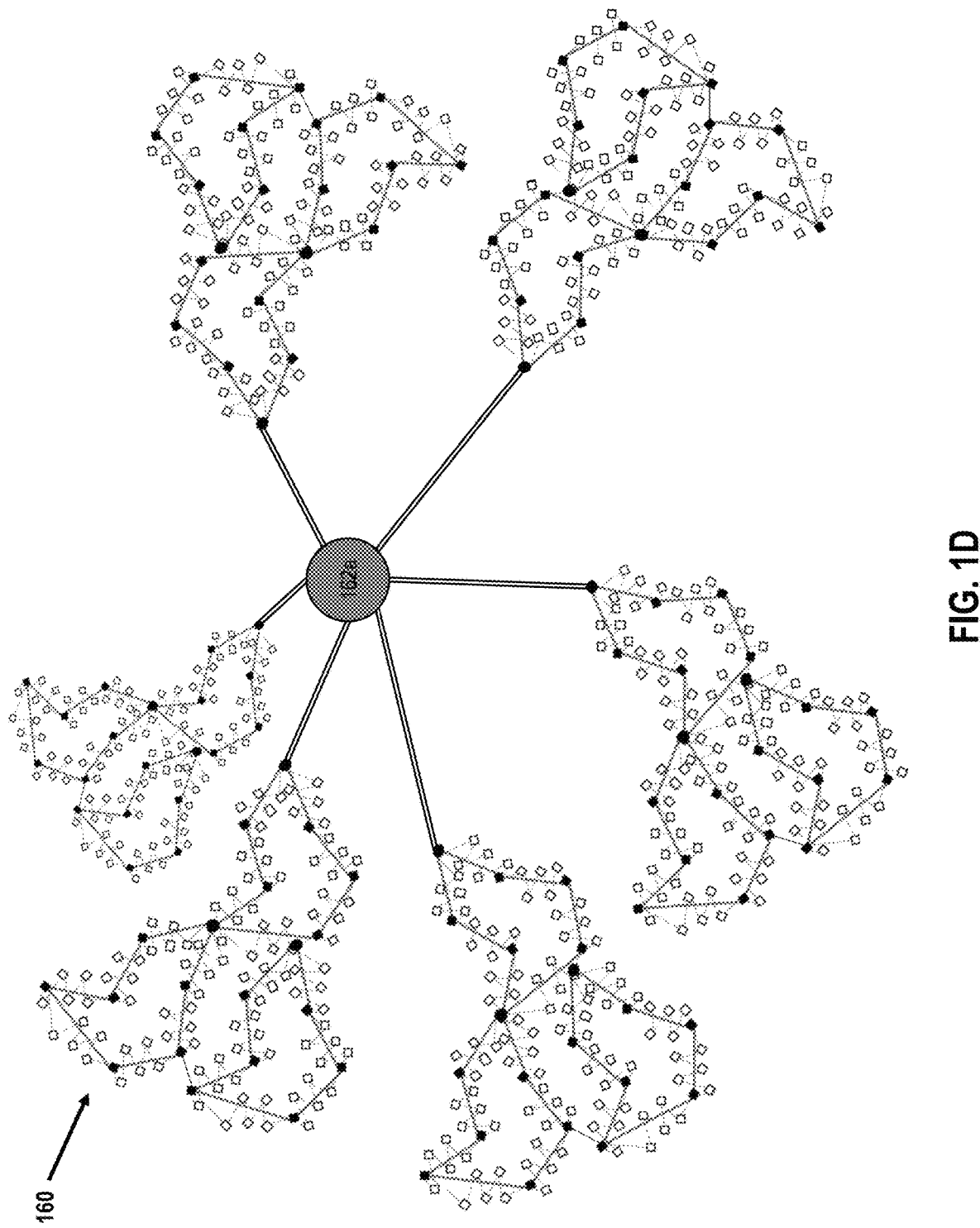
FIG. 1D depicts a simplified illustrative diagram of another example portion of an example mesh-based communication system that may be designed, implemented, and deployed in accordance with aspects of the disclosed technology.

FIG. 1D illustrates another simplified example 160 of a portion of a mesh-based communication system designed and implemented in accordance with the present disclosure. As shown, similar to the example mesh-based communication systems 120 and 140 of FIGS. 1B-1C, the example mesh-based communication system 160 of FIG. 1D may include three different tiers of wireless communication nodes that are interconnected together in order to form a wireless mesh network: (i) a first tier of nodes shown in dark gray, (ii) a second tier of nodes shown as black circles or squares, and (iii) a third tier of nodes shown as white squares. However, it should be understood that the example mesh-based communication system 160 could also be extended to include a fourth tier of wireless communication nodes. In line with the discussion above, each of the depicted nodes comprises equipment installed at a respective infrastructure site, but to simplify the illustration, the respective infrastructure sites of the nodes are not depicted in FIG. 1D.

As shown in FIG. 1D, this portion of the example mesh-based communication system 120 may include (i) one first-tier node 162a that has high-capacity fiber connectivity to a core network, (ii) six different clusters of second-tier nodes that form six clusters of high-capacity, multi-hop pathways extending from first-tier node 162a, where each such pathway comprises a chain of bi-directional ptp wireless links and may overlap in part with another pathway in the same cluster (e.g., the first portion of two pathways may comprise the same bi-directional ptp wireless links established by the same second-tier nodes but may then branch out into different directions and thereby form separate but overlapping high-capacity pathways for routing aggregated network traffic originating from or destined to the core network), and (iii) six different clusters of third-tier nodes that, together with the second-tier nodes in the respective clusters, form discrete sub-meshes of bi-directional ptp wireless links for routing aggregated network traffic to and from endpoints in one or more geographic areas, which in FIG. 1D may be co-extensive with the third-tier nodes given that the example mesh-based communication system 160 is not shown to include any other downstream nodes such as fourth-tier nodes.

In line with the discussion above, each of the bi-directional ptp wireless links established between the wireless communication nodes in FIG. 1D may take any of various forms, and in at least one implementation, each of the bi-directional ptp wireless links may take the form of a millimeter-wave wireless link that operates and carries traffic at frequencies in a frequency band within the millimeter-wave spectrum.

Further, in line with the discussion above, the bi-directional ptp wireless links at different points within the example mesh-based communication system 160 could have differing levels of capacity (and perhaps also differing maximum lengths). For instance, in one implementation, the ptp wireless links established between first-tier node 162a and a first second-tier node in each subset (shown as a black circle) may each comprise a high-capacity wireless link having a first capacity level (e.g., a capacity greater than 10 Gbps) and a first maximum length (e.g., a length within a range of 1-2 miles), the other ptp wireless links included in each high-capacity pathway extending from first-tier node 162a through a respective subset of second-tier nodes may each comprise a high-capacity wireless link having a second capacity level that is lower than the first capacity level (e.g. at or near 10 Gbps) and perhaps also a second maximum length that is lower than the first maximum length, and the ptp wireless links that form the sub-meshes between and among the second-tier nodes and third-tier nodes may each comprise a high-capacity wireless link having a third capacity level that is lower than the first and second capacity levels (e.g. at or near 2.5 Gbps) and perhaps also a third maximum length that is lower than the first and second maximum lengths. However, in other implementations, the first and second capacity levels and/or the first and second maximum lengths could be the same. The bi-directional wireless links established between the wireless communication nodes in FIG. 1D may take various other forms as well—including but not limited to the possibility that some or all of the bi-directional wireless links between the wireless communication nodes may comprise ptmp wireless links rather than ptp wireless links.

Further yet, although not shown in FIG. 1D, the wireless communication nodes in the example mesh-based communication system 160 may be interconnected in other manners as well. For instance, as one possibility, certain second-tier and/or third-tier nodes from the different clusters could be interconnected together via bi-directional ptp wireless links. As another possibility, first-tier node 162a could be connected to one or more additional second-tier nodes in a given cluster via one or more bi-directional ptp wireless links, such as second-tier node that is situated at different place within the cluster, which may provide redundancy, reduce latency, and/or allow load balancing to be applied for aggregated network traffic between the given cluster and first-tier node 162a, among other advantages. In such an implementation, it is possible that, in order to reach an additional second-tier node in a cluster, the additional bi-directional ptp wireless link between first-tier node 162a and the additional second-tier node may need to exceed a maximum length threshold at which bi-directional ptp wireless link is expected to reliably carry network traffic and may be liable to degrade below and acceptable in certain scenarios (e.g., when certain environmental conditions such as rain or snow are present), in which case first-tier node 162a and a given subset of the second-tier and third-tier nodes in the given cluster may function to exchange network traffic utilizing the bi-directional ptp wireless link with the additional second-tier node in the given cluster when it is available and to exchange network traffic utilizing the bi-directional ptp wireless link with the first second-tier node in the given cluster.

The example mesh-based communication system 160 may include various other communication nodes and/or take various other forms as well.

Several other variations and extensions of the mesh-based communication system architectures disclosed herein are also possible. For instance, according to one possible extension of the mesh-based communication system architectures disclosed herein, some of all of the nodes in the different tiers of the mesh-based communication system may additionally be installed with respective equipment that enables such nodes to operate as part of a distributed data storage platform, such as a distributed data storage platform that hosts digital content for download or streaming (e.g., video content, audio content, video games, etc.) and/or hosts user files uploaded by end users for storage and future retrieval, among other possibilities. For example, some of all of the nodes in the different tiers of the mesh-based communication system may additionally be installed with respective data storage units that are configured to store data as part of a distributed data storage platform.

According to another possible extension of the mesh-based communication system architectures disclosed herein, some of all of the nodes in the different tiers of the mesh-based communication system may additionally be installed with respective equipment that enables such nodes to operate as part of an edge computing platform, which may support any of various edge computing applications (e.g., autonomous vehicle applications, industrial automation and/or robotics applications, augmented/virtual reality applications, video monitoring and/or processing applications, etc.). For example, some of all of the nodes in the different tiers of the mesh-based communication system may additionally be installed with respective edge computing systems that each comprise hardware and associated software for performing functions related to one or more edge computing applications, where these edge computing systems may be configured to communicate with one another via the wireless links of the mesh-based communication system. Advantageously, such an architecture may enable the nodes in the mesh-based communication system to additionally perform processing and/or data storage for edge computing applications in a distributed manner at sites that are closer to the location where data for the edge computing applications is being generated and/or consumed, which may improve the response time and/or usability of such edge computing applications. Further details regarding this extension of the mesh-based communication system architectures disclosed herein are described in U.S. patent application Ser. No. 17/506,594, which is incorporated herein by reference in its entirety.

According to yet another possible extension of the mesh-based communication system architectures disclosed herein, some of all of the nodes in the different tiers of the mesh-based communication system may additionally be installed with respective equipment that enables such nodes to operate as blockchain nodes within a blockchain network, which may support any of various blockchain-based applications and/or services (e.g., digital content storage, digital content distribution, social media, gaming, virtual experiences, etc.). For example, some of all of the nodes in the different tiers of the mesh-based communication system may additionally be installed with respective computing systems that each comprise hardware and associated software for operating as a node of a blockchain network (e.g., a client for storing, validating, and/or relaying blockchain-based transactions), where these computing systems may be configured to communicate with one another via the wireless links of the mesh-based communication system. Advantageously, such an architecture may enable the nodes in the mesh-based communication system to serve a dual purpose of delivering both mesh-based applications and/or services to users, such as high-speed internet, as well as blockchain-based applications and/or services to users. Further details regarding this extension of the mesh-based communication system architectures disclosed herein are described in U.S. patent application Ser. No. 17/345,914, which is incorporated herein by reference in its entirety.

Other variations and extensions of the mesh-based communication system architectures disclosed herein are possible as well. For instance, while the wireless communication nodes are described above as comprising equipment installed at ground-based infrastructure sites such as residential buildings, commercial buildings, support structures, or the like, one possible variation of the mesh-based communication system architectures disclosed herein is that at least some of the wireless communication nodes within a mesh-based communication system could comprise equipment installed at aerial stations such as aerial balloons, aerial vehicles, or the like, which are sometimes referred to as either high-altitude platform stations (HAPS) or low-altitude platform stations (LAPS) depending on the altitude of the stations. In this respect, wireless communication nodes within any of the various tiers of a mesh-based communication system could be implemented at aerial stations rather than ground-based infrastructure sites. To illustrate with one example embodiment of this variation, some or all of the wireless communication nodes in the second tier of a mesh-based communication system (e.g., the second-tier nodes that are directly connected to the tier-one nodes) could be implemented at aerial stations, while the wireless communication nodes in the other tiers of the mesh-based communication system could all be implemented at ground-based infrastructure sites. However, in other example embodiments, some or all of the wireless communication nodes in the other tiers of the mesh-based communication system could be implemented at aerial stations.

II. Wireless Communication Nodes

As discussed above, each wireless communication node in a mesh-based communication system may comprise respective equipment for operating as part of the wireless mesh network that has been installed at a respective infrastructure site. This equipment may take any of various forms. For instance, as discussed above, a wireless communication node may include (i) wireless mesh equipment for establishing and communicating over one or more bi-directional ptp and/or ptmp wireless links with one or more other wireless communication nodes, (ii) networking equipment that facilitates communication between the node's wireless mesh equipment and other devices or systems located at the node's infrastructure site, and (iii) power equipment for supplying power to the node's wireless mesh equipment and/or the node's networking equipment, among other possibilities.

Figure 2A:
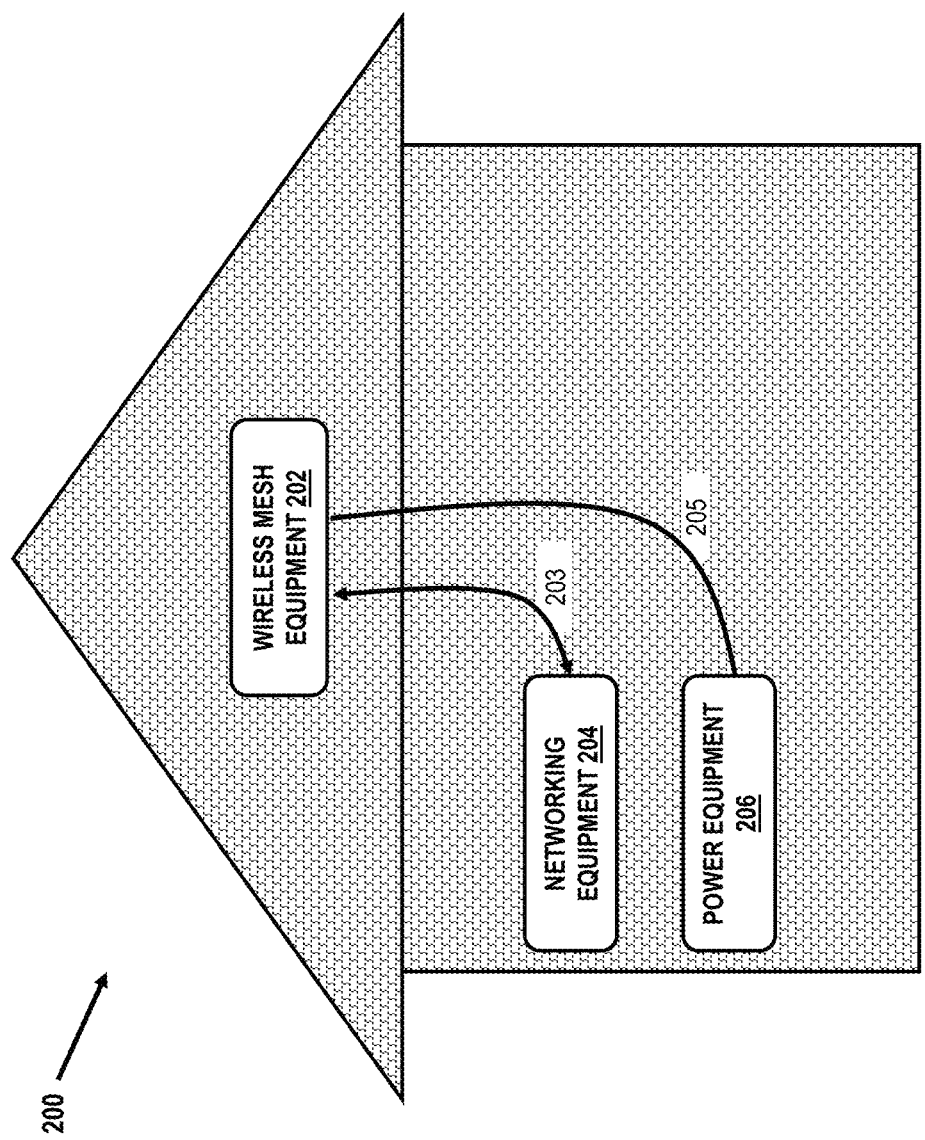
FIG. 2A depicts an example wireless communication node of an example mesh-based communication system in accordance with aspects of the disclosed technology.

One illustrative example of a wireless communication node 200 in a mesh-based communication system is depicted in FIG. 2A. As shown in FIG. 2A, the example wireless communication node 200 comprises equipment installed at a residential building that takes the form of (i) wireless mesh equipment 202 installed outside of the building, such as on the roof, (ii) networking equipment 204 installed inside the building that is connected to wireless mesh equipment 202 via a communication link 203, and (iii) power equipment 206 installed inside the building that is connected to the wireless mesh equipment 202 (and perhaps also the networking equipment 204) via a power cable 205. Although not shown, the example wireless communication node 200 may comprise other types of equipment installed at an infrastructure site as well. Further, while the example wireless communication node 200 is shown as being implemented at a residential building, it should be understood that the example wireless communication node 200 be implemented at another type of ground-based infrastructure site (e.g., a commercial building, a support structure, or the like) or perhaps at an aerial station such as a HAPS or LAPS.

In line with the discussion above, the wireless mesh equipment 202 may generally comprise equipment for establishing and communicating over one or more bi-directional ptp and/or ptmp wireless links with one or more other wireless communication nodes of a wireless mesh network. Such wireless mesh equipment 202 may take any of various forms, which may depend in part on where the wireless communication node 200 is situated within a mesh-based communication system's architecture.

As a starting point, the example wireless communication node's wireless mesh equipment 202 may include one or more wireless radios, each of which may comprise a ptp or ptmp radio that is generally configured to establish a respective bi-directional ptp or ptmp wireless link with at least one other ptp or ptmp radio and then wirelessly transmit and receive network traffic over the respective bi-directional ptp or ptmp wireless link. For instance, the node's one or more wireless radios may comprise (i) one or more ptp radios that are each configured to establish and wirelessly exchange bi-directional network traffic over a respective bi-directional ptp wireless link, (ii) one or more ptmp radios that are each configured to establish and wirelessly exchange bi-directional network traffic over a respective bi-directional ptmp wireless link, or (iii) some combination of one or more ptp radios and one or more ptmp radios.

To illustrate with an example in the context of the example mesh-based communication system 100 of FIG. 1A, (i) a first subset of the wireless communication nodes may be equipped with one or more ptp radios only, including first-tier nodes 102a and 102b (one ptp radio each), second-tier nodes 104a (two ptp radios), 104b (two ptp radios), and 104c (three ptp radios), and third-tier nodes 106a (three ptp radios), 106c (one ptp radio), 106e (one ptp radio), and 106f (two ptp radios), (ii) a second subset of the wireless communication nodes may be equipped with a combination of one or more ptp radios and one or more ptmp radios, including third-tier node 106b (two ptp radios and one ptmp radio), third-tier node 106d (one ptp radio and one ptmp radio), and third-tier node 106g (one ptp radio and one ptmp radio), and (iii) a third subset of the wireless communication nodes may be equipped with one or more ptmp radios only, including each of the fourth-tier nodes 108.

Further, the example wireless communication node's wireless mesh equipment 202 may include at least one processing unit that is generally be configured to perform various functions in order to facilitate the node's operation as part of the wireless mesh network. (Such a processing unit may at times be referred to as a processing unit (NPU), a main brain unit (MBU), or a digital unit, among other possibilities). For instance, as one possibility, the node's at least one processing unit may be configured to process network traffic that is received from one or more other wireless communication nodes via the node's one or more wireless radios (e.g., by performing baseband processing) and then cause that received network traffic to be routed in the appropriate manner. For example, if the received network traffic comprises aggregated network traffic destined for another endpoint, the node's at least one processing unit may process the received network traffic and then cause the node's one or more wireless radios to transmit the received network traffic to the one or more other wireless communication nodes. As another example, if the received network traffic comprises individual network traffic destined for a client device within the building, the node's at least one processing unit may process the received network traffic and then cause it to be delivered to the client device via the node's networking equipment 204. As yet another example, if the node 200 comprises a first-tier node and the received network traffic comprises aggregated network traffic that is to be sent over a fiber link between the first-tier node and the core network, the node's at least one processing unit may process the received network traffic and then cause it to be sent to the core network over the fiber link between the first-tier node and the core network (e.g., via the node's networking equipment 204 or via a core-network interface included within the at least one processing unit itself). As still another example, if the received network traffic comprises network traffic destined for a wired communication node connected to the node 200, the node's at least one processing unit may process the received network traffic and then cause it to be sent to the wired communication node over the wired link between the node 200 and the wired communication node (e.g., either via the node's networking equipment 204 or via a wired interface included within the at least one processing unit itself). The at least one processing unit's processing and routing of network traffic that is received from one or more other wireless communication nodes via the node's one or more wireless radios may take other forms as well.

As another possibility, the node's at least one processing unit may be configured to process network traffic that is received from the node's networking equipment 204 (e.g., by performing baseband processing) and then cause that received network traffic to be routed in the appropriate manner. For example, if the network traffic received from the node's networking equipment 204 comprises network traffic that originated from a client device within the building, the node's at least one processing unit may process the received network traffic and then cause the node's one or more wireless radios to transmit the received network traffic to the one or more other wireless communication nodes. As another example, if the node 200 comprises a first-tier node and the network traffic received from the node's networking equipment 204 comprises network traffic that was received over a fiber link with the core network, the node's at least one processing unit may process the received network traffic and then cause the node's one or more wireless radios to transmit the received network traffic to the one or more other wireless communication nodes. As yet another example, if the network traffic received from the node's networking equipment 204 comprises network traffic that was received over a wired link with a wired communication link, the node's at least one processing unit may process the received network traffic and then cause the node's one or more wireless radios to transmit the received network traffic to the one or more other wireless communication nodes. Other examples are possible as well.

As yet another possibility, the node's at least one processing unit may be configured to engage in communication with a centralized computing platform, such as a network management system (NMS) or the like, in order to facilitate any of various network management operations for the mesh-based communication system. For instance, the node's at least one processing unit may be configured to transmit information about the configuration and/or operation of the node to the centralized platform via the wireless mesh network and/or receive information about the configuration and/or operation of the node from the centralized platform via the wireless mesh network, among other possibilities.

The example wireless communication node's at least one processing unit may be configured to perform other functions in order to facilitate the node's operation as part of the wireless mesh network as well.

In some embodiments, a wireless communication node's at least one processing unit may comprise one centralized processing unit that is physically separate from the node's one or more wireless radios and interfaces with each of the node's one or more wireless radios via a respective wired link that extends from the centralized processing unit to each physically-separate wireless radio, which may take the form of a copper-based wired link (e.g., a coaxial cable, Ethernet cable, a serial bus cable, or the like) or a fiber-based wired link (e.g., a glass optical fiber cable, a plastic optical fiber cable, or the like). For instance, if a wireless communication node's wireless mesh equipment 200 includes three wireless radios, such a centralized processing unit may connect to a first one of the wireless radios via a first wired link, connect to a second one of the wireless radios via a second wired link, and connect to a third one of the wireless radios via a third wired link. Many other examples are possible as well. In such embodiment, the centralized processing unit may be housed in one enclosure, and each of the one or more wireless radios may be housed in a separate enclosure, where each such enclosure may be designed for outdoor placement (e.g., on a roof of a building) and the wired links may likewise be designed for outdoor placement. However, other physical arrangements are possible as well. One representative example of such an embodiment is shown and described with reference to FIG. 25 of U.S. Pat. No. 10,966,266, which is incorporated herein by reference in its entirety.

In other embodiments, a wireless communication node's at least one processing unit may comprise one centralized processing unit that is included within the same physical housing as the node's one or more wireless radios and interfaces with each of the node's one or more wireless radios via a respective wired link that extends from the centralized processing unit to each wireless radio within the shared housing, which may take the form of a copper-based wired link (e.g., a coaxial cable, Ethernet cable, serial bus cable, or the like) or a fiber-based wired link (e.g., a glass optical fiber cable, a plastic optical fiber cable, or the like). In such embodiment, the centralized processing unit and the one or more wireless radios may all be housed in a single enclosure, which may be designed for outdoor placement (e.g., on a roof of a building). However, other physical arrangements are possible as well. One representative example of such an embodiment is shown and described with reference to FIG. 21 of U.S. Pat. No. 10,966,266, which is incorporated herein by reference in its entirety.

In still other embodiments, instead of or in addition to a centralized processing unit, a wireless communication node's at least one processing unit could comprise a set of one or more radio-specific processing units that are each integrated into a respective one of the node's one or more wireless radios, in which case this set of radio-specific processing units may carry out the processing unit functionality described above for the wireless communication node 200. In such embodiment, each of the one or more wireless radios may be housed in a separate enclosure, where each such enclosure may be designed for outdoor placement (e.g., on a roof of a building). However, other physical arrangements are possible as well. Some representative examples of wireless radios having integrated processing units include the "Module A," "Module B," "Module C," and "Module D" types of wireless radios described in U.S. Pat. No. 10,966,266, which is incorporated herein by reference in its entirety.

Other embodiments of the example wireless communication node's at least one processing unit may be possible as well—including but not limited to embodiments in which the example wireless communication node includes multiple physically-separate, centralized processing units that collectively interface with the node's one or more wireless radios and are configured to collectively carry out the processing unit functionality described above for the wireless communication node 200 (e.g., in scenarios where additional processing power is needed).

Further on the type of wireless communication node and/or where it is situated a mesh-based communication system's architecture, it is possible that the wireless communication node's wireless mesh equipment 202 may include one or more wireless radios but not a processing unit. For instance, it is possible that the wireless mesh equipment 202 of a wireless communication node such as a fourth-tier node may take the form of a single wireless radio (e.g., a ptmp radio), without a processing unit of the type described above.

Further yet, it is possible that the wireless communication node's wireless mesh equipment 202 may include certain components that are physically present but are not operational. For instance, it is possible that the wireless mesh equipment 202 of a wireless communication node may include a wireless radio or processing unit that is physically present at the installation site but is not currently operational (e.g., a wireless radio in a disconnected state).

Still further, the node's wireless mesh equipment 202 may be installed outside of the building using any of various types of mounting equipment, and some representative examples of mounting equipment that may be utilized to mount the node's wireless mesh equipment 202 outside of the building are described in U.S. patent application Ser. No. 17/963,072, which is incorporated herein by reference in its entirety. The manner in which the node's wireless mesh equipment 202 may also take other forms well, particularly for other types of infrastructure sites.

Figure 2B:
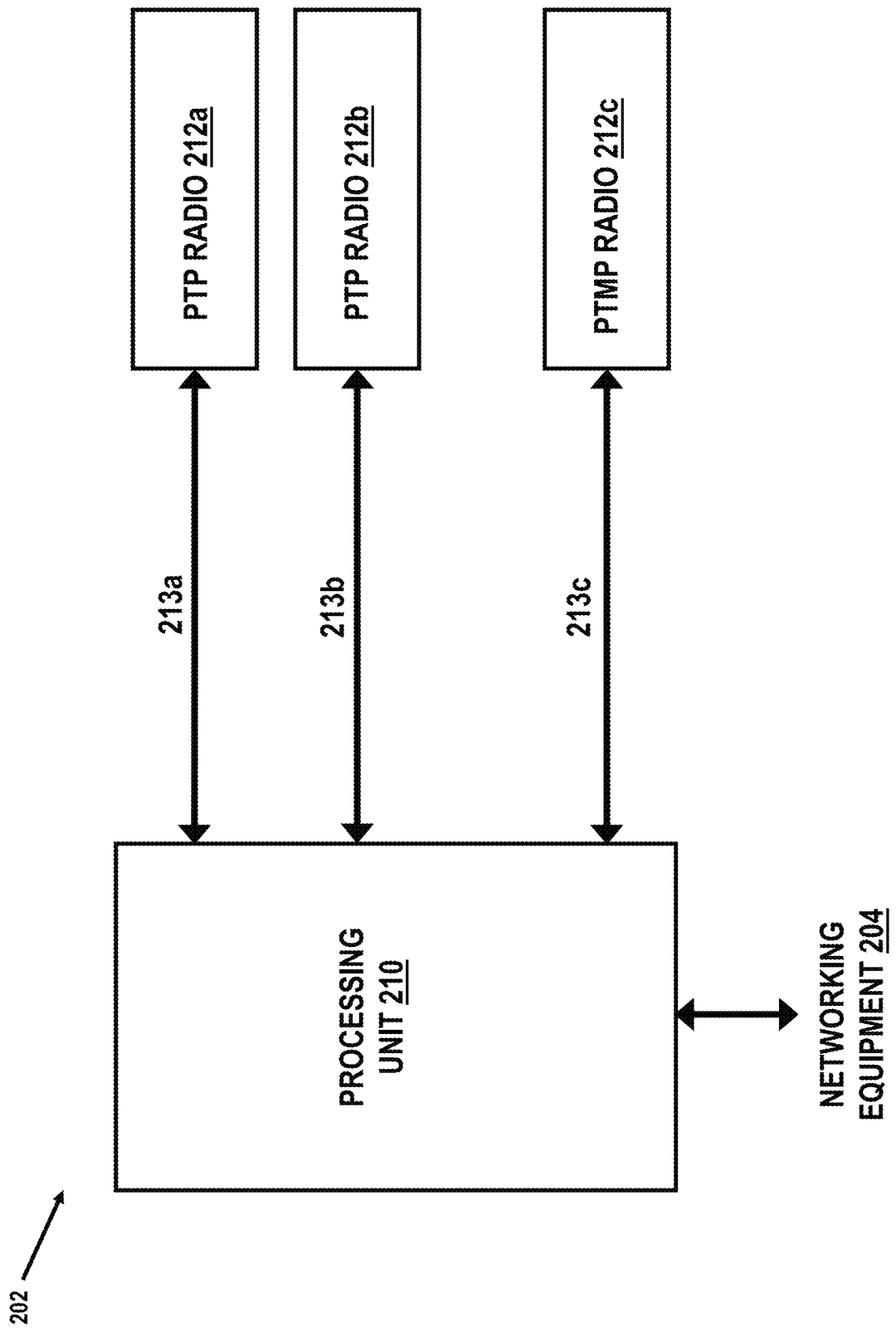
FIG. 2B depicts a block diagram of example wireless mesh equipment that may be included in the example wireless communication node of FIG. 2A in accordance with aspects of the disclosed technology.

One illustrative example of the wireless mesh equipment 202 of FIG. 2A is depicted in FIG. 2B. As shown in FIG. 2B, the example wireless mesh equipment 202 may include a centralized processing unit 210 that is connected to multiple physically-separate wireless radios 212 via respective wired links 213, which are shown to include (i) a first ptp radio 212a that is connected to centralized processing unit 210 via a first wired link 213a, (ii) a second ptp radio 212b that is connected to centralized processing unit 210 via a second wired link 213b, and (iii) a ptmp radio 212c that is connected to centralized processing unit 210 via a third wired link 213c. In practice, such an arrangement of wireless radios may be most applicable to a third-tier node that is connected to two second-tier and/or peer third-tier nodes via two bi-directional ptp wireless links and is also connected to one or more fourth-tier nodes via a bi-directional ptmp wireless link. However, as discussed above, the example wireless mesh equipment 202 could include any number of ptp and/or ptmp radios, which may depend in part on where the example wireless communication node 200 is situated with the mesh-based communication system's architecture.

Figure 2C:
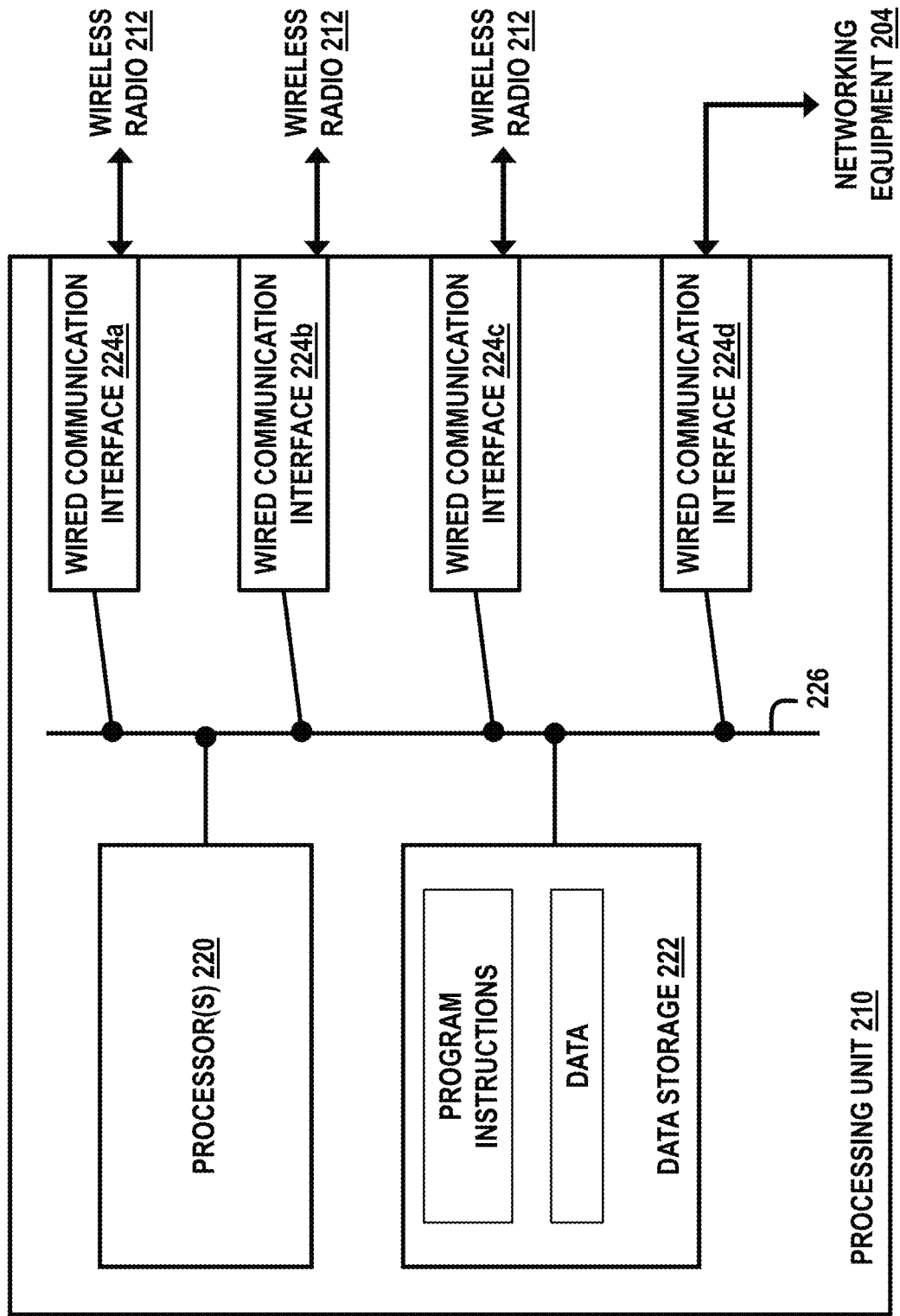
FIG. 2C depicts a block diagram of an example network processing unit of the example wireless communication node of FIG. 2A in accordance with aspects of the disclosed technology.

In general, the centralized processing unit 210 may comprise a set of compute resources (e.g., one or more processors and data storage) that is installed with executable program instructions for carrying out the NPU functions discussed above, along with a set of communication interfaces that are configured to facilitate the centralized processing unit's communication with the wireless radios 212 and the node's network equipment 204. One possible example of such a centralized CPU 210 is depicted in FIG. 2C. As shown in FIG. 2C, the example centralized CPU 210 may include one or more processors 220, data storage 222, and a set of communication interfaces 224, all of which may be communicatively linked by a communication link 226 that may take the form of a system bus, a communication network such as a public, private, or hybrid cloud, or some other connection mechanism. Each of these components may take various forms.

The one or more processors 220 may each comprise one or more processing components, such as general-purpose processors (e.g., a single- or a multi-core central processing unit (CPU)), special-purpose processors (e.g., a graphics processing unit (GPU), application-specific integrated circuit, or digital-signal processor), programmable logic devices (e.g., a field programmable gate array), controllers (e.g., microcontrollers), and/or any other processor components now known or later developed.

In turn, the data storage 222 may comprise one or more non-transitory computer-readable storage mediums that are collectively configured to store (i) program instructions that are executable by one or more processors 220 such that the centralized processing unit 210 is configured to perform any of the various processing unit functions disclosed herein, and (ii) data that may be received, derived, or otherwise stored, for example, in one or more databases, file systems, repositories, or the like, by centralized processing unit 210, in connection with performing any of the various functions disclosed herein. In this respect, the one or more non-transitory computer-readable storage mediums of the data storage 222 may take various forms, examples of which may include volatile storage mediums such as random-access memory, registers, cache, or the like, and non-volatile storage mediums such as read-only memory, a hard-disk drive, a solid-state drive, flash-memory unit, an optical-storage device, or the like, among other possibilities. It should also be understood that certain aspects of the data storage 222 may be integrated in whole or in part with the one or more processors 220.

Turning now to the set of communication interfaces 224, in general, each such communication interface 224 may be configured to facilitate wireless or wired communication with some other aspect of the example wireless communication node's equipment, such as a wireless radio 212 or the node's network equipment 204. For instance, FIG. 2C shows the centralized processing unit's set of communication interfaces 224 to include at least (i) a first wired communication interface 224a for interfacing with a first wireless radio 212 via a first wired link, (ii) a second wired communication interface 224b for interfacing with a second wireless radio 212 via a second wired link, (iii) a third wired communication interface 224c for interfacing with a third wireless radio 212 via a third wired link, and (iv) a fourth wired communication interface 224d for interfacing with the node's networking equipment 204 via a fourth wired link. However, the centralized processing unit's set of communication interfaces 224 may include various other arrangements of wired interfaces as well, including more or fewer communication interfaces for wireless radios and/or other communication interfaces for networking equipment. In line with the discussion above, each of these wired communication interfaces 224 may take any of various forms, examples of which may include a coaxial interface, an Ethernet interface, a serial bus interface (e.g., PCI/PCIe, Firewire, USB, Thunderbolt, etc.), a glass optical fiber interface, or a plastic optical fiber interface, among other possibilities. Further, in some embodiments, certain of these wired communication interfaces 224 could be replaced with a wireless communication interface, which may take the form a chipset and antenna adapted to facilitate wireless communication according to any of various wireless protocols (e.g., Wi-Fi or point-to-point protocols). Further yet, if the node 200 is a first-tier node, the set of communication interfaces 224 may include an additional wired interface for communicating with the core network, which may take any of various forms, including but not limited to an SFP/SFP+ interface. The set of communication interfaces 224 may include other numbers of wired communication interfaces and/or may take various other forms as well.

Although not shown in FIG. 2C, the centralized processing unit's set of communication interfaces 224 may also include an additional communication interface that facilitates interaction with an on-site technician (or the like) and thereby enables the on-site technician to input and/or access information about the configuration and/or operation of the node's wireless mesh equipment 202. This additional communication interface may take any of various forms. As one possibility, the additional communication interface may comprise a communication interface that is configured to facilitate wireless or wired communication between the centralized processing unit 210 and a local client device via a LAN (e.g., a Wi-Fi or Ethernet interface), a point-to-point link (e.g., a Bluetooth interface), or the like. As another possibility, the additional communication interface may comprise a communication interface that is configured to facilitate direct user interaction with centralized processing unit 210 via user-interface components such as a keyboard, a mouse, a trackpad, a display screen, a touch-sensitive interface, a stylus, a virtual-reality headset, and/or one or more speakers, among other possibilities. This additional communication interface for facilitating interaction with an on-site technician may take other forms as well.

Example centralized processing unit 210 may include various other components and/or take various other forms as well.

Returning to FIG. 2B, in general, each ptp radio included within the example wireless communication equipment 202 (e.g., each of ptp radios 212a and 212b) may include components that enable the ptp radio to establish a bi-directional ptp wireless link with another ptp radio and then wirelessly transmit and receive network traffic over the established bi-directional ptp wireless link with another wireless communication node. These components may take any of various forms.

Figure 2D:
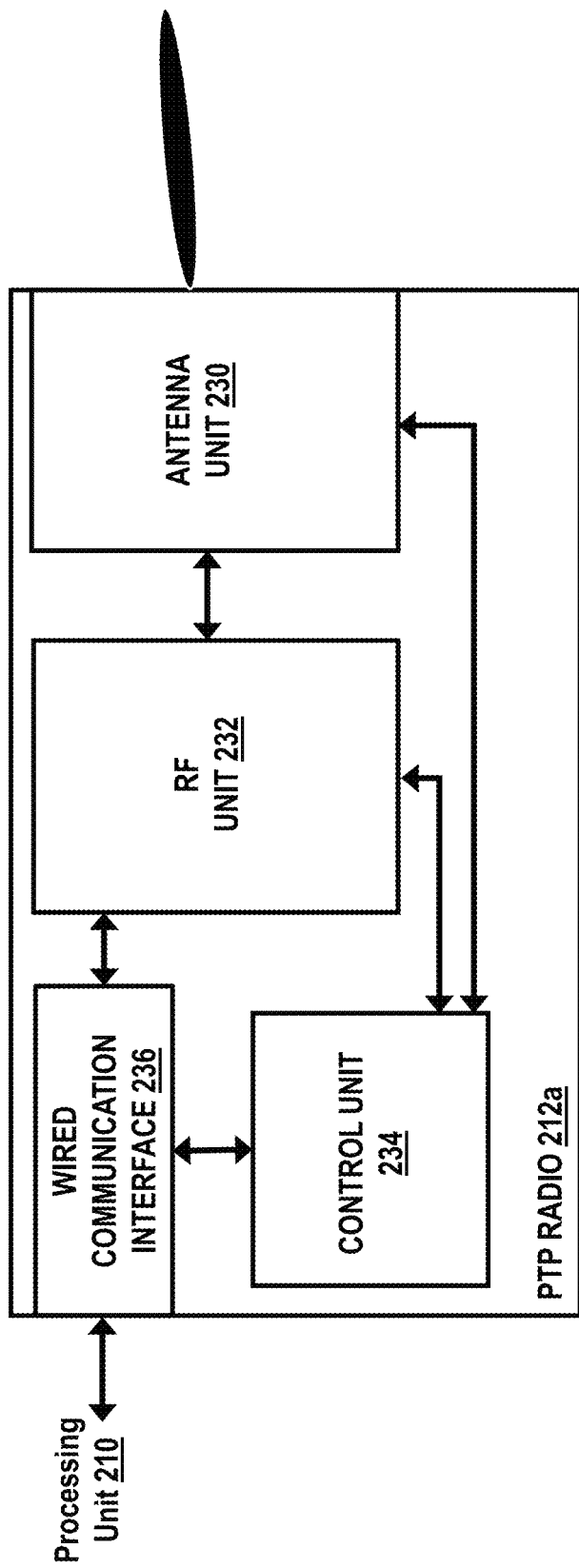
FIG. 2D depicts a block diagram of example components that may be included in an example point-to-point radio of the example wireless communication node of FIG. 2A in accordance with aspects of the disclosed technology.

One possible example of the components that may be included in an example ptp radio, such as ptp radio 212a, is depicted in FIG. 2D. As shown in FIG. 2D, example ptp radio 212a may include at least (i) an antenna unit 230, (ii) a radio frequency (RF) unit 232, (iii) a control unit 234, and (iv) a wired communication interface 236, among other possible components. (For purposes of illustration, FIG. 2D shows the components of example ptp radio 212a as being co-located within the same physical housing, but it should be understood that this is merely one possible implementation of a ptp radio, and that in other implementations, the components of a ptp radio may be physically arranged in other manners). Each of these components may take various forms.

The antenna unit 230 of example ptp radio 212a may generally comprise an antenna that is configured to transmit and receive wireless signals having a focused beamwidth (e.g., a 3 dB-beamwidth of less than 1 degree, between 1 and 5 degrees, between 5 and 10 degrees, or perhaps greater than 10 degrees, among other possibilities) in one particular direction, which may facilitate ptp communication with a ptp radio of another wireless communication node in that direction. Such an antenna unit 230 may take any of various forms.

For instance, in one implementation, the example ptp radio's antenna unit 230 may comprise a parabolic antenna that is based on a parabolic reflector (sometimes also referred to as a parabolic dish or mirror) along with a feed antenna that is connected to the RF unit 232 via a waveguide.

In another implementation, the example ptp radio's antenna unit 230 may comprise a lens antenna that is based on an electro-magnetic lens (e.g., a dielectric lens or a metal-plate lens) along with a feed antenna that is connected to the RF unit 232 via a waveguide.

In yet another implementation, the example ptp radio's antenna unit 230 may comprise a phased array antenna, which typically takes the form of an array of multiple individual antenna elements along with corresponding phase shifters that function to adjust the phase of the RF signals exchanged between the RF unit 232 and the array of antenna elements. During transmission, the RF unit 232 may output a respective RF signal for each antenna element to an actively-powered phase shifter corresponding to the antenna element, which may produce a phase-shifted version of the RF signal and feed that into the antenna element, and each antenna element may then radiate the received, phase-shifted version of the respective RF signal as a respective radio wave that combines together with the respective radio waves radiated by the other antenna elements to form a composite wireless signal in the direction of another wireless communication node's ptp radio. Correspondingly, during reception, each antenna element may detect a respective portion of a wireless signal that is received from another wireless communication node's ptp radio, which may induce a respective RF signal at the antenna element, and may then pass the respective RF signal induced at the antenna element to the actively-powered phase shifter that corresponds to the antenna element, which may produce a phase-shifted version of the respective RF signal and then provide it to the RF unit 232 where it may be processed and combined with phase-shifted versions of RF signals that were induced by received wireless signal at the other antenna elements.

In practice, a phased antenna array may provide the capability to electronically change the direction of the wireless signals being transmitted and received by the antenna unit 230 via the phase shifters, which is commonly referred to as "beamsteering" or "beamforming." For instance, each antenna element's corresponding phase shifter may be configured to receive a control signal (e.g., from the example ptp radio's control unit 234) that serves to define the respective phase shift to be applied by the phase shifter, and respective phase-shift settings of the different phase shifters may collectively serve to define the particular direction in which the antenna unit 230 transmits and receives wireless signals.

This beamsteering capability may be utilized during the initial setup of the example ptp radio 212a in order to point the phased array antenna's beam in the direction of a given other node in the mesh-based communication system with which a ptp wireless link is to be established. Additionally, this beamsteering could be utilized after the initial setup in order to facilitate other functionality as well. For example, if the node's processing unit 210 detects a degrade in the quality of the ptp wireless link that was initially established with a ptp radio of one given node within the mesh-based communication system during the initial setup (e.g., due to a change in the physical environment that is impeding the LOS of the nodes, a change in wireless signals surrounding the ptp wireless link that causes increased interference, or a change to the state or location of the first other node's ptp radio), the node's processing unit 210 may instruct the ptp radio 212a to change the direction of the wireless signals being transmitted and received by the antenna unit 230 so as to establish a new ptp wireless link with a ptp radio of a different node within the mesh-based communication system. As another example, if the node's processing unit 210 receives a communication from centralized computing platform such as an NMS that instructs the processing unit 210 to establish a new ptp wireless link with a different node within the mesh-based communication system, the node's processing unit 210 may instruct the ptp radio 212a to change the direction of the wireless signals being transmitted and received by the antenna unit 230 so as to establish the new ptp wireless link with a ptp radio of that node. As yet another example, the ptp radio 212a may utilize its beamsteering capability to perform a "network sensing" operation in order to gather information about any other wireless communication node(s) within the node's surrounding area having radio modules that can be sensed by the given radio module. Such "network sensing" functionality is described in further detail in U.S. application Ser. No. 17/963,072, which is incorporated herein by reference in its entirety. Other examples are possible as well.

The example node 200 could also utilize a phased array antenna's beamsteering capability for other purposes.

The phased array antenna's array of individual antenna elements may take various forms and be arranged in any of various manners. For instance, as one possible implementation, the phased array antenna's array of individual antenna elements may comprise a single group of antenna elements (e.g., patch or microstrip antenna elements) that are responsible for carrying out both the transmission of wireless signals and the reception of wireless signals for a given ptp wireless link. As another possible implementation, the phased array antenna's array of individual antenna elements may comprise two separate groups of antenna elements (e.g., patch or microstrip antenna elements), where one group is responsible for carrying out the transmission of wireless signals for a given ptp wireless link and another group is responsible for carrying out the reception of wireless signals for the given ptp wireless link. As yet another possible implementation, the phased array antenna's array of individual antenna elements may comprise multiple separate groups of antenna elements (e.g., patch or microstrip antenna elements) where each such group serves to define a separate ptp wireless link, which may enable the example ptp radio 212*a* to establish multiple ptp wireless links with multiple other nodes within the mesh-based communication system. The phased array antenna's array of individual antenna elements may take other forms and/or be arranged in other manners as well—including but not limited to the possibility that the antenna elements in the array may have different polarizations (e.g., a first set of antenna elements may have a vertical polarization and a second set of antenna elements may have a horizontal polarization).

Further, the number of antenna elements included in the phased array antenna's array of individual antenna elements may take various forms, and in at least some implementations, the number of antenna elements included in the phased array antenna's array of individual antenna elements may be determined based on the desired beamwidth, frequency, capacity, and/or length of the ptp wireless link to be established by the antenna unit 230. In this respect, a phased array antenna with a larger number of antenna elements will typically be capable of establishing a ptp wireless link having a narrower beamwidth and a higher capacity, but may also increase the size, cost, and complexity of the ptp radio 212*a*, so these factors may be balanced against each other when determining the number of antenna elements to include in a phased array antenna for use as the antenna unit 230 of a ptp radio 212*a*.

Further yet, the phased array antenna's phase shifters may take various forms and be arranged in any of various manners. For instance, as one possible implementation, the phased array antenna's phase shifters may comprise a separate phase shifter component (e.g., a separate integrated circuit (IC) or micro-electro-mechanical system (MEMS) chip) for each individual antenna element in the array that is configured to control the phase of that one individual antenna element. As another possible implementation, the phased array antenna's phase shifters may comprise a set of phase shifter components (e.g., IC or MEMS chips) that are each configured to control the phase of multiple antenna elements in the array (e.g., one phase shifter component for every 2 antenna elements). The phased array antenna's phase shifters may take other forms and/or be arranged in other manners as well.

Along with the array of antenna elements and corresponding phase shifters, the example ptp radio's antenna unit 230 may also include or be combined with a beam-narrowing unit (e.g., one or more lens or parabolic antennas) that is configured to further narrow the beamwidth of the composite wireless signal being output by the phased array antenna.

Some representative examples of phased array antenna designs are described in U.S. patent application Ser. No. 17/964,365, which is incorporated herein by reference in its entirety.

In yet another implementation, the example ptp radio's antenna unit 230 may comprise a reflectarray antenna (also referred to as a reflectarray for short). Similar to a phased array antenna, a reflectarray may include an array of antenna elements (e.g., patch antenna elements or microstrip antenna elements) that radiate phase-shifted signals in order to form a composite wireless signal in one particular direction (e.g., a direction of another wireless communication node). However, the manner in which the reflectarray produces the phase-shifted signals during transmission is distinctly different from a phased antenna array.

As a starting point, unlike a phased antenna array, a reflectarray typically includes a waveguide and feed antenna that serves as an interface between RF unit 232 and the array of antenna elements, such that during transmission, the RF unit 232 may output a single RF signal that travels through the waveguide and is radiated by the feed antenna onto the array of antenna elements as an incident wireless signal. In this respect, instead of receiving a respective, phase-shifted RF signal from a corresponding phase shifter as in a phase array antenna, each antenna element may receive a respective portion of the incident wireless signal radiated by the feed antenna, which may induce a respective RF signal at the antenna element. In turn, each antenna element may function to radiate a phase-shifted version of the respective RF signal induced at the antenna element as a respective radio wave, which combines together with the respective radio waves radiated by the other antenna elements to form a composite wireless signal in the direction of another wireless communication node's ptp radio. Correspondingly, during reception, each antenna element in the reflectarray may detect a respective portion of a wireless signal that is received from another wireless communication node's ptp radio, which may induce a respective RF signal at the antenna element, and the antenna element may in turn function to reflect a phase-shifted version of the respective RF signal induced at the antenna element back to the feed antenna, which may in turn feed the different phased-shifted versions of the respective RF signals reflected by the antenna elements through the waveguide to the RF unit 232 where they may be processed.

To accomplish this phase-shifting of the induced RF signals during transmission and reception, each antenna element of the reflectarray may be designed such that different areas of the antenna element (e.g., different edges) radiate signals at different phases, and may be coupled to switching circuitry that functions to route the respective RF signal induced by the antenna element to one particular area of the antenna element such that it is radiated at one particular phase. For instance, each antenna element in the reflectarray may have symmetrical design where one edge of the antenna element radiates RF signals at a first phase and an opposing edge of the antenna element radiates RF signals at a second phase that differs from the first phase by 180° (e.g., a first phase of 0° and a second phase of 180°), and each such antenna element may then be coupled to switching circuitry that functions to route the respective RF signal induced the antenna element to one of these two edges of the antenna element depending on whether the respective RF signal is to be radiated at the first phase or the second phase. This type of phase-shifting may be referred to herein as "1-bit" (or "binary") phase-shifting, as each antenna element is configured to radiate the respective RF signal induced at the antenna element by the incident wireless signal at one of two possible phases, and the phase-shifting at each antenna element may thus be controlled by a 1-bit control signal. However, it should be understood that the antenna elements of the reflectarray could be designed with the capability of radiating at more than two possible phases.

Similar to a phase antenna array, a reflectarray has the capability to electronically change the direction of the wireless signals being transmitted and received by the antenna unit 230 via the switching circuitry, which is commonly referred to as "beamsteering" or "beamforming." For instance, each antenna element's corresponding switching circuitry may be configured to receive a control signal (e.g., from the example ptp radio's control unit 234) that serves to define the respective phase at which the antenna element is to radiate an RF signal that is induced at the antenna element, and the respective phase settings for the different antenna elements may collectively serve to define the direction in which the particular direction in which the antenna unit 230 transmits and receives wireless signals. In line with the discussion above, this beamsteering capability may be utilized during the initial setup of the example ptp radio 212*a* in order to point the reflectarray's beam in the direction of a given other node in the mesh-based communication system with which a ptp wireless link is to be established, and may also be utilized after the initial setup in order to facilitate other functionality as well, including but not limited to the functionality described above with respect to the phased array antenna.

The reflectarray's array of individual antenna elements may take various forms and be arranged in any of various manners. For instance, as one possible implementation, the reflectarray's array of individual antenna elements may comprise a single group of antenna elements (e.g., patch or microstrip antenna elements) that are responsible for carrying out both the transmission of wireless signals and the reception of wireless signals for a given ptp wireless link. As another possible implementation, the reflectarray's array of individual antenna elements may comprise two separate groups of antenna elements (e.g., patch or microstrip antenna elements), where one group is responsible for carrying out the transmission of wireless signals for a given ptp wireless link and another group is responsible for carrying out the reception of wireless signals for the given ptp wireless link. As yet another possible implementation, the reflectarray's array of individual antenna elements may comprise multiple separate groups of antenna elements (e.g., patch or microstrip antenna elements) where each such group serves to define a separate ptp wireless link, which may enable the example ptp radio 212*a* to establish multiple ptp wireless links with multiple other nodes within the mesh-based communication system. The reflectarray's array of antenna elements may take other forms and/or be arranged in other manners as well—including but not limited to the possibility that the antenna elements in the array may have different polarizations (e.g., a first set of antenna elements may have a vertical polarization and a second set of antenna elements may have a horizontal polarization).

Further, the number of antenna elements included in the reflectarray's array of individual antenna elements may take various forms, and in at least some implementations, the number of antenna elements included in the reflectarray's array of individual antenna elements may be determined based on the desired beamwidth, frequency, capacity, and/or length of the ptp wireless link to be established by the antenna unit 230. In this respect, a reflectarray with a larger number of antenna elements will typically be capable of establishing a ptp wireless link having a narrower beamwidth and a higher capacity, but may also increase the size, cost, and complexity of the ptp radio 212*a* (although typically to a less extent than a phased array antenna), so these factors may be balanced against each other when determining the number of antenna elements to include in a reflectarray for use as the antenna unit 230 of a ptp radio 212*a*.

Further yet, the reflectarray's switching circuitry may take any of various forms. For instance, as one possible implementation, each antenna element's corresponding switching circuitry may comprise passive switching components that do not require active power, such as field-effect transistor (FET) switches, which are configured to be placed into different switching states in order to route a RF signal induced at the antenna element to different areas of the antenna element associated with different phases. An illustrative example of this implementation is described in further detail below, and it will be appreciated that the reflectarray's capability to engage in phase-shifting-based beamsteering using these passive switching components as opposed to the actively-powered phase shifters of a phased array antenna may provide various advantages over phased array antennas—including lower power consumption and lower manufacturing cost. However, it should be understood that the reflectarray's switching circuitry may take various forms as well.

Along with the array of antenna elements, the switching circuitry, and the waveguide/feed antenna, the reflectarray may also include other components as well.

Figure 3A:
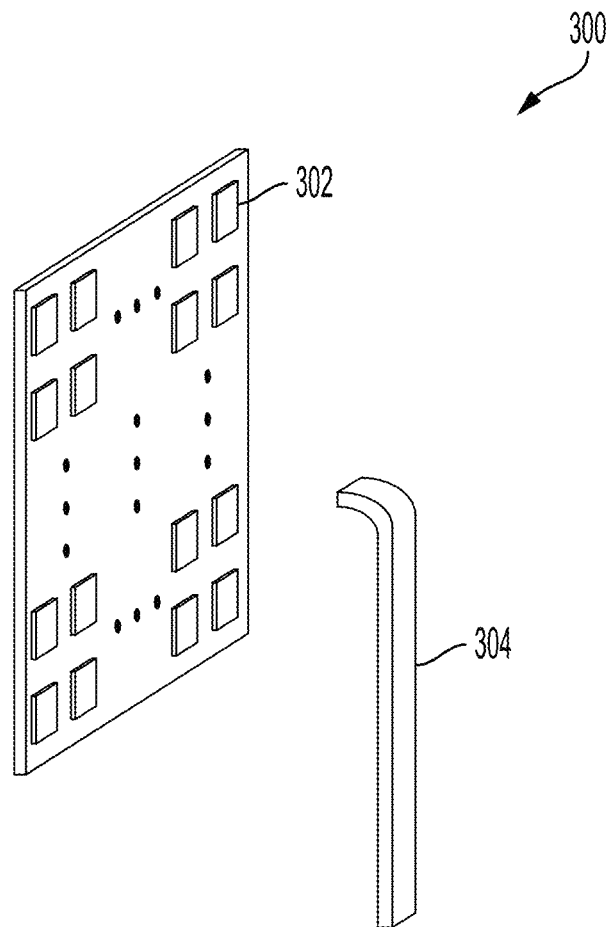
FIG. 3A depicts an example reflectarray antenna that may be included in an example wireless communication node of FIG. 2A in accordance with aspects of the disclosed technology.

FIG. 3A depicts an example reflectarray 300 that may be implemented as part of the example ptp radio's antenna unit 230. As shown, the reflectarray 300 includes an array of antenna elements 302 that are being fed by a single waveguide/feed antenna 304, which may in turn interface with the RF unit 232 of the example ptp radio 212*a*. The waveguide/feed antenna 304 is configured to direct an incident RF signal onto the array of antenna elements 302. The RF signal may be generated by an RF source that is coupled to the waveguide/feed antenna 304 and included in the ptp radio 212*a*, such as the RF unit 232. The antenna elements 302 are configured to receive the incident RF signal from the waveguide/feed antenna 304 and re-radiate respective phase-shifted versions of the RF signal that, when summed, result in a transmitted RF signal having a focused beamwidth in a particular direction. Further, while not depicted in FIG. 3A, the reflectarray 300 may additionally include another type of antenna, such as a lens antenna based on a dielectric lens, positioned adjacent to the array of antenna elements 302 to increase a gain of the reflectarray 300.

The number and size of the antenna elements 302 that are included in the reflectarray 300 may be based on any of various factors, examples of which may include the operating environment and desired characteristics of the reflectarray 300. For instance, the size of the physical area of each antenna element 302 that is configured to receive and/or radiate RF energy, also referred to as the aperture of the antenna element 302, may depend on the frequency of the incident RF signal, such as by having width and length dimensions that are proportional to the wavelength of the incident RF signal (e.g., a width and length about equal to a half wavelength of the incident RF signal). And the number of antenna elements 302 may depend on the desired beamwidth and/or direction of the transmitted RF signal. To illustrate with one example implementation where the incident RF signal has a frequency of 265 GHz, the width and length of the aperture of each antenna element 302 may be about 0.57 mm, and the reflectarray 300 may include an array of 98×98 antenna elements 302, such that the overall aperture of the reflectarray 300 is about 58×58 mm$^2$. With such an arrangement, the reflectarray 300 may transmit a reflected RF signal having a 3 dB-beamwidth of 1 degree in two dimensions. However, the size and number of the antenna elements 302 may differ in other implementations. For example, the aperture size of the antenna elements 302 (and consequently the overall aperture size of the reflectarray) may increase proportionally with the wavelength of the RF signal at lower frequencies and may decrease proportionally with the wavelength of the RF signal at higher frequencies. Additionally or alternatively, the number of antenna elements 302 included in the reflectarray either may be increased to transmit an even narrower reflected RF signal or may be decreased to transmit a broader reflected RF signal.

Figure 3B:
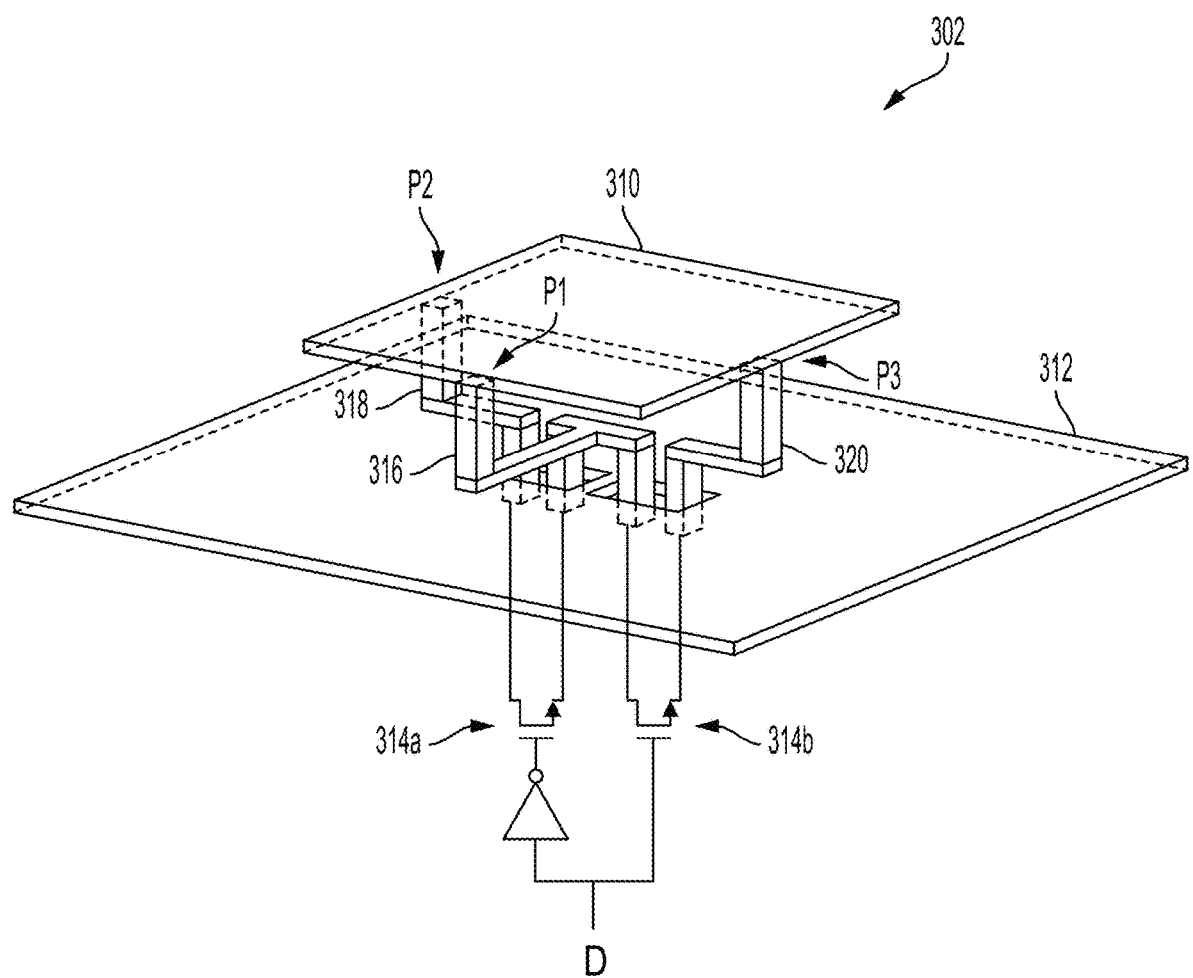
FIG. 3B depicts an example antenna element of the example reflectarray antenna of FIG. 3A in accordance with aspects of the disclosed technology.

As noted above, each antenna element 302 in the reflectarray 300 may be configured to passively apply a 1-bit phase-shift to the incident RF signal. To illustrate how this is achieved, FIG. 3B depicts a more detailed illustration of one of the antenna elements 302. As shown in FIG. 3B, the illustrated antenna element 302 includes a patch antenna 310 arranged above a ground plane 312. The patch antenna 310 has a symmetric width and length to facilitate the passive 1-bit phase shifting, as explained in further detail below. A first patch edge P1 of the patch antenna 410 is coupled to a pair of passive switches 314, which may be implemented as passive FinFET switches. As shown, a first microstrip line tapping 316 couples edge P1 to the source of a first passive FinFET 314a and the drain of a second passive FinFET 314b. A second patch edge P2 and a third patch edge P3 of the patch antenna 310, each of which are orthogonal to the first patch edge P1 and which are opposite to one another, are each coupled to a respective one of the passive switches 314. As shown, a second microstrip line tapping 318 couples edge P2 to the drain of the first passive FinFET 314a, and a third microstrip line tapping 320 couples edge P3 to the source of the second passive FinFET 314b.

The switches 314 are arranged in a complementary manner such that a drive signal D will close only one of the switches 314 while opening the other. For instance, when D is a low voltage, or logic 0, the first FinFET 314a is closed and the second FinFET 314b is open, such that edge P1 is coupled to edge P2 through the first FinFET 314a. Conversely, when D is a high voltage, or logic 1, the first FinFET 314a is open and the second FinFET 314b is closed, such that edge P1 is coupled to edge P3 through the second FinFET 314b. By selectively coupling edge P1 to one of the orthogonal edges P2 or P3, the antenna element 302 may apply a 1-bit (e.g., either a 0° or) 180° phase-shift to an incident RF signal.

In order to provide fully passive phase-shifting without requiring the continuous use of an active power source, the switches 314 may be implemented as floating gate transistors, such as those used in erasable programmable read-only memory (EPROM) and electronically erasable programmable read-only memory (EEPROM). In such an implementation, respective drive signals D may inject charge onto the floating gates of the switches 314 for each of the antenna elements 302 at a first time in order to "program" the 1-bit phase shift for each of the antenna elements 302 to achieve a desired beamsteering configuration. The floating gates will then continue to hold the injected charge and thereby maintain their on/off states indefinitely after the drive signals are removed until new drive signals are applied to "reprogram" the 1-bit phase shifts for the antenna elements 302, which may be done to achieve a different beamsteering configuration, for instance.

Figure 3C:
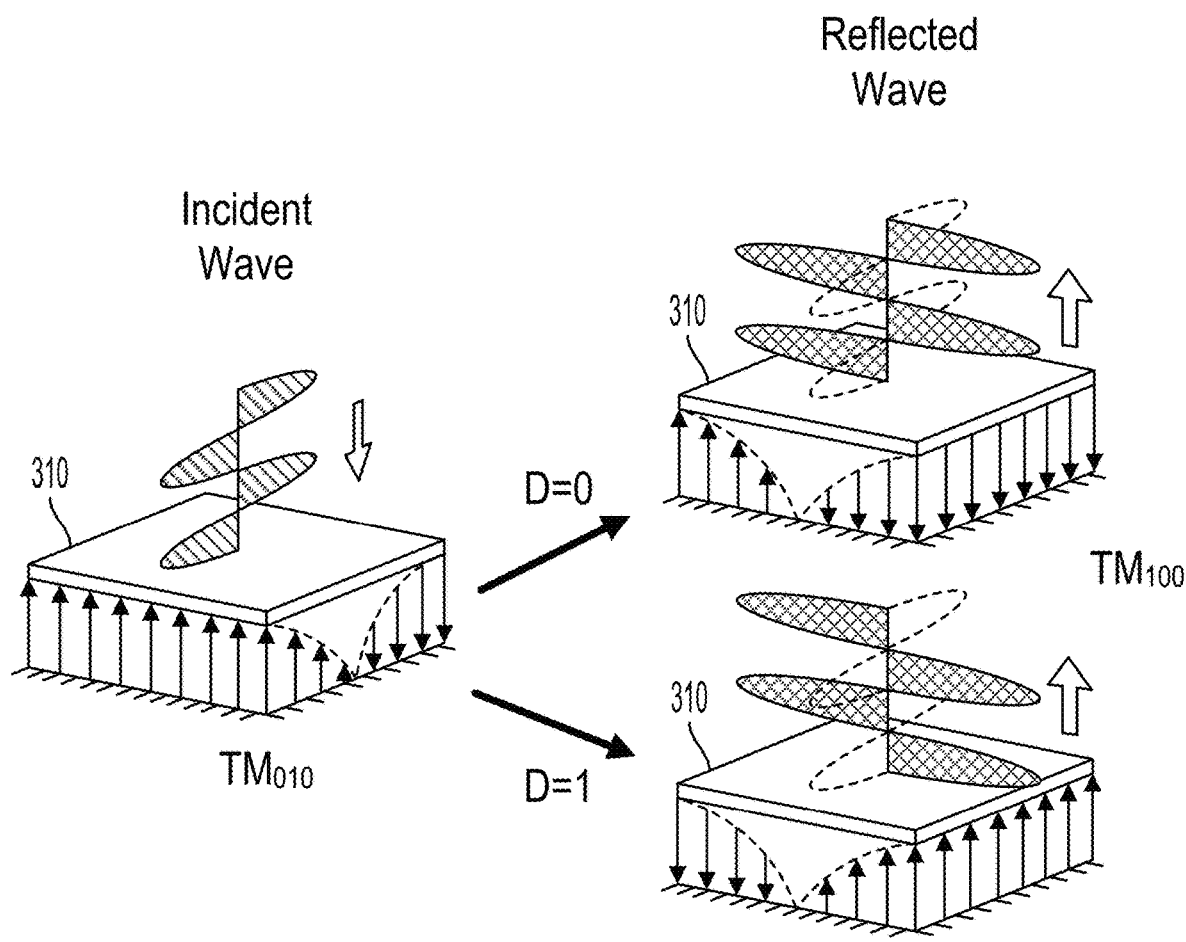
FIG. 3C depicts a simplified illustration of an example phase-shift applied to an incident RF signal by the example antenna element of FIG. 3B in accordance with aspects of the disclosed technology.

FIG. 3C depicts an illustration of the 1-bit phase-shift applied to an incident RF signal. As shown, the incident RF signal excites a particular resonant mode of the patch antenna 310, which in the present example is the $TM_{010}$ mode of the patch antenna 310. The signal is extracted at edge P1 via the first microstrip line tapping 312 and routed to either edge P2 or edge P3 depending on which of the switches 314 is closed. When D is logic 0 and the first FinFET 314a is closed, the extracted signal is routed to edge P2 through the first FinFET 314a and the second microstrip line tapping 318. Routing the signal to edge P2 in this manner excites a different resonant mode of the patch antenna 310, which in the present example is the $TM_{100}$ mode of the patch antenna 310, and causes the antenna 310 to reradiate the signal. When D is logic 1 and the second FinFET 314a is closed, the extracted signal is routed to edge P3 through the second FinFET 314b and the third microstrip line tapping 320. Routing the signal to edge P3 in this manner again excites the $TM_{100}$ mode of the patch antenna 310, but causes the antenna 310 to reradiate the signal with a 180° phase-shift relative to the signal radiated when D is logic 0. As such, the signals radiated by each of the antenna elements 302 may belong to one of two phase states offset by 180° to one another based on whether the incident signal is rerouted to edge P2 or edge P3. In this manner, each respective antenna element 302 is subjected to a 1-bit phase shift (e.g., based on whether D=0 or D=1) that defines which of the two phase states the signal radiated by the antenna element 302 belongs to.

Using the aforementioned techniques to apply a 1-bit phase-shift to each of the antenna elements 302, the reflectarray 300 can be configured to reflect an incident RF signal in a particular direction at a particular beamwidth by selectively setting the value of the drive signal D for each of the antenna elements 302. The specific values of D for the array of antenna elements 302 may be predetermined mathematically or experimentally such that the radiated signals, when summed constructively and destructively according to their phase-shifts, combine to form a transmitted RF signal in the desired direction at the desired beamwidth. For instance, when implemented as part of the antenna unit 230 of ptp radio 212a at one of the example wireless communication nodes described herein, the reflectarray 300 may be configured to transmit a focused RF signal in the direction of another ptp radio at another wireless communication node in order to establish a bi-directional ptp wireless link with the other ptp radio and then wirelessly transmit and receive network traffic over the established bi-directional ptp wireless link.

An antenna unit that has beamsteering capability, such as a phased array antenna or a reflectarray, may provide advantages over other types of antenna units that only have the capability to transmit and receive directional wireless signals in a fixed direction and thus require physical repositioning in order to change the direction of the wireless signals being transmitted and received by the antenna unit 230. However, an antenna unit having beamsteering capability may also increase the complexity and cost of the antenna unit 230, so these factors should typically be balanced when deciding whether to employ an antenna unit having beamsteering capability.

Further, in line with the discussion above, different types of antenna units beamsteering capability may provide different strengths and weaknesses that may be considered when deciding which type of antenna unit to utilize for a ptp radio. For instance, a phased array antenna may be capable of transmitting and receiving sufficiently beamformed signals using a smaller number of antennas than a reflectarray, but may do so by employing more complex signal processing. For example, as discussed above, a phased array antenna may include a separate actively-powered phase shifter component for each antenna element in the phased array capable of applying any phase shift angle within a continuous spectrum of phase shift angles. A reflectarray, on the other hand, may passively apply discrete 1-bit phase-shifting at each antenna element using complementary passive switches that can be fabricated as part of the antenna element using CMOS fabrication techniques. Both the physical size and power consumption of the passive phase shifting components of the reflectarray are negligible in comparison with the phase shifting components of the phased array antenna. As a result, while the less complex 1-bit phase-shifting of the reflectarray may require a larger number of antenna elements to achieve a particular beamforming configuration than the more complex phased array antenna, the reflectarray may still be capable of doing so while consuming less power, at a lower manufacturing complexity and cost, and while having a smaller physical footprint.

In at least some of the aforementioned implementations, the example ptp radio's antenna unit 230 may also be constructed from metamaterials. The example ptp radio's antenna unit 230 could take other forms and/or perform other functions as well.

Further, in some implementations, the ptp radio's antenna unit 230 may comprise a combination of two or more different antenna units. For instance, as one possible implementation, the ptp radio's antenna unit 230 may comprise a reflectarray that is coupled to the RF unit 232 along with a lens antenna that is positioned adjacent to the reflectarray's array of antenna elements and serves to increase the gain of the composite wireless signal output by the array of antenna elements. As another possible implementation, the ptp radio's antenna unit 230 may comprise a parabolic or lens antenna that is coupled to the RF unit 232 along with a reflectarray that is positioned adjacent to the parabolic or lens antenna in an arrangement that enables the parabolic or lens antenna to serve as the feed antenna for the reflectarray. In such an arrangement, the parabolic or lens antenna may output a wireless signal based on an RF signal received from the RF unit 232, and that wireless signal may then be received and reflected by the reflectarray's array of antenna elements in a similar manner to how the incident wireless signal output by the feed antenna described above is received and reflected by the reflectarray's array of antenna elements. In this way, the reflectarray may provide the capability to perform beamsteering on a wireless signal being output by a parabolic or lens antenna. In practice, such an implementation could arise in a scenario where a ptp radio's initial design only includes a parabolic or lens antenna—which does not have beamsteering capability—and that ptp radio is then "retrofitted" with a reflectarray (e.g., by affixing the reflectarray to the ptp radio's original housing) in order to add beamsteering capability to the ptp radio. Other arrangements of antenna unit 230 comprising two or more different antennas are possible as well.

The RF unit 232 of example ptp radio 212a may generally be configured to serve as the signal processing interface between the centralized processing unit 210 and the antenna unit 232. In this respect, the RF unit 232 may comprise one or more chains of components for performing signal processing functions such as digital-analog conversion (DAC), analog-to-digital conversion (ADC), amplification functions (e.g., power amplification, low-noise amplification, etc.), attenuation functions, and/or filtering functions (e.g., bandpass filtering), among other possible signal processing functions carried out by the example ptp radio's RF unit 232 in order to translate the digital data received from centralized processing unit 210 into RF signals for transmission by the antenna unit 230 and translate the RF signals received by the antenna unit 230 into digital data for processing by the centralized processing unit 210. Further, in implementations where the RF unit 232 includes multiple signal processing chains, the RF unit 232 may additionally include components for dividing and combining the respective signals that traverse the different signal processing chains. The RF unit 232 of example ptp radio 212a may include other types of components as well.

The specific configuration of the RF unit 232 may take any of various forms, which may depend in part on the type of antenna unit 230 included in the example ptp radio 212a. For example, in an implementation where the antenna unit 230 comprises a parabolic antenna or a lens antenna, the RF unit 232 may comprise a single signal processing chain that interfaces with the parabolic antenna or a lens antenna. As another example, in an implementation where the antenna unit 230 comprises a phased array antenna, the RF unit 232 could comprise either (i) a separate signal processing chain for each respective antenna element in the phased antenna array, (ii) a set of signal processing chains that each interfaces with multiple different antenna elements in the array (e.g., one signal processing chain for every 2 antenna elements), or (iii) a single signal processing chain that interfaces with all of the antenna elements in the array, among other possibilities. Some representative examples of RF unit configurations for a phased array antenna are described in U.S. patent application Ser. No. 17/964,365, which is incorporated herein by reference in its entirety. As yet another example, in an implementation where the antenna unit 230 comprises a reflectarray, the RF unit 232 could comprise a single signal processing chain that interfaces with the reflectarray via the waveguide/feed antenna, which as noted above reduces the complexity of the ptp radio 212a as compared to an antenna unit 230 comprising a phased antenna array. The RF unit 232 could take other forms and/or perform other functions as well.

The control unit 234 of example ptp radio 212a may generally comprise a hardware component (e.g., a microcontroller) programmed with executable program instructions for controlling the configuration and operation of the antenna unit 230 and/or the RF unit 232. For example, the example ptp radio's control unit 234 may function to control the activation state of the RF unit 232, which may in turn control the activation state of the antenna unit 230, among other possible control functions carried out by the control unit 234. As another example, in implementations where the antenna unit 230 comprises a phased array antenna or a reflectarray, the example ptp radio's control unit 234 may function to control the phase shifting functionality of the antenna unit 230 (e.g., by sending control signals to the phase shifters of the phased array antenna or the switching circuitry of the reflectarray). The example ptp radio's control unit 234 may perform other control functions for the ptp radio 212a as well. Some representative examples of functionality carried out by a control unit in connection with a phased array antenna are described in U.S. patent application Ser. No. 17/964,365, which is incorporated herein by reference in its entirety. Further, in practice, the control functions carried out by the control unit 234 may be based at least in part on instructions that are received from centralized processing unit 210 via the example ptp radio's wired communication interface 236. The control unit 234 could take other forms and/or perform other functions as well.

The wired communication interface 236 of example ptp radio 212a may facilitate wired communication between example ptp radio 212a and centralized processing unit 210 over a wired link. In line with the discussion above, this wired communication interface 236 may take any of various forms, examples of which may include a coaxial interface, an Ethernet interface, a serial bus interface (e.g., PCI/PCIe, Firewire, USB, Thunderbolt, etc.), a glass optical fiber interface, or a plastic optical fiber interface, among other possibilities. In a scenario where the wired communication interface 236 takes the form of a fiber optic interface, example ptp radio 212a may also further include an optical-to-RF converter (e.g., a high-speed photo detector) for converting optical signals received from centralized processing unit 210 into RF signals and an RF-to-optical converter (e.g., a plasmonic modulator) for converting RF signals that are to be sent to centralized processing unit 210 into optical signals, each of which may be implemented as an integrated circuit (IC) or the like. Further, in some embodiments, the wired communication interface 236 could be replaced with a wireless communication interface, which may take the form of a chipset and antenna adapted to facilitate wireless communication with centralized processing unit 210 according to any of various wireless protocols (e.g., Wi-Fi or point-to-point protocols). The wired communication interface 236 may take other forms and/or perform other functions as well.

Example ptp radio 212a may take various other forms as well, including but not limited to the possibility that example ptp radio 212a may include other components in addition to the illustrated components and/or that certain of the illustrated components could be omitted or replaced with a different type of component. Further, depending on the implementation and the particular role of the node 200 within the mesh-based communication system, the components of the example ptp radio 212a could be designed to establish and communicate over a ptp wireless link having any of the various beamwidths, frequencies, lengths, and/or capacities described above, and to exchange network traffic over the ptp wireless link in accordance with any of the duplexing and/or digital transmission schemes described above.

Returning again to FIG. 2B, in general, each ptmp radio included within the example wireless communication equipment 202 (e.g., ptmp radio 212c) may include components that enable the ptmp radio to establish a bi-directional ptmp wireless link with one or more other ptmp radios and then wirelessly transmit and receive network traffic over the established bi-directional ptmp wireless link with one or more other wireless communication. These components may take any of various forms.

Figure 2E:
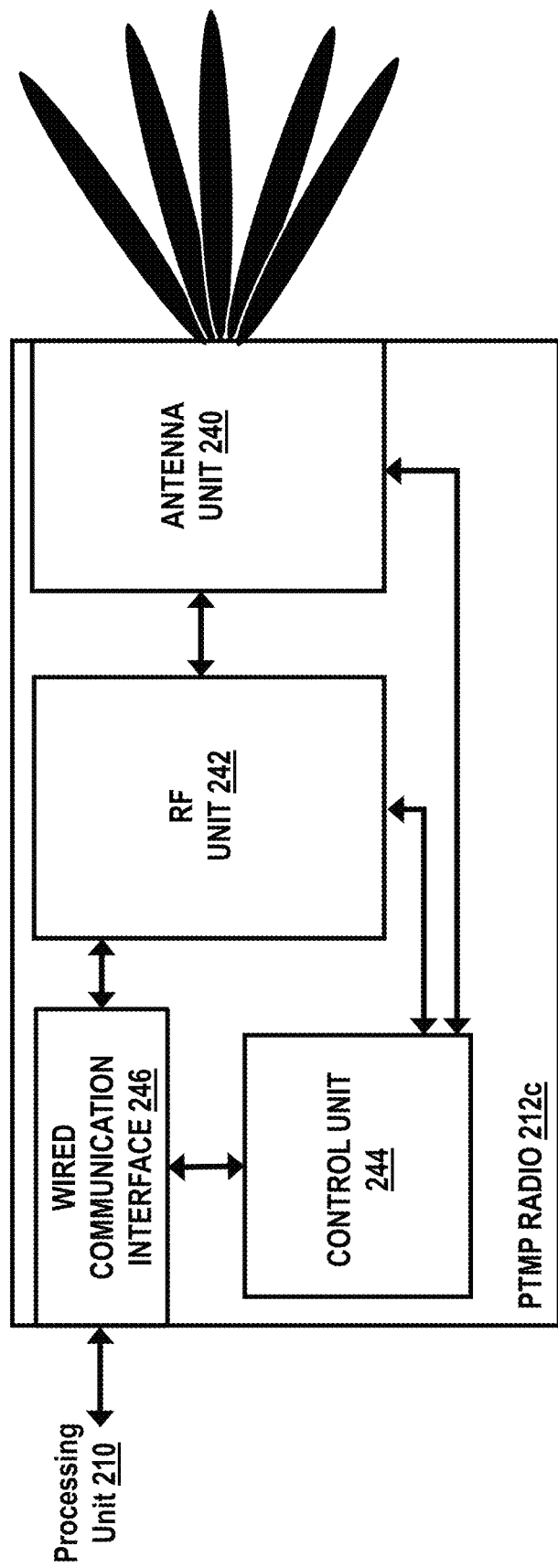
FIG. 2E depicts a block diagram of example components that may be included in an example point-to-multipoint radio of the example wireless communication node of FIG. 2A in accordance with aspects of the disclosed technology.

One possible example of the components that may be included in an example ptmp radio, such as ptmp radio 212c, is depicted in FIG. 2E. As shown in FIG. 2E, example ptmp radio 212c may include at least (i) an antenna unit 240, (ii) an RF unit 242, (iii) a control unit 244, and (iv) a wired communication interface 246, among other possible components. (For purposes of illustration, FIG. 2E shows the components of example ptmp radio 212c as being co-located within the same physical housing, but it should be understood that this is merely one possible implementation of a ptmp radio, and that in other implementations, the components of a ptmp radio may be physically arranged in other manners). Each of these components may take various forms.

The antenna unit 240 of example ptmp radio 212c may generally comprise an antenna that is capable of transmitting and receiving wireless signals in different directions within some defined coverage area extending from the antenna unit 240 (e.g., directions within a coverage area having a horizontal width ranging from 60 degrees to 180 degrees, among other possibilities), which may facilitate ptmp communication with one or more ptmp radios of one or more other wireless communication nodes in that coverage area. Such an antenna unit 240 may take any of various forms.

For instance, in one implementation, the example ptp radio's antenna unit 240 may comprise a phased array antenna, which typically takes the form of an array of multiple individual antenna elements along with corresponding phase shifters that adjust the phase of the RF signals exchanged between the RF unit 242 and the array of antenna elements. During transmission, the RF unit 242 may output a respective RF signal for each antenna element to an actively-powered phase shifter corresponding to the antenna element, which may produce a phase-shifted version of the RF signal and feed that into the antenna element, and each antenna element may then radiate the received, phase-shifted version of the respective RF signal as a respective radio wave that combines together with the respective radio waves radiated by the other antenna elements to form a composite wireless signal in the direction of at least one other wireless communication node's ptmp radio. Correspondingly, during reception, each antenna element may detect a respective portion of a wireless signal that is received from at least one other wireless communication node's ptmp radio, which may induce a respective RF signal at the antenna element, and may then pass the respective RF signal induced at the antenna element to the actively-powered phase shifter that corresponds to the antenna element, which may produce a phase-shifted version of the respective RF signal and then provide it to the RF unit 242 where it may be processed and combined with phase-shifted versions of RF signals that were induced by received wireless signal at the other antenna elements.

As noted above, a phased array antenna such as this has the capability electronically change the direction of the radio signals being transmitted and received by the antenna unit 240 via the phase shifters, which as noted above is commonly referred to as "beamsteering" or "beamforming." For instance, each antenna element's corresponding phase shifter may be configured to receive a control signal (e.g., from the example ptmp radio's control unit 244) that serves to define the respective phase shift to be applied by the phase shifter, and the respective phase-shift settings of the different phase shifters may collectively serve to define the particular direction in which the antenna unit 240 transmits and receives wireless signals. In operation, the example ptmp radio 212c may utilize this beamsteering capability to establish and communicate over a ptmp wireless link with multiple different ptmp radios.

For instance, if the example ptmp radio 212c is to communicate with multiple other wireless communication nodes' ptmp radios over a ptmp wireless link using a phased array antenna, the example ptmp radio 212c may engage in a form of TDMA in which the phased array antenna regularly adjusts its beam direction in order to transmit and receive wireless signals in different respective directions during different respective time slots. To illustrate with an example, the phased array antenna may function to (i) point its beam in a first direction (e.g., by applying a first set of phase shift values) during a first time slot in order to transmit wireless signals to and/or receive wireless signals from a first wireless communication node's ptmp radio in that first direction, (ii) point its beam in a second direction (e.g., by applying a first set of phase shift values) during a second time slot in order to transmit wireless signals to and/or receive wireless signals from a second wireless communication node's ptmp radio in that second direction, and so on for any other ptmp radio in communication with the example ptmp radio 212c. Further, in practice, the phased array antenna may continue to cycle through the time slots in an iterative manner as the communication with the multiple other ptmp radios continues.

On the other hand, if the example ptmp radio 212c is to communicate with a single other wireless communication node's ptmp radio over a ptmp wireless link using a phased array antenna, that phased array antenna may simply be configured to point in that one particular direction of the single other wireless communication node's ptmp radio during initial setup (similar to how the phased array antenna would be configured during the initial setup of a ptp radio) and may remain in that configuration unless and until there is some change to the topology of the mesh-based communication system.

The example ptmp radio 212c could employ other schemes for communicating with multiple other wireless communication nodes using a phased array antenna as well.

As noted above, some representative examples of possible phased array antenna designs are described in U.S. patent application Ser. No. 17/964,365, which is incorporated herein by reference in its entirety.

In another implementation, the example ptmp radio's antenna unit 240 may comprise a reflectarray such as the one described above in connection with the antenna unit 230 of the example ptp radio 212a, which likewise has beamsteering capability. In line with the discussion above, a reflectarray may include a waveguide and feed antenna that serves as an interface between RF unit 242 and an array of antenna elements (e.g., patch antenna elements or microstrip antenna elements), such that during transmission, the RF unit 242 may output a single RF signal that travels through the waveguide and is radiated by the feed antenna onto the array of antenna elements as an incident wireless signal. In this respect, instead of receiving a respective, phase-shifted RF signal from a corresponding phase shifter as in a phase array antenna, each antenna element may receive a respective portion of the incident wireless signal radiated by the feed antenna, which may induce a respective RF signal at the antenna element. In turn, each antenna element may function to radiate a phase-shifted version of the respective RF signal induced at the antenna element as a respective radio wave, which combines together with the respective radio waves radiated by the other antenna elements to form a composite wireless signal in the direction of another wireless communication node's ptp radio. Correspondingly, during reception, each antenna element in the reflectarray may detect a respective portion of a wireless signal that is received from another wireless communication node's ptp radio, which may induce a respective RF signal at the antenna element, and the antenna element may in turn function to reflect a phase-shifted version of the respective RF signal induced at the antenna element back to the feed antenna, which may in turn feed the different phased-shifted versions of the respective RF signals reflected by the antenna elements through the waveguide to the RF unit 232 where they may be processed.

To accomplish this phase-shifting of the induced RF signals during transmission and reception, each antenna element of the reflectarray may be designed such that different areas of the antenna element (e.g., different edges) radiate signals at different phases, and may be coupled to switching circuitry that functions to route the respective RF signal induced the antenna element to one particular area of the antenna element such that it is radiated at one particular phase. For instance, as one possible implementation, the antenna unit 240 of ptmp radio 212c may include the example 1-bit phase-shifting reflectarray 300 that is described above in connection with FIGS. 3A-C.

As noted above, a reflectarray such as this has the capability electronically change the direction of the radio signals being transmitted and received by the antenna unit 240 via the switching circuitry, which as noted above is commonly referred to as "beamsteering" or "beamforming." For instance, each antenna element's corresponding switching circuitry may be configured to receive a control signal (e.g., from the example ptp radio's control unit 244) that serves to define the respective phase at which the antenna element is to radiate an RF signal that is induced at the antenna element, and the respective phase settings for the different antenna elements may collectively serve to define the direction in which the particular direction in which the antenna unit 230 transmits and receives wireless signals. In operation, the example ptmp radio 212c may utilize this beamsteering capability to establish and communicate over a ptmp wireless link with multiple different ptmp radios.

For instance, if the example ptmp radio 212c is to communicate with multiple other wireless communication nodes' ptmp radios over a ptmp wireless link using a reflectarray, the example ptmp radio 212c may engage in a form of TDMA in which the reflectarray regularly adjusts its beam direction in order to transmit and receive wireless signals in different respective directions during different respective time slots. To illustrate with an example, the reflectarray may function to (i) point its beam in a first direction (e.g., by applying a first set of drive voltages D of the antenna elements) during a first time slot in order to transmit wireless signals to and/or receive wireless signals from a first wireless communication node's ptmp radio in that first direction, (ii) point its beam in a second direction (e.g., by applying a second set of drive voltages D of the antenna elements) during a second time slot in order to transmit wireless signals to and/or receive wireless signals from a second wireless communication node's ptmp radio in that second direction, and so on for any other ptmp radio in communication with the example ptmp radio 212c. Further, in practice, the reflectarray may continue to cycle through the time slots in an iterative manner as the communication with the multiple other ptmp radios continues.

On the other hand, if the example ptmp radio 212c is to communicate with a single other wireless communication node's ptmp radio over a ptmp wireless link using a reflectarray, that reflectarray may simply be configured to point in that one particular direction of the single other wireless communication node's ptmp radio during initial setup (similar to how the reflectarray would be configured during the initial setup of a ptp radio) and may remain in that configuration unless and until there is some change to the topology of the mesh-based communication system.

The example ptmp radio 212c could employ other schemes for communicating with multiple other wireless communication nodes using a reflectarray as well.

As described above in connection with the ptp radio's antenna unit 230, implementing a reflectarray in the antenna unit 240 of the example ptmp radio 212c may provide a number of advantages over a phased array antenna. For instance, by passively applying discrete 1-bit phase-shifting at each antenna element, a reflectarray may be capable of achieving a desired beamforming configuration while consuming less power, at a lower manufacturing complexity and cost, and while having a smaller physical footprint when compared to a phased array antenna, among other possible advantages.

In at least some of the aforementioned implementations, the example ptmp radio's antenna unit 240 may also be constructed from metamaterials. The example ptmp radio's antenna unit 240 could take other forms and/or perform other functions as well.

The RF unit 242 of example ptmp radio 212c may generally be configured to serve as the signal processing interface between the centralized processing unit 210 and the antenna unit 242. In this respect, the RF unit 242 may comprise one or more chains of components for performing signal processing functions such as DAC, ADC, amplification functions (e.g., power amplification, low-noise amplification, etc.), attenuation functions, and/or filtering functions (e.g., bandpass filtering), among other possible signal processing functions carried out by the example ptmp radio's RF unit 242 in order to translate the digital data received from centralized processing unit 210 into radio signals for transmission by the antenna unit 240 and translate the radio signals received by the antenna unit 240 into digital data for processing by the centralized processing unit 210. Further, in implementations where the RF unit 242 includes multiple signal processing chains, the RF unit 242 may additionally include components for dividing and combining the respective signals that traverse the different signal processing chains. The RF unit 242 of example ptmp radio 212c may include other types of components as well.

The specific configuration of the RF unit 242 may take any of various forms, which may depend in part on the type of antenna unit 240 included in the example ptmp radio 212c. For instance, in an implementation where the antenna unit 240 comprises a phased array antenna, the RF unit 242 could comprise either (i) a separate signal processing chain for each respective antenna element in the phased antenna array, (ii) a set of signal processing chains that each interfaces with multiple different antenna elements in the array (e.g., one RF chain for every 2 antenna elements), or (iii) a single signal processing chain that interfaces with all of the antenna elements in the array, among other possibilities. As noted above, some representative examples of RF unit configurations for a phased array antenna are described in U.S. patent application Ser. No. 17/964,365, which is incorporated herein by reference in its entirety. As another example, in an implementation where the antenna unit 240 comprises a reflectarray, the RF unit 242 could comprise a single signal processing chain that interfaces with the reflectarray, which as noted above reduces the complexity of the ptmp radio 212c as compared to an antenna unit 240 comprising a phased antenna array. The RF unit 242 could take other forms and/or perform other functions as well.

The control unit 244 of example ptmp radio 212c may generally comprise a hardware component (e.g., a microcontroller) programmed with executable program instructions for controlling the configuration and operation of the antenna unit 240 and/or the RF unit 242. For example, the example ptmp radio's control unit 244 may function to control the activation state of the RF unit 242, which may in turn control the activation state of the antenna unit 240, among other possible control functions carried out by the control unit 244. As another example, in implementations where the antenna unit 240 comprises a phased array antenna or a reflectarray, the example ptmp radio's control unit 244 may function to control the phase shifting functionality of the antenna unit 240 (e.g., by sending control signals to the phase shifters of the phased array antenna or the switching circuitry of the reflectarray). The example ptmp radio's control unit 244 may perform other control functions for the ptmp radio 212c as well. As noted above, some representative examples of functionality carried out by a control unit in connection with a phased array antenna are described in U.S. patent application Ser. No. 17/964,365, which is incorporated herein by reference in its entirety. Further, in practice, the control functions carried out by the control unit 244 may be based at least in part on instructions that are received from centralized processing unit 210 via the example ptp radio's wired communication interface 246. The control unit 244 could take other forms and/or perform other functions as well.

The wired communication interface 246 of example ptmp radio 212c may facilitate wired communication between example ptmp radio 212c and centralized processing unit 210 over a wired link. In line with the discussion above, this wired communication interface 246 may take any of various forms, examples of which may include a coaxial interface, an Ethernet interface, a serial bus interface (e.g., PCI/PCIe, Firewire, USB, Thunderbolt, etc.), a glass optical fiber interface, or a plastic optical fiber interface, among other possibilities. In a scenario where the wired communication interface 246 takes the form of a fiber optic interface, example ptmp radio 212c may also further include an optical-to-RF converter (e.g., a high-speed photo detector) for converting optical signals received from centralized processing unit 210 into RF signals and an RF-to-optical converter (e.g., a plasmonic modulator) for converting RF signals that are to be sent to centralized processing unit 210 into optical signals, each of which may be implemented as an IC or the like. Further, in some embodiments, the wired communication interface 246 could be replaced with a wireless communication interface, which may take the form of a chipset and antenna adapted to facilitate wireless communication with centralized processing unit 210 according to any of various wireless protocols (e.g., Wi-Fi or point-to-point protocols). The wired communication interface 246 may take various other forms as well.

Example ptmp radio 212c may take various other forms as well, including but not limited to the possibility that example ptp radio 212a may include other components in addition to the illustrated components and/or that certain of the illustrated components could be omitted or replaced with a different type of component. Further, depending on the implementation and the particular role of the node 200 within the mesh-based communication system, example ptmp radio 212c could be designed to establish and communicate over a ptmp wireless link having any of the various beamwidths, frequencies, lengths, and/or capacities described above, and to exchange network traffic over the ptmp wireless link in accordance with any of the duplexing, multiple access, and/or digital transmission schemes described above.

Although not shown, it should also be understood that the node's wireless mesh equipment 202 could include multiple ptmp radios 212c, which may allow for a broader coverage area (e.g., by orienting the ptmp radios 212c in different physical directions) and/or higher data bandwidth (e.g., by reducing the amount of multiplexing required to engage in ptmp communication with other nodes). In this respect, each such ptmp radio 212c could comprise a respective antenna unit 240 that takes the form of a phased array antenna or a reflectarray, among other possible types of antenna units. Other implementations are possible as well.

Returning once more to FIG. 2B, in line with the discussion above, the wired links 213a-c between centralized processing unit 210 and the wireless radios 212 may take any of various forms. For instance, as one possibility, the wired links 213a-c between centralized processing unit 210 and the wireless radios 212 may each comprise a copper-based wired link, such as a coaxial cable, an Ethernet cable, or a serial bus cable, among other examples. As another possibility, the wired links 213a-c between centralized processing unit 210 and the wireless radios 212 may each comprise a fiber-based wired link, such as a glass optical fiber cable or a plastic optical fiber cable, among other examples. In line with the discussion above, wired links 213a-c may also be designed for outdoor placement. The wired links 213a-c could take other forms as well.

Further, the wired links 213a-c between centralized processing unit 210 and the wireless radios 212 may have any of various capacities, which may be depend in part on the type of wired link. In a preferred implementation, the wired links 213*a-c* may each have a capacity that is at least 1 Gbps and is perhaps even higher (e.g., 2.5 Gbps, 5 Gbps, 10 Gbps, etc.). However, in other implementations, the wired links 213*a-c* may each have a capacity that is below 1 Gbps.

Further yet, the wired links 213*a-c* between centralized processing unit 210 and the wireless radios 212 may have any of various lengths, which may be depend in part on the type of wired link. As examples, the wired links 213*a-c* could have each a shorter length of less than 1 foot (e.g., 3-6 inches), an intermediate length ranging from 1 foot to a few meters (e.g., 3 meters), or a longer length of 5-10 meters or greater, among various other possibilities.

While FIG. 2B shows one illustrative embodiment of the node's wireless mesh equipment 202, as discussed above, various other implementations of the node's wireless mesh equipment 202 are possible as well—including but not limited to the possibility that the node's wireless mesh equipment 202 may include any of various other arrangements of wireless radios (e.g., a single ptp radio only, multiple ptp radios without any ptmp radios, a single ptmp radio only, multiple ptmp radios without any ptp radios, or some other combination of ptp and ptmp radios).

For example, while FIG. 2B shows an embodiment where the node's wireless mesh equipment 202 comprises ptp radios that are each used to communicate with one other node within the mesh-based communication system via a respective ptp wireless link, in other embodiments, the node's wireless mesh equipment 202 could comprise a single ptmp radio (or perhaps multiple ptmp radios) that is used to communicate with any other nodes within the mesh-based communication system via a ptmp wireless link. For instance, the wireless mesh equipment 202 of FIG. 2B could be altered to remove the ptp radios 212*a* and 212*b*, and ptmp radio 212*c* may then be configured to transmit wireless signals to and/or receive wireless signals from the two other nodes with which the example node 200 would have otherwise communicated via ptp wireless links. In this respect, the ptmp radio 212*c* may be equipped with an antenna unit 240 that provides beamsteering capability, such as a phased array antenna or a reflectarray, and the ptmp radio 212*c* may utilize this beamsteering capability in a similar manner to that described above in order to transmit wireless signals to and/or receive wireless signals from the two other nodes with which the example node 200 would have otherwise communicated via ptp wireless links, along with any other nodes with which the example node 200 is to communicate. In order to ensure that the two other nodes with which the example node 200 would have otherwise communicated via ptp wireless links are provided with sufficient bandwidth for exchanging network traffic over the ptmp wireless link, the ptmp radio 212*c* could assign those two nodes a larger time-share of the ptmp wireless link.

Such an alternative embodiment may provide certain advantages over the embodiment in FIG. 2B, including a reduction in the cost and complexity of the wireless mesh equipment 202. However, in line with the discussion above, ptmp wireless links also have certain drawbacks relative to ptp wireless links, including increased susceptibility to interference and bandwidth sharing that may lead to decreased data rates for any given node communicating on the ptmp wireless link, which may offset the advantages of utilizing a single ptmp radio. Notably, the reflectarray disclosed herein may help to minimize some of these drawbacks, because the distinct design of the reflectarray enables it to employ an increased number of antenna elements in an array footprint relative to a phased array antenna and that increase in antenna elements in turn provides the capability to produce a steerable beam having a narrower beamwidth.

Now returning to FIG. 2A, the node's networking equipment 204 may generally comprise any one or more networking devices that facilitate network communications between the wireless mesh equipment 202 and other devices or systems, which may include client devices within the building and perhaps also wired communication nodes and/or the core network (if the node 200 is a first-tier node and core-network communications are routed through the networking equipment 204). These one or more networking devices may take any of various forms, examples of which may include one or more modems, routers, switches, or the like, among other possibilities. In turn, the communication link 203 may comprise any suitable link for carrying network traffic between the wireless mesh equipment 202 and the networking equipment 203, examples of which may include a copper-based wired link (e.g., a coaxial cable, Ethernet cable, a serial bus cable, or the like), a fiber-based wired link (e.g., a glass optical fiber cable, a plastic optical fiber cable, or the like), or perhaps even a wireless link, and may be connected to any of various components of the wireless mesh equipment 202, examples of which may include the processing unit or a wireless radio, among other possibilities.

Further, the node's power equipment 206 may generally comprise any suitable equipment for supplying power to the node's wireless mesh equipment 202 and/or networking equipment 204, such as electrical power units, solar power units, and/or battery units, among other possibilities. In turn, the power cable 205 may comprise any suitable cable for delivering power from the node's power equipment 206 to the node's wireless mesh equipment 202 and/or networking equipment 204.

In line with the discussion above, the example wireless communication node 200 may also include other types of equipment as well, including but not limited to equipment that enables the example wireless communication node 200 to operate as part of a distributed data storage platform, an edge computing platform, and/or a blockchain network.

For instance, in some embodiments, the equipment of the example wireless communication node 200 may additionally include one or more non-volatile storage mediums that are configured to store data as part of a distributed data storage platform, such as a distributed data storage platform that hosts digital content for download or streaming (e.g., video content, audio content, video games, etc.) and/or hosts user files uploaded by end users for storage and future retrieval, among other possibilities. In such embodiments, the one or more non-volatile storage mediums of the example wireless communication node 200—which may be referred to herein as "storage units"—may take any of various forms.

For instance, as one possible arrangement, the example wireless communication node 200 may comprise a single storage unit that is configured to store data as part of a distributed data storage platform. In such an arrangement, the single storage unit may comprise any of various types of storage units, examples of which may include a hard-disk drive, a solid-state drive (which could be based on flash memory or some other technology), a tape drive, or an optical drive, among other possibilities. Further, the single storage unit may be placed in any of various locations at the infrastructure site, examples of which may include outside of the building with the wireless mesh equipment 202 (e.g., on the building's roof), inside of the building with the networking equipment 204, or in some other outdoor or indoor location, among other possibilities. Further yet, the single storage unit may be interconnected with the example wireless communication node's other equipment in any of various manners, including but not limited to (i) a connection to a component of the wireless mesh equipment 202 (e.g., a centralized processing unit or a wireless radio) via a wired and/or wireless communication link or (ii) a connection to a component of the networking equipment 204 (e.g., a router) via a wired and/or wireless communication link, among other possibilities.

As another possible arrangement, the example wireless communication node 200 may comprise multiple discrete storage units that are configured to store data as part of the distributed data storage platform. In such an arrangement, each of the multiple discrete storage units may comprise any of various types of storage units, examples of which may include a hard-disk drive, a solid-state drive (which could be based on flash memory or some other technology), a tape drive, or an optical drive, among other possibilities. Further, each of the multiple discrete storage units may be placed in any of various locations at the infrastructure site, examples of which may include outside of the building with the wireless mesh equipment 202 (e.g., on the building's roof), inside of the building with the networking equipment 204, or in some other outdoor or indoor location, among other possibilities. Further yet, each of the multiple discrete storage units may be interconnected with the example wireless communication node's other equipment in any of various manners, including but not limited to (i) a connection to a component of the wireless mesh equipment 202 (e.g., a centralized processing unit or a wireless radio) via a wired and/or wireless communication link or (ii) a connection to a component of the networking equipment 204 (e.g., a router) via a wired and/or wireless communication link, among other possibilities.

In such an arrangement where the example wireless communication node 200 comprises multiple discrete storage units that are configured to store data as part of a distributed data storage platform, the example wireless communication node's multiple storage units may also be configured to operate a multi-tier storage architecture (or sometimes referred to as a "tiered" storage architecture) in which these discrete storage units are utilized to store different categories of data. For instance, as one possibility, the example wireless communication node's multiple storage units may be configured to operate as part of a multi-tier storage architecture comprising: (i) a first tier of one or more storage units that are utilized to store data that is more frequently accessed and/or considered to be of greater importance, and (ii) a second tier of one or more storage units that are utilized to store data that is less frequently accessed and/or considered to be of lesser importance. In this respect, each storage unit in the first tier may comprise a storage unit having characteristics better suited for storage of data that is more frequently accessed and/or considered to be of greater importance, such as a storage unit that delivers higher performance (e.g., faster, lower latency, more reliable, etc.) as compared to other types of storage units but perhaps has less storage capacity and/or is less cost effective than other types of storage units that may be used for a lower storage tier, whereas each storage unit in the second tier may comprise a storage unit having characteristics better suited for storage of data that is less frequently accessed and/or considered to be of lesser importance, such as a storage unit that has more capacity and is more cost effective as compared to other types of storage units but perhaps delivers lower performance (e.g., is not as fast and/or not as reliable) than other types of storage units that may be used for a higher storage tier.

To illustrate with a specific example, the example wireless communication node 200 may be equipped with a multi-tier storage architecture comprising (i) at least one first-tier storage unit placed outside of the building (e.g., together with the wireless mesh equipment 202) that takes the form of storage drive that is more expensive and higher performing relative to other types of storage drives but may have a lower level of storage capacity as compared to storage drives used for a lower storage tier (e.g., a capacity of 1 terabyte (TB) or less such as 256 or 512 gigabytes (GB)), such as a solid-state drive, and (ii) at least one second-tier storage unit placed inside of the building (e.g., together with the networking equipment 204) that takes the form of storage drive that is a less expensive lower performance relative to other types of storage drives but may a higher level of capacity as compared to storage drives used in a higher storage tier (e.g., a capacity of greater than 1 TB such as 4 TB or more), such as a hard-disk drive. In such an example, the node's first-tier storage unit may be connected to a component of the wireless mesh equipment 202 such as a centralized processing unit or a wireless radio via a first wired and/or wireless communication link, and the node's second-tier storage unit may be connected to a component of the networking equipment 204 such as a router via a second wired and/or wireless communication link—in which case the second-tier storage unit may be accessed by the wireless mesh equipment 202 via a communication path that includes the communication link 203, the networking equipment 204, and the second communication link with the second-tier storage unit. However, the node's first-tier and second-tier storage units may be interconnected in other manners as well, including but not limited to the possibility that the first-tier and second-tier storage units could both be connected to the same component of the node's equipment (e.g., both connected to a centralized processing unit or a given wireless radio of the wireless mesh equipment 202).

Within this example multi-tier storage architecture, the node's first-tier storage unit may be utilized to store a first class of data as part of the distribution storage platform (e.g., data that is more frequently accessed and/or is otherwise considered to be of greater importance), and the node's second-tier storage unit may be utilized to store a second class of data as part of the distribution storage platform (e.g., data that is less frequently accessed and/or is otherwise considered to be of lesser importance). Further, within this example arrangement, any of various components of the example wireless communication node 200 may be tasked with writing data to and reading data from the node's multi-tier storage architecture, including but not limited to a centralized processing unit of the wireless mesh equipment 202 or a given wireless radio of the wireless mesh equipment 202, among other possibilities.

In practice, the component that is tasked with writing data to the node's multi-tier storage architecture may function to (i) evaluate newly-received data that is to be written to the node's multi-tier storage architecture to determine whether it falls within a first class of data or a second class of data (e.g., based on frequency of access, importance, etc.) and then (ii) based on that evaluation, write the data to either the first-tier storage unit or the second-tier storage unit. For example, if the component that is tasked with writing data to the node's multi-tier storage architecture comprises a centralized processing unit or a wireless radio of the wireless mesh equipment 202, the centralized processing unit or wireless radio may function to (i) evaluate newly-received data that is to be written to the node's multi-tier storage architecture (e.g., data received over a wireless link established by a wireless radio of the node 200) to determine whether it falls within a first class of data or a second class of data, and then (ii) based on that evaluation, write the data to either the first-tier storage unit that is placed outside of the building and connected to the centralized processing unit or the wireless radio via the first communication link with the first-tier storage unit or the second-tier storage unit that is placed inside of the building and connected to the centralized processing unit via a communication path that includes the communication link 203, the networking equipment 204, and the second communication link with the second-tier storage unit.

Additionally, the component that is tasked with writing data to the node's multi-tier storage architecture may also function to (i) evaluate the data that is already stored within the node's multi-tier storage architecture to determine whether any data stored in one tier of the multi-tier storage architecture now falls within a different class of data that is associated with the other tier of the multi-tier storage architecture (e.g., data stored in the first-tier storage unit that is no longer classified as frequently-accessed data or data stored in the second-tier storage unit that is newly classified as frequently-accessed data) and then (ii) based on that evaluation, moving certain data from one tier of the multi-tier storage architecture to the other. For example, if the component that is tasked with writing data to the node's multi-tier storage architecture comprises a centralized processing unit or a wireless radio of the wireless mesh equipment 202, the centralized processing unit or wireless radio may function to (i) move reclassified data from the first-tier storage unit to the second-tier storage unit by retrieving the data from the first-tier storage unit over the first communication link with the first-tier storage unit and then writing the retrieved data to the second-tier storage unit over a communication path that includes the communication link 203, the networking equipment 204, and the second communication link with the second-tier storage unit and (ii) move reclassified data from the second-tier storage unit to the first-tier storage unit by retrieving the data from the second-tier storage unit over a communication path that includes the communication link 203, the networking equipment 204, and the second communication link with the second-tier storage unit and then writing the retrieved data to the first-tier storage unit over the first communication link with the first-tier storage unit.

Additionally yet, the component that is tasked with reading data from the node's multi-tier storage architecture may function to (i) receive a request to read data from the multi-tier storage architecture, (ii) evaluate whether the data to be read is stored within the first tier or second tier of the multi-tier storage architecture, (iii) based on that evaluation, determine that the data is stored within a given one of the first-tier storage unit or the second-tier storage unit, and then (iv) retrieve the data from given one of the first-tier storage unit or the second-tier storage unit. For example, if the component that is tasked with writing data to the node's multi-tier storage architecture comprises a centralized processing unit or a wireless radio of the wireless mesh equipment 202, the centralized processing unit or wireless radio may function to (i) receive a request to read data from the multi-tier storage architecture, (ii) evaluate whether the data to be read is stored within the first tier or second tier of the multi-tier storage architecture, (iii) based on that evaluation, determine that the data is stored within a given one of the first-tier storage unit or the second-tier storage unit, and then (iv), retrieve the data from either the first-tier storage unit over the first communication link with the first-tier storage unit or the second-tier storage unit over a communication path that includes the communication link 203, the networking equipment 204, and the second communication link with the second-tier storage unit.

The example wireless communication node 200 may comprise multiple storage units that are configured to operate within other types of multi-tier storage architectures as well, including but not limited to a multi-tier storage architecture having more than two tiers and/or a multi-tier storage architecture in which storage units in the different tiers have different characteristics (e.g., different performance levels, different capacity levels, etc.) and/or are placed in different locations at the infrastructure site (e.g., both inside, both outside, etc.), among other possible variations of the example multi-tier storage architecture described above.

In some implementations, a given wireless communication node could also be configured to write data to and/or read data from a multi-tier storage architecture comprising one or more storage units of the wireless communication node itself as well as one or more other storage units that are included as part of one or more other communication nodes.

For example, in a scenario where a given wireless communication node is connected to one or more wired communication nodes via one or more wired communication links, the given wireless communication node may be configured to write data to and/or read data from a multi-tier storage architecture comprising (i) at least one first-tier storage unit that is installed at the given wireless communication node's own infrastructure site and (ii) a second-tier storage unit that is installed at the given wireless communication node's own infrastructure site as well as one or more other second-tier storage units that are installed at the infrastructure site(s) of the one or more wired communication nodes connected to the given wireless communication node.

In such an example, the first-tier storage unit that is installed at the given wireless communication node's own infrastructure site may comprise a storage unit placed outside of the building at the given wireless communication node's infrastructure site (e.g., together with the wireless mesh equipment 202) that takes the form of a more-expensive, high-performance storage drive having a lower level of storage capacity (e.g., a capacity of 1 TB or less such as 256 or 512 GB), such as a solid-state drive, the second-tier storage unit that is installed at the given wireless communication node's own infrastructure site may comprise a storage unit placed inside of the building at the given wireless communication node's infrastructure site that takes the form of a less-expensive, lower-performance storage drive having a higher level of capacity (e.g., a capacity of greater than 1 TB such as 4 TB or more), such as a hard-disk drive, and the second-tier storage unit that is installed at the infrastructure site of each wired communication node may comprise a storage unit placed inside of the building at the wired communication node's infrastructure site that likewise takes the form of a less-expensive, lower-performance storage drive having a higher level of capacity (e.g., a capacity of greater than 1 TB such as 4 TB or more), such as a hard-disk drive. However, it should be understood that the first-tier and second-tier storage units could take various other forms as well.

Further, in such an example, the first-tier storage unit of the given wireless communication node may be connected to a component of the given wireless communication node's wireless mesh equipment such as a centralized processing unit or a wireless radio, the second-tier storage unit of the given wireless communication node may be connected to a component of the given wireless communication node's networking equipment such as a router, and the second-tier storage unit of each wired communication node may be connected to a component of the wired communication node's networking equipment such as a router. In this respect, the component of the given wireless communication node that is tasked with writing data to and reading data from the multi-tier storage architecture may access a second-tier storage unit of a wired communication node over a communication path that includes a wired link between the given wireless communication node equipment and the wired communication node's networking equipment, and may write data to and read data from the second-tier storage unit of the wired communication node in a similar manner to how the component of the given wireless communication node may write data to and read data from a second-tier storage unit of the given wireless communication node itself (e.g., in accordance with the functionality described above).

As another example, in a scenario where a given wireless communication node originates a ptmp wireless link that is established with one or more fourth-tier nodes, the given wireless communication node may be configured to write data to and/or read data from a multi-tier storage architecture comprising (i) at least one first-tier storage unit that is installed at the given wireless communication node's own infrastructure site and (ii) a second-tier storage unit that is installed at the given wireless communication node's own infrastructure site as well as one or more other second-tier storage units that are installed at the infrastructure site(s) of the one or more fourth-tier nodes.

In such an example, the first-tier storage unit that is installed at the given wireless communication node's own infrastructure site may comprise a storage unit placed outside of the building at the given wireless communication node's infrastructure site (e.g., together with the wireless mesh equipment 202) that takes the form of a more-expensive, high-performance storage drive having a lower level of storage capacity (e.g., a capacity of 1 TB or less such as 256 or 512 GB), such as a solid-state drive, the second-tier storage unit that is installed at the given wireless communication node's own infrastructure site may comprise a storage unit placed inside of the building at the given wireless communication node's infrastructure site that takes the form of a less-expensive, lower-performance storage drive having a higher level of capacity (e.g., a capacity of greater than 1 TB such as 4 TB or more), such as a hard-disk drive, and the second-tier storage unit that is installed at the infrastructure site of each fourth-tier node may comprise a storage unit placed inside of the building at the fourth-tier node's infrastructure site that likewise takes the form of a less-expensive, lower-performance storage drive having a higher level of capacity (e.g., a capacity of greater than 1 TB such as 4 TB or more), such as a hard-disk drive. However, it should be understood that the first-tier and second-tier storage units could take various other forms as well.

Further, in such an example, the first-tier storage unit of the given wireless communication node may be connected to a component of the given wireless communication node's wireless mesh equipment such as a centralized processing unit or a wireless radio, the second-tier storage unit of the given wireless communication node may be connected to a component of the given wireless communication node's networking equipment such as a router, and the second-tier storage unit of each fourth-tier node may be connected to a component of the fourth-tier node's wireless mesh equipment (e.g., a wireless radio) and/or networking equipment (e.g., a router). In this respect, the component of the given wireless communication node that is tasked with writing data to and reading data from the multi-tier storage architecture may access a second-tier storage unit of a fourth-tier node over a communication path that includes the ptmp wireless link between the given wireless communication node and the fourth-tier node, and may write data to and read data from the second-tier storage unit of the fourth-tier node in a similar manner to how the component of the given wireless communication node may write data to and read data from a second-tier storage unit of the given wireless communication node itself (e.g., in accordance with the functionality described above).

A multi-tier storage architecture of a given wireless communication node that leverages storage units of other communication nodes may take other forms as well, including but not limited to the possibility that the first tier of a multi-tier storage architecture could include first-tier storage units of other communication nodes as well.

In embodiments where the equipment of the example wireless communication node 200 additionally includes one or more data storage units that are configured to store data as part of a distributed data storage platform, the one or more data storage units could take various other forms as well.

In other embodiments, the equipment of the example wireless communication node 200 may additionally include an edge computing system comprising hardware and associated software for performing functions related to one or more edge computing applications. In this respect, the edge computing system of the example wireless communication node 200 may generally comprise one or more physical computing devices (e.g., one or more servers or perhaps one or more racks of servers), and these one or more computing devices may collectively include one or more processors, data storage, and one or more communication interfaces, all of which may be communicatively linked together in some manner (e.g., via a system bus or a communication network). Each of these components may take various forms.

For instance, the edge computing system's one or more processors may each comprise one or more processing components, such as general-purpose processors (e.g., a single- or a multi-core CPU), special-purpose processors (e.g., a GPU, application-specific integrated circuit, or digital-signal processor), programmable logic devices (e.g., a field programmable gate array), controllers (e.g., microcontrollers), and/or any other processor components now known or later developed.

Further, the edge computing system's data storage may comprise one or more non-transitory computer-readable storage mediums that are collectively configured to store (i) program instructions that are executable by the edge computing system's one or more processors such that the edge computing system is configured to perform edge computing functions, and (ii) data that may be received, derived, or otherwise stored, for example, in one or more databases, file systems, repositories, or the like, by the edge computing system in connection with performing edge computing functions. In this respect, the one or more non-transitory computer-readable storage mediums of the edge computing system's data storage may take various forms, examples of which may include volatile storage mediums such as random-access memory, registers, cache, or the like, and non-volatile storage mediums such as read-only memory, a hard-disk drive, a solid-state drive (which could be based on flash memory or some other technology), a tape drive, or an optical drive, among other possibilities. It should also be understood that certain aspects of the edge computing system's data storage may be integrated in whole or in part with the edge computing system's one or more processors.

Further yet, the edge computing system's one or more communication interfaces may each be configured to facilitate wireless or wired communication with some other aspect of the example wireless communication node's equipment, such as the node's wireless mesh equipment 202 or the node's network equipment 204. In this respect, the edge computing system's one or more communication interfaces may each take any of various forms, examples of which may include a coaxial interface, an Ethernet interface, a serial bus interface (e.g., PCI/PCIe, Firewire, USB, Thunderbolt, etc.), a glass optical fiber interface, a plastic optical fiber interface, a chipset and antenna adapted to facilitate wireless communication according to any of various wireless protocols (e.g., Wi-Fi or point-to-point protocols), and/or any other interface that provides for wired and/or wireless communication. The edge computing system's one or more communication interfaces may take various other forms as well.

The edge computing system may include various other components and/or take various other forms as well.

In a scenario where the edge computing system's data storage includes multiple non-volatile storage mediums comprising discrete storage units, the edge computing system's discrete storage units may also be configured to operate within a multi-tier storage architecture in which these discrete storage units are utilized to store different categories of data storage. For instance, similar to the multi-tier storage architecture described above, the edge computing system's storage units may be configured to operate as part of a multi-tier storage architecture comprising: (i) a first tier of one or more storage units that are utilized to store data that is more frequently accessed and/or considered to be of greater importance, and (ii) a second tier of one or more storage units that are utilized to store data that is less frequently accessed and/or considered to be of lesser importance. In this respect, each storage unit in the first tier may comprise a storage unit having characteristics better suited for storage of data that is more frequently accessed and/or considered to be of greater importance, such as a storage unit that delivers higher performance (e.g., faster, more reliable, etc.) but perhaps has less storage capacity and/or is less cost effective relative to a second-tier storage unit, whereas each storage medium in the second tier may comprise a storage unit having characteristics better suited for storage of data that is less frequently accessed and/or considered to be of lesser importance, such as a storage unit that has more capacity and is more cost effective but perhaps delivers lower performance (e.g., is not as fast and/or not as reliable) relative to a first-tier storage unit.

For example, the edge computing system may have a multi-tier storage architecture comprising (i) at least one first-tier storage unit placed outside of the building (e.g., together with the wireless mesh equipment 202) that takes the form of a more-expensive, high-performance storage drive having a lower level of storage capacity (e.g., a capacity of 1 TB or less such as 256 or 512 GB), such as a solid-state drive, and (ii) at least one second-tier storage unit placed inside of the building (e.g., together with the networking equipment 204) that takes the form of a less-expensive, lower-performance storage drive having a higher level of capacity (e.g., a capacity of greater than 1 TB such as 4 TB or more), such as a hard-disk drive. However, the edge computing system may have multiple storage units that are configured to operate within other types of multi-tier storage architectures as well, including but not limited to a multi-tier storage architecture having more than two tiers and/or a multi-tier storage architecture in which storage units in the different tiers have different characteristics (e.g., different performance levels, different capacity levels, etc.) and/or are placed in different locations at the infrastructure site (e.g., both inside, both outside, etc.), among other possible variations of the example multi-tier storage architecture described above.

In embodiments where the equipment of the example wireless communication node 200 additionally includes an edge computing system, that edge computing system could take various other forms as well.

In still other embodiments, the equipment of the example wireless communication node 200 may additionally include a "blockchain" computing system comprising hardware and associated software for operating as a node of a blockchain network. In this respect, the blockchain computing system of the example wireless communication node 200 may generally comprise one or more physical computing devices (e.g., one or more servers or perhaps one or more racks of servers), and these one or more computing devices may collectively include one or more processors, data storage, and one or more communication interfaces, all of which may be communicatively linked together in some manner (e.g., via a system bus or a communication network). Each of these components may take various forms.

For instance, the blockchain computing system's one or more processors may each comprise one or more processing components, such as general-purpose processors (e.g., a single- or a multi-core CPU), special-purpose processors (e.g., a GPU, application-specific integrated circuit, or digital-signal processor), programmable logic devices (e.g., a field programmable gate array), controllers (e.g., microcontrollers), and/or any other processor components now known or later developed.

Further, the blockchain computing system's data storage may comprise one or more non-transitory computer-readable storage mediums that are collectively configured to store (i) program instructions that are executable by the blockchain computing system's one or more processors such that the blockchain computing system is configured to operate as a node of a blockchain network, and (ii) data that may be received, derived, or otherwise stored, for example, in one or more databases, file systems, repositories, or the like, by the blockchain computing system in connection with operating as a node of a blockchain network. In this respect, the one or more non-transitory computer-readable storage mediums of the blockchain computing system's data storage may take various forms, examples of which may include volatile storage mediums such as random-access memory, registers, cache, or the like, and non-volatile storage mediums such as read-only memory, a hard-disk drive, a solid-state drive (which could be based on flash memory or some other technology), a tape drive, or an optical drive, among other possibilities. It should also be understood that certain aspects of the blockchain computing system's data storage may be integrated in whole or in part with the blockchain computing system's one or more processors.

Further yet, the blockchain computing system's one or more communication interfaces may each be configured to facilitate wireless or wired communication with some other aspect of the example wireless communication node's equipment, such as the node's wireless mesh equipment 202 or the node's network equipment 204. In this respect, the blockchain computing system's one or more communication interfaces may each take any of various forms, examples of which may include a coaxial interface, an Ethernet interface, a serial bus interface (e.g., PCI/PCIe, Firewire, USB, Thunderbolt, etc.), a glass optical fiber interface, a plastic optical fiber interface, a chipset and antenna adapted to facilitate wireless communication according to any of various wireless protocols (e.g., Wi-Fi or point-to-point protocols), and/or any other interface that provides for wired and/or wireless communication. The blockchain computing system's one or more communication interfaces may take various other forms as well.

The blockchain computing system may include various other components and/or take various other forms as well.

In a scenario where the blockchain computing system's data storage includes multiple non-volatile storage mediums comprising discrete storage units, the blockchain computing system's discrete storage units may also be configured to operate within a multi-tier storage architecture in which these discrete storage units are utilized to store different categories of data storage. For instance, similar to the multi-tier storage architectures described above, the blockchain computing system's storage units may be configured to operate as part of a multi-tier storage architecture comprising: (i) a first tier of one or more storage units that are utilized to store data that is more frequently accessed and/or considered to be of greater importance, and (ii) a second tier of one or more storage units that are utilized to store data that is less frequently accessed and/or considered to be of lesser importance. In this respect, each storage unit in the first tier may comprise a storage unit having characteristics better suited for storage of data that is more frequently accessed and/or considered to be of greater importance, such as a storage unit that delivers higher performance (e.g., faster, more reliable, etc.) but perhaps has less storage capacity and/or is less cost effective relative to a second-tier storage unit, whereas each storage medium in the second tier may comprise a storage unit having characteristics better suited for storage of data that is less frequently accessed and/or considered to be of lesser importance, such as a storage unit that has more capacity and is more cost effective but perhaps delivers lower performance (e.g., is not as fast and/or not as reliable) relative to a first-tier storage unit.

For example, the blockchain computing system may have a multi-tier storage architecture comprising (i) at least one first-tier storage unit placed outside of the building (e.g., together with the wireless mesh equipment 202) that takes the form of a more-expensive, high-performance storage drive having a lower level of storage capacity (e.g., a capacity of 1 TB or less such as 256 or 512 GB), such as a solid-state drive, and (ii) at least one second-tier storage unit placed inside of the building (e.g., together with the networking equipment 204) that takes the form of a less-expensive, lower-performance storage drive having a higher level of capacity (e.g., a capacity of greater than 1 TB such as 4 TB or more), such as a hard-disk drive. However, the blockchain computing system may have multiple storage units that are configured to operate within other types of multi-tier storage architectures as well, including but not limited to a multi-tier storage architecture having more than two tiers and/or a multi-tier storage architecture in which storage units in the different tiers have different characteristics (e.g., different performance levels, different capacity levels, etc.) and/or are placed in different locations at the infrastructure site (e.g., both inside, both outside, etc.), among other possible variations of the example multi-tier storage architecture described above.

In embodiments where the equipment of the example wireless communication node 200 additionally includes a blockchain computing system, that edge computing system could take various other forms as well.

As yet another possible embodiment, the equipment of the example wireless communication node 200 could additionally include an agent device that is configured to connect to a display device (e.g., a television, computer monitor, or the like) located at the node's infrastructure site and serve as an interface between the television and the wireless mesh equipment 202 of the example wireless communication node 200 (e.g., a centralized processing unit or a wireless radio), which may advantageously provide users with another way to access a service delivered via a mesh-based communication system (e.g., an Internet service). For instance, in a scenario where a user that resides at the node's infrastructure site does not have access to a computer, the user may still be able to access a service delivered via a mesh-based communication system by connecting the disclosed agent device to a display device such as a television and then using that display device to access the service (e.g., by browsing the Internet, streaming online content, etc.).

Such an agent device may take any of various forms. As one possibility, the agent device may take the form of a dongle-type device that is configured to plug into a certain type of port of the display device, such as a High-Definition Multimedia Interface (HDMI) port, a USB port, an Ethernet port, or an optical port, among other possible types of display-device ports. As another possibility, agent device may take the form of a set-top box that is configured to be connected to a display device via a wired or wireless link. The agent device may take various other forms as well.

Regardless of its particular form, the agent device may generally comprise (i) a first communication interface that is configured to facilitate communication with a display device, which may take the form of an interface that plugs into certain type of port of the display device (e.g., an HDMI port, USB port, Ethernet port, optical port, etc.) or otherwise connects the agent device to a display device via a wired link (e.g., an HDMI cable, USB cable, Ethernet cable, optical cable, etc.) or a wireless link (e.g., a Wi-Fi link, Bluetooth link, etc.), (ii) a second communication interface that is configured to facilitate communication with the wireless mesh equipment 202 of the example wireless communication node 200, such as a communication interface that connects the agent device to a component of the node's wireless mesh equipment 202 (e.g., a centralized processing unit or a wireless radio) and/or a component of the node's networking equipment 204 (e.g., a router that is in turn connected to the wireless mesh equipment 202) via a wired link (e.g., an Ethernet cable) or a wireless link (e.g., a Wi-Fi-based link, a wireless point-to-point link, etc.), (iii) one or more processors, (iv) one or more non-transitory computer-readable storage mediums installed with software comprising program instructions that are executable by the agent device's one or more processors such that the agent device is configured to perform functionality for serving as an interface between the display device and the other equipment of the example wireless communication node 200, among other possible components of the disclosed agent device. In such an embodiment, a component of the wireless mesh equipment 202 (e.g., a centralized processing unit or a processing unit of a wireless radio) may then be installed software that, in addition to carrying out the other functionality described above related to the wireless mesh equipment 202, also functions to communicate with the agent device in order to transmit data to the agent device and/or receive data from the agent device. In this respect, the software installed on the wireless mesh equipment 202 may have lead responsibility for performing data processing functions for the display device, and the software installed on the agent device may serve as a lightweight agent-type application for the software installed on the wireless mesh equipment 202 that functions to (i) receive data (e.g., network traffic) from the wireless mesh equipment 202 and then cause such data to be presented to a user via the display device to which the agent device is connected and (ii) transmit data (e.g., user input that is entered via the display device) back to the wireless mesh equipment 202. In order to facilitate the interaction between the wireless mesh equipment 202 and the agent device, software installed on the wireless mesh equipment 202 and the agent device may take various other forms and/or perform various other functions as well.

The equipment of the example wireless communication node 200 may take various other forms as well.

III. Management of Mesh-Based Communication System

In some implementations, a mesh-based communication system may additionally include or be associated with a computing platform that is sometimes referred to as a network management system (or "NMS" for short), which may be configured to facilitate various tasks related to managing the mesh-based communication system, including but not limited to planning the architecture of the mesh-based communication system, deploying the mesh-based communication system, monitoring the operation of the mesh-based communication system, and/or modifying the configuration of the mesh-based communication system, among other possible tasks. For instance, such a computing platform may be configured to host any of various software applications for facilitating these tasks. In practice, each such software application may be designed according to a client-server model, where the software application comprises back-end software that runs on a back-end computing platform and front-end software that runs on users' client devices (e.g., in the form of a native application such as a mobile app, a web application, and/or a hybrid application, etc.) and can be used to access the back-end platform via a data network, such as the Internet. However, it should be understood that the software hosted by the computing platform may take other forms as well.

Figure 4:
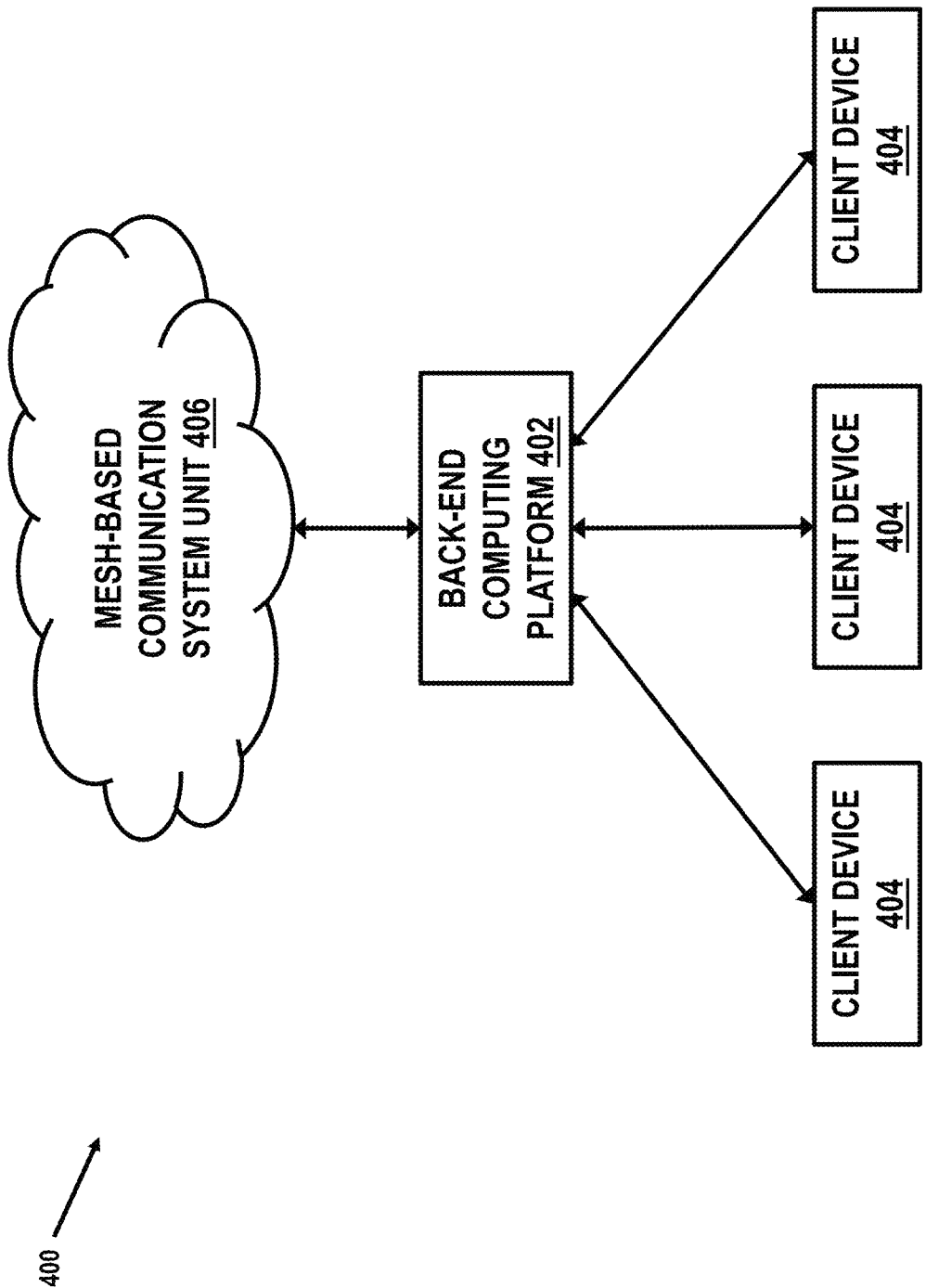
FIG. 4 depicts an example computing environment that includes a mesh-based communication system that is configured to operate in accordance with aspects of the disclosed technology.

One example of a computing environment 400 in which such a computing platform may operate is illustrated in FIG. 4. As shown in FIG. 4, the computing environment 400 may include a back-end computing platform 402 that may be communicatively coupled to any of various client devices, depicted here, for the sake of discussion, as client devices 404. (While FIG. 4 shows an arrangement in which three client devices 404 are communicatively coupled to back-end platform 402, it should be understood that this is merely for purposes of illustration and that any number of client devices may communicate with back-end platform 402.) Additionally, as shown in FIG. 4, the back-end computing platform 402 may also be communicatively coupled to any of various communication nodes within a mesh-based communication system 406, which may take any of the forms described above.

Broadly speaking, the back-end computing platform 402 may comprise some set of physical computing resources (e.g., processors, data storage, communication interfaces, etc.) that have been configured to run back-end software (e.g., program code) for performing back-end platform functions that facilitate any of various tasks related to managing the mesh-based communication system, including but not limited to planning the architecture of the mesh-based communication system, deploying the mesh-based communication system, monitoring the operation of the mesh-based communication system, and/or modifying the configuration of the mesh-based communication system, among other possible tasks.

The back-end computing platform's set of physical computing resources take any of various forms. As one possibility, the computing platform 402 may comprise cloud computing resources that are supplied by a third-party provider of "on demand" cloud computing resources, such as Amazon Web Services (AWS), Amazon Lambda, Google Cloud Platform (GCP), Microsoft Azure, or the like. As another possibility, the computing platform 402 may comprise "on-premises" computing resources of the financial institution that operates the example computing platform 102 (e.g., institution-owned servers). As yet another possibility, the example computing platform 402 may comprise a combination of cloud computing resources and on-premises computing resources. Other implementations of the example computing platform 402 are possible as well.

In turn, client devices 404 may each be any computing device that is capable of running front-end software for interacting with the back-end computing platform 402 in order facilitate any of various tasks related to managing the mesh-based communication system. In this respect, client devices 404 may each include hardware components such as a processor, data storage, a communication interface, and user-interface components (or interfaces for connecting thereto), among other possible hardware components, as well as software components such as the front-end software for a software application that facilitates any of various tasks related to managing the mesh-based communication system. As representative examples, client devices 404 may each take the form of a desktop computer, a laptop, a netbook, a tablet, a smartphone, and/or a personal digital assistant (PDA), among other possibilities.

As further depicted in FIG. 4, the back-end computing platform 402 may be configured to communicate with the client devices 404 and the communication nodes of the mesh-based communication system 406 over respective communication paths. Each of these communication paths may generally comprise one or more data networks and/or data links, which may take any of various forms. For instance, each respective communication path between the example computing platform 402 and a client device 404 may include any one or more of a Personal Area Network (PAN), a Local Area Network (LAN), a Wide Area Networks (WAN) such as the Internet or a cellular network, a cloud network, and/or a point-to-point data link, among other possibilities, where each such data network and/or link may be wireless, wired, or some combination thereof, and may carry data according to any of various different communication protocols. Likewise, each respective communication path between the example computing platform 402 and a communication nodes of the mesh-based communication system 406 may include any one or more of the foregoing types of data networks and/or data links, as well as one or more of the wireless links within the mesh-based communication system 406 itself. Although not shown, the respective communication paths may also include one or more intermediate systems, examples of which may include a data aggregation system and host server, among other possibilities. Many other configurations are also possible.

It should be understood that network configuration 400 is one example of a network configuration in which embodiments described herein may be implemented. Numerous other arrangements are possible and contemplated herein. For instance, other network configurations may include additional components not pictured and/or more or less of the pictured components.

Further, any of the types of software applications related to managing a mesh-based communication system may be hosted in network environment 400, including but not limited to software applications related to deploying the mesh-based communication system, monitoring the operation of the mesh-based communication system, and/or modifying the configuration of the mesh-based communication system. Some representative examples of software applications related to managing a mesh-based communication system are disclosed in (i) U.S. Provisional Application No. 63/333,051, which was filed on Apr. 20, 2022 and is entitled "Software Tools for Facilitating Deployment of Mesh-Based Communication Systems," and (ii) U.S. Provisional Application No. 63/333,097, which was filed on Apr. 20, 2022 and is entitled "Software Tools for Facilitating Management and Monitoring of Mesh-Based Communication Systems," each of which is incorporated herein by reference in its entirety. Various other examples of software applications related to managing a mesh-based communication system can be hosted in network environment 400 as well.

CONCLUSION

Example embodiments of the disclosed innovations have been described above. At noted above, it should be understood that the figures are provided for the purpose of illustration and description only and that various components (e.g., modules) illustrated in the figures above can be added, removed, and/or rearranged into different configurations, or utilized as a basis for modifying and/or designing other configurations for carrying out the example operations disclosed herein. In this respect, those skilled in the art will understand that changes and modifications may be made to the embodiments described above without departing from the true scope and spirit of the present invention, which will be defined by the claims.

Further, to the extent that examples described herein involve operations performed or initiated by actors, such as humans, operators, users or other entities, this is for purposes of example and explanation only. Claims should not be construed as requiring action by such actors unless explicitly recited in claim language.

We claim:

1. A radio module for a wireless communication node in a wireless mesh network, the radio module comprising:
   a reflectarray antenna comprising a plurality of antenna elements, wherein each antenna element of the plurality of antenna elements is configured to receive an incident signal, apply one of two phase shifts to the incident signal, and radiate the phase-shifted incident signal;
   a radio frequency (RF) module comprising a single RF chain configured to feed the incident signal to the plurality of antenna elements in the reflectarray antenna; and
   a control unit that is configured to control which of the two phase shifts is applied by each antenna element in the reflectarray antenna,
   wherein each antenna element of the plurality of antenna elements comprises a patch antenna or a microstrip antenna,
   wherein each antenna element of the plurality of antenna elements comprises a first edge, a second edge, and a third edge, and
   wherein applying one of the two phase shifts to the incident signal comprises routing the received incident signal from the first edge to one of the second edge or the third edge.

2. The radio module of claim 1, wherein controlling which of the two phase shifts is applied by each antenna element in the reflectarray antenna comprises:
   applying a first phase-shift configuration for signals sent over a first wireless link, wherein applying the first phase-shift configuration comprises causing a first subset of the plurality of antenna elements to apply a first one of the two phase shifts and a second subset of the plurality of antenna elements to apply a second one of the two phase shifts; and
   applying a second phase-shift configuration for signals sent over a second wireless link, wherein applying the second phase-shift configuration comprises causing a third subset of the plurality of antenna elements to apply the first one of the two phase shifts and a fourth subset of the plurality of antenna elements to apply the second one of the two phase shifts.

3. The radio module of claim 2, wherein:
   the first wireless link is with a second wireless communication node in the wireless mesh network, the second wireless communication node positioned in a first direction relative to the wireless communication node; and
   the second wireless link is with a third wireless communication node in the wireless mesh network, the third wireless communication node positioned in a second direction that is different from the first direction relative to the wireless communication node.

4. The radio module of claim 1, wherein:
   each antenna element of the plurality of antenna elements comprises (i) a respective first switch configured to couple the first edge to the second edge and (ii) a respective second switch configured to couple the first edge to the third edge;
   routing the received incident signal from the first edge to the second edge comprises routing the received incident signal through the first switch; and
   routing the received incident signal from the first edge to the third edge comprises routing the received incident signal through the second switch.

5. The radio module of claim 4, wherein controlling which of the two phase shifts is applied by each antenna element in the reflectarray antenna comprises:
   for each antenna element in the reflectarray antenna, closing one of its respective first or second switches and opening the other one of its respective first or second switches.

6. The radio module of claim 5, wherein:
   the respective first and second switches of each antenna element of the plurality of antenna elements are arranged in a respective complementary switching arrangement; and
   controlling which of the two phase shifts is applied by each antenna element in the reflectarray antenna comprises providing a respective 1-bit signal to each respective complementary switching arrangement.

7. The radio module of claim 1, wherein the two phase shifts are offset from one another by 180 degrees.

8. The radio module of claim 1, wherein the single RF chain comprises a parabolic or lens antenna configured to feed the incident signal to the plurality of antenna elements in the reflectarray antenna.

9. A communication system comprising:
a set of wireless communication nodes that are installed with respective equipment for operating as part of a wireless mesh network, wherein the respective equipment of each wireless communication node in the set includes a respective radio module comprising:
a reflectarray antenna comprising a plurality of antenna elements, wherein each antenna element of the plurality of antenna elements is configured to receive an incident signal, apply one of two phase shifts to the incident signal, and radiate the phase-shifted incident signal;
a radio frequency (RF) module comprising a single RF chain configured to feed the incident signal to the plurality of antenna elements in the reflectarray antenna; and
a control unit that is configured to control which of the two phase shifts is applied by each antenna element in the reflectarray antenna,
wherein each antenna element of the plurality of antenna elements comprises a patch antenna or a microstrip antenna,
wherein each antenna element of the plurality of antenna elements comprises a first edge, a second edge, and a third edge, and
wherein applying one of the two phase shifts to the incident signal comprises routing the received incident signal from the first edge to one of the second edge or the third edge.

10. The communication system of claim 9, wherein controlling which of the two phase shifts is applied by each antenna element in the reflectarray antenna comprises:
applying a first phase-shift configuration for signals sent over a first wireless link, wherein applying the first phase-shift configuration comprises causing a first subset of the plurality of antenna elements to apply a first one of the two phase shifts and a second subset of the plurality of antenna elements to apply a second one of the two phase shifts; and
applying a second phase-shift configuration for signals sent over a second wireless link, wherein applying the second phase-shift configuration comprises causing a third subset of the plurality of antenna elements to apply the first one of the two phase shifts and a fourth subset of the plurality of antenna elements to apply the second one of the two phase shifts.

11. The communication system of claim 10, wherein:
the first wireless link is with a second wireless communication node in the wireless mesh network, the second wireless communication node positioned in a first direction relative to the wireless communication node; and
the second wireless link is with a third wireless communication node in the wireless mesh network, the third wireless communication node positioned in a second direction that is different from the first direction relative to the wireless communication node.

12. The communication system of claim 9, wherein:
each antenna element of the plurality of antenna elements comprises (i) a respective first switch configured to couple the first edge to the second edge and (ii) a respective second switch configured to couple the first edge to the third edge;
routing the received incident signal from the first edge to the second edge comprises routing the received incident signal through the first switch; and
routing the received incident signal from the first edge to the third edge comprises routing the received incident signal through the second switch.

13. The communication system of claim 12, wherein controlling which of the two phase shifts is applied by each antenna element in the reflectarray antenna comprises:
for each antenna element in the reflectarray antenna, closing one of its respective first or second switches and opening the other one of its respective first or second switches.

14. The communication system of claim 13, wherein:
the respective first and second switches of each antenna element of the plurality of antenna elements are arranged in a respective complementary switching arrangement; and
controlling which of the two phase shifts is applied by each antenna element in the reflectarray antenna comprises providing a respective 1-bit signal to each respective complementary switching arrangement.

15. The communication system of claim 9, wherein the two phase shifts are offset from one another by 180 degrees.

16. The communication system of claim 9, wherein the single RF chain comprises a parabolic or lens antenna configured to feed the incident signal to the plurality of antenna elements in the reflectarray antenna.

* * * * *